United States Patent
Nyman et al.

(10) Patent No.: US 7,089,298 B2
(45) Date of Patent: Aug. 8, 2006

(54) NAMING DISTRIBUTION METHOD FOR AD HOC NETWORKS

(75) Inventors: Kai Nyman, Espoo (FI); Mikko Olkkonen, Kirkkonummi (FI); Juhani Murto, Helsinki (FI); Kari Oinonen, Lempaala (FI)

(73) Assignee: Nokia Corporation, Espoo (FI)

( * ) Notice: Subject to any disclaimer, the term of this patent is extended or adjusted under 35 U.S.C. 154(b) by 863 days.

(21) Appl. No.: 09/932,464

(22) Filed: Aug. 20, 2001

(65) Prior Publication Data

US 2003/0037033 A1 Feb. 20, 2003

(51) Int. Cl.
G06F 15/177 (2006.01)
(52) U.S. Cl. .............................. 709/220; 707/1; 707/6
(58) Field of Classification Search ................ 709/220, 709/225, 223, 227, 238, 245, 201; 375/134; 370/465, 245, 338, 401; 455/515, 557, 412, 455/414.1, 456; 340/3.5; 701/200; 707/10, 707/1, 6; 717/130; 718/106; 719/321; 705/1, 705/35
See application file for complete search history.

(56) References Cited

U.S. PATENT DOCUMENTS

| | | | | |
|---|---|---|---|---|
| 6,097,888 A * | 8/2000 | Simonyi | ...................... | 717/144 |
| 6,128,661 A * | 10/2000 | Flanagin et al. | ............. | 709/227 |
| 6,215,790 B1 * | 4/2001 | Voit et al. | .................... | 370/401 |
| 6,414,693 B1 * | 7/2002 | Berger et al. | ................ | 345/641 |
| 6,532,368 B1 * | 3/2003 | Hild et al. | ................... | 455/515 |
| 6,590,928 B1 * | 7/2003 | Haartsen | ....................... | 375/134 |
| 6,601,093 B1 * | 7/2003 | Peters | ......................... | 709/220 |
| 6,628,965 B1 * | 9/2003 | LaRosa et al. | ............... | 455/557 |
| 6,629,123 B1 * | 9/2003 | Hunt | ........................... | 718/106 |
| 6,661,784 B1 * | 12/2003 | Nykanen | ..................... | 370/338 |
| 6,690,932 B1 * | 2/2004 | Barnier et al. | ........... | 455/414.1 |
| 6,789,126 B1 * | 9/2004 | Saulpaugh et al. | .......... | 709/245 |

(Continued)

FOREIGN PATENT DOCUMENTS

EP 0 795 991 9/1997

(Continued)

OTHER PUBLICATIONS

Microsoft, "Universal Plug and Play Device Architecture Reference", ver.0.53, Oct. 18, 1999, 29 pages.*

(Continued)

*Primary Examiner*—Thong Vu
*Assistant Examiner*—Hai V. Nguyen
(74) *Attorney, Agent, or Firm*—Morgan & Finnegan, LLP

(57) ABSTRACT

Device name conflicts are resolved when adding devices to existing ad hoc networks or when joining two ad hoc networks together. After a connection has been established between a new device to be added and a first member device in the ad hoc network, a name distribution message is transferred by the new device to the first member device. The name distribution message will be passed from member device to member device in the ad hoc network, and at each member device a name conflict check is performed. Device name conflicts are also resolved when joining two ad hoc networks together. The contents of name manager tables of the two respective ad hoc networks must be exchanged. This is accomplished by forming a name distribution message for each name record in the name manager tables of the two devices establishing the connection on behalf of their respective ad hoc networks. Then the name distribution messages formed in each respective ad hoc network are distributed to the other ad hoc network. In the process of distributing the name distribution messages through the other network, any name conflicts are commonly resolved in all of the devices in both ad hoc networks.

68 Claims, 24 Drawing Sheets

U.S. PATENT DOCUMENTS

| | | | |
|---|---|---|---|
| 6,842,460 B1 * | 1/2005 | Olkkonen et al. | 370/465 |
| 6,856,236 B1 * | 2/2005 | Christensen et al. | 340/3.5 |
| 6,856,970 B1 * | 2/2005 | Campbell et al. | 705/35 |
| 6,862,737 B1 * | 3/2005 | Iwamura et al. | 719/321 |
| 6,954,790 B1 * | 10/2005 | Forslow | 709/227 |
| 6,957,422 B1 * | 10/2005 | Hunt | 717/130 |
| 6,981,250 B1 * | 12/2005 | Wiltamuth et al. | 717/170 |
| 2002/0035621 A1 * | 3/2002 | Zintel et al. | 709/220 |
| 2002/0062388 A1 * | 5/2002 | Ogier et al. | 709/238 |
| 2002/0069278 A1 * | 6/2002 | Forslow | 709/225 |
| 2002/0111948 A1 * | 8/2002 | Nixon et al. | 707/10 |
| 2002/0120750 A1 | 8/2002 | Nidd | |
| 2002/0128000 A1 | 9/2002 | do Nascimento, Jr. | |
| 2002/0138615 A1 * | 9/2002 | Schmeling | 709/225 |
| 2002/0145980 A1 | 10/2002 | Morley et al. | |
| 2002/0147003 A1 * | 10/2002 | Tada et al. | 455/412 |
| 2002/0169539 A1 * | 11/2002 | Menard et al. | 701/200 |
| 2002/0176366 A1 * | 11/2002 | Ayyagari et al. | 370/245 |
| 2002/0183068 A1 * | 12/2002 | Dunko et al. | 455/456 |
| 2002/0188656 A1 * | 12/2002 | Patton et al. | 709/201 |
| 2002/0198994 A1 * | 12/2002 | Patton et al. | 709/225 |
| 2003/0004743 A1 * | 1/2003 | Callegari | 705/1 |
| 2003/0041141 A1 * | 2/2003 | Abdelaziz et al. | 709/223 |
| 2004/0260800 A1 * | 12/2004 | Gu et al. | 709/223 |
| 2006/0026568 A1 * | 2/2006 | Wiltamuth et al. | 717/122 |

FOREIGN PATENT DOCUMENTS

| | | |
|---|---|---|
| WO | WO 97/16934 | 5/1997 |
| WO | WO 00/19344 | 4/2000 |

OTHER PUBLICATIONS

Edwards et al., "Using Speakeasy for Ah Hoc Peer-to-Peer Collaboration", 2002, 10 pages.*

Benczur et al., "Formal Description of a Distributed Location Service for Mobile Ad hoc network", ASM 2003, LNCS 2589, pp. 204-217, 2003.*

Iwasaki et al. "Touch-and-Connect; A Connection Request Framework for Ad-hoc Networks and teh Pervasive Computing Environment", 10 pages.*

Ericsson, "The Mobile Network: Empowering the User, Building the Business", Jun. 2000, 15 pages.*

Tourrilhes Jean, "Transparent peer to peer TCP/over IrDA", HP Internet and Mobile Systems Lab, Jun. 12, 2001, 10 pages.*

Brent A. Miller and Chatschik Biskikian, Bluetooth Revealed, 2001 Prentice Hall PTR, Upper Saddle River, NJ; pp. 120-121.

* cited by examiner

FIG. 1A

ADDITION OF MARK'S WIRELESS DEVICE TO AD HOC NETWORK

WIRELESS AD HOC NETWORK 132

- WIRELESS DEVICE 128 — MARK — ADDRESS(M)
  - MARK'S ADD DEVICE MESSAGE 244(M)
- WIRELESS DEVICE 124 — PAUL — ADDRESS(P)
  - MARK'S ADD DEVICE MESSAGE — HOP CNT = HOP CNT + 1
- WIRELESS DEVICE 126 — IAN — ADDRESS(I)
  - MARK'S ADD DEVICE MESSAGE — HOP CNT = HOP CNT + 1
- WIRELESS DEVICE 116 — DAN JONES — ADDRESS(F)
  - MARK'S ADD DEVICE MESSAGE — HOP CNT = HOP CNT + 1
- WIRELESS DEVICE 114 — EVE — ADDRESS(E)
  - MARK'S ADD DEVICE MESSAGE — HOP CNT = HOP CNT + 1
- WIRELESS DEVICE 108 — DAN SMITH — ADDRESS(D)
  - MARK'S ADD DEVICE MESSAGE — HOP CNT = HOP CNT + 1
- WIRELESS DEVICE 100 — ALICE — ADDRESS(A)

FIG. 1E

ADD DEVICE MESSAGE 244

| DEVICE ADDRESS | OP CODE | OPERANDS ||||||
| --- | --- | --- | --- | --- | --- | --- | --- |
| | | NAME | ALTERNATE NAME | TIME STAMP | MAX HOP CNT | CURRENT HOP CNT | OK TO DISPLAY |
| ADDRESS(M) | ADD_DV | MARK | MARK'S PC | 15:30 | 4 | 0 | YES |

DELETE DEVICE MESSAGE 245

| DEVICE ADDRESS | OP CODE | OPERANDS |||||
| --- | --- | --- | --- | --- | --- | --- |
| ADDRESS(M) | DELETE_DV | | | | | |

CHANGE NAME MESSAGE 246

| DEVICE ADDRESS | OP CODE | OPERANDS |||||
| --- | --- | --- | --- | --- | --- | --- |
| | | NAME | ALTERNATE NAME | | | |
| ADDRESS(M) | CH_NAME | MARC | MARC'S PC | | | |

COMPOSITE TABLE MESSAGE 247

| DEVICE ADDRESS | OP CODE | OPERANDS |
| --- | --- | --- |
| | | COMPOSITE NAME MANAGER TABLE 232" (FIG. 1H) |
| ADDRESS(M) | TABLE | |

SECURITY ATTRIBUTES MESSAGE 248

| DEVICE ADDRESS | OP CODE | OPERANDS ||||
| --- | --- | --- | --- | --- | --- |
| | | AUTHORIZATION LIST | | | DIGITAL SIGNATURE | CERTIFICATE | PUBLIC KEY |
| ADDRESS(M) | SEC_ATTR | ALICE | IAN | PAUL | SIG(M) | CERT(M) | PK(M)' |

NAME DISPLAY ATTRIBUTES MESSAGE 249

| DEVICE ADDRESS | OP CODE | OPERANDS |||||
| --- | --- | --- | --- | --- | --- | --- |
| | | FONT | COLOR/ ALT. COLOR | ANIMATION | SOUND | OTHER |
| ADDRESS(M) | DISP_ATTR | ARIAL | RED/BLK | NONE | BEEP | ----- |

NAME FLASH DISPLAY ATTRIBUTES MESSAGE 250

| DEVICE ADDRESS | OP CODE | OPERANDS |||||
| --- | --- | --- | --- | --- | --- | --- |
| | | FONT | COLOR | ANIMATION | SOUND | OTHER |
| ADDRESS(M) | FLASH | | X | | X | ----- |

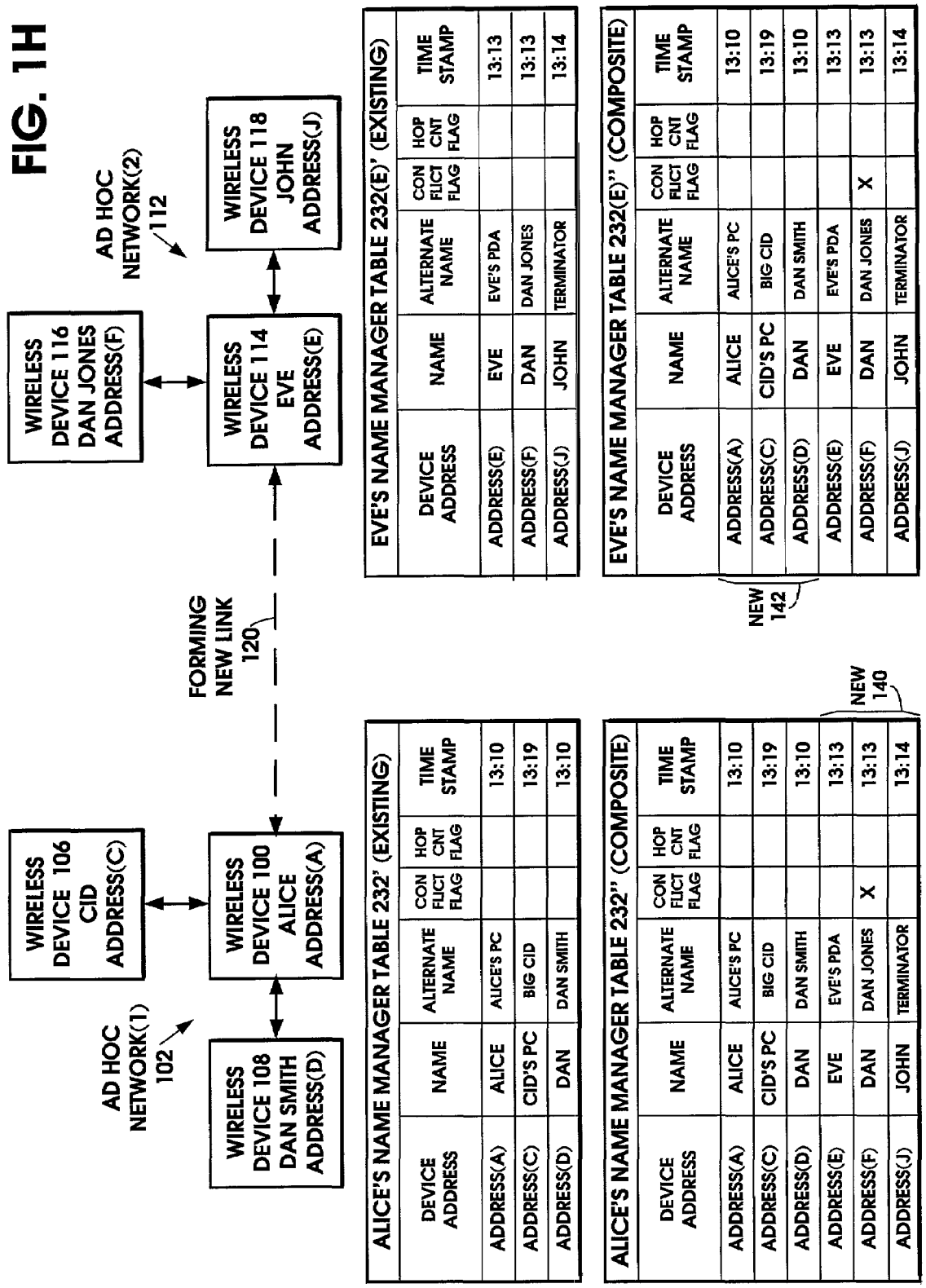

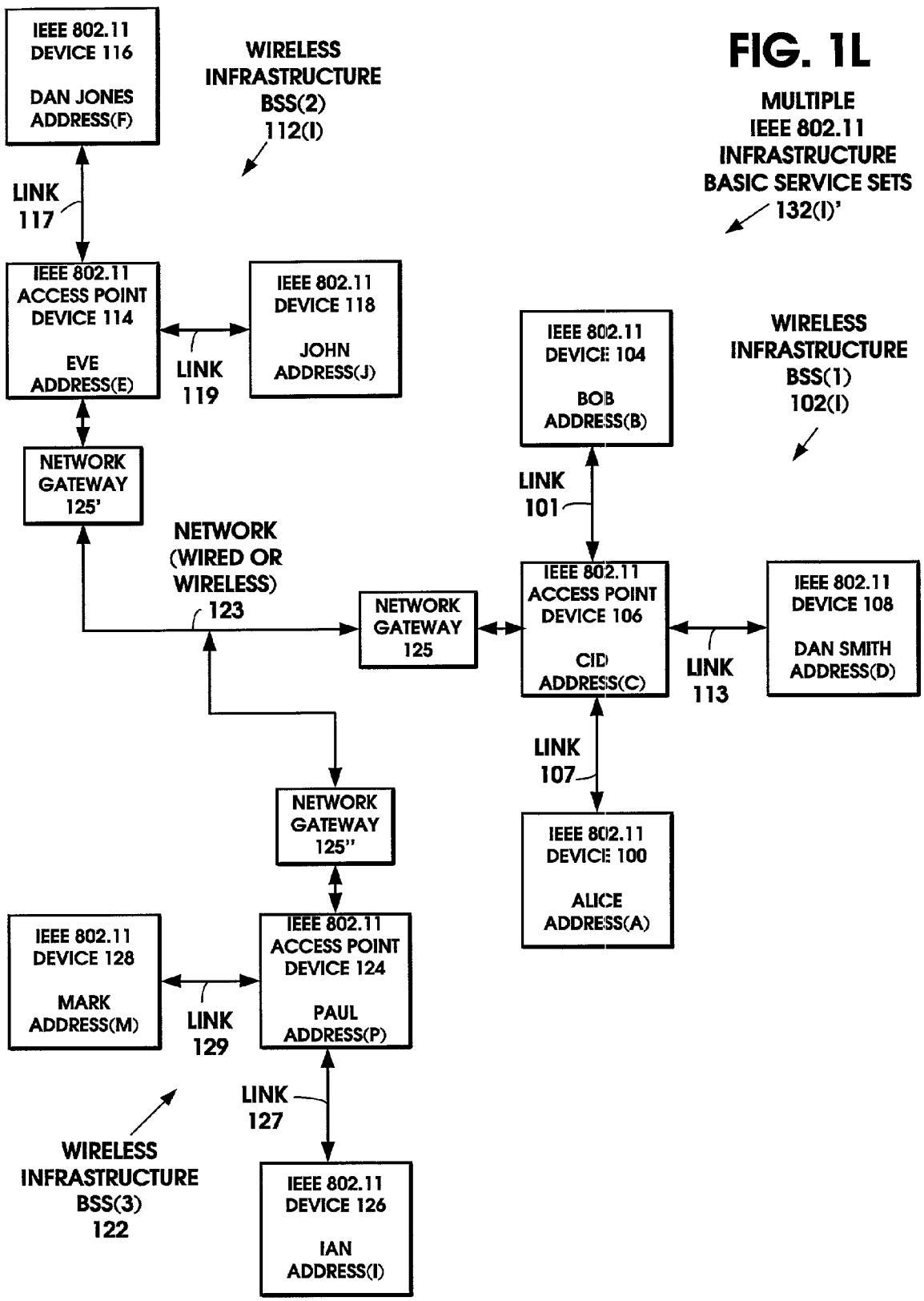

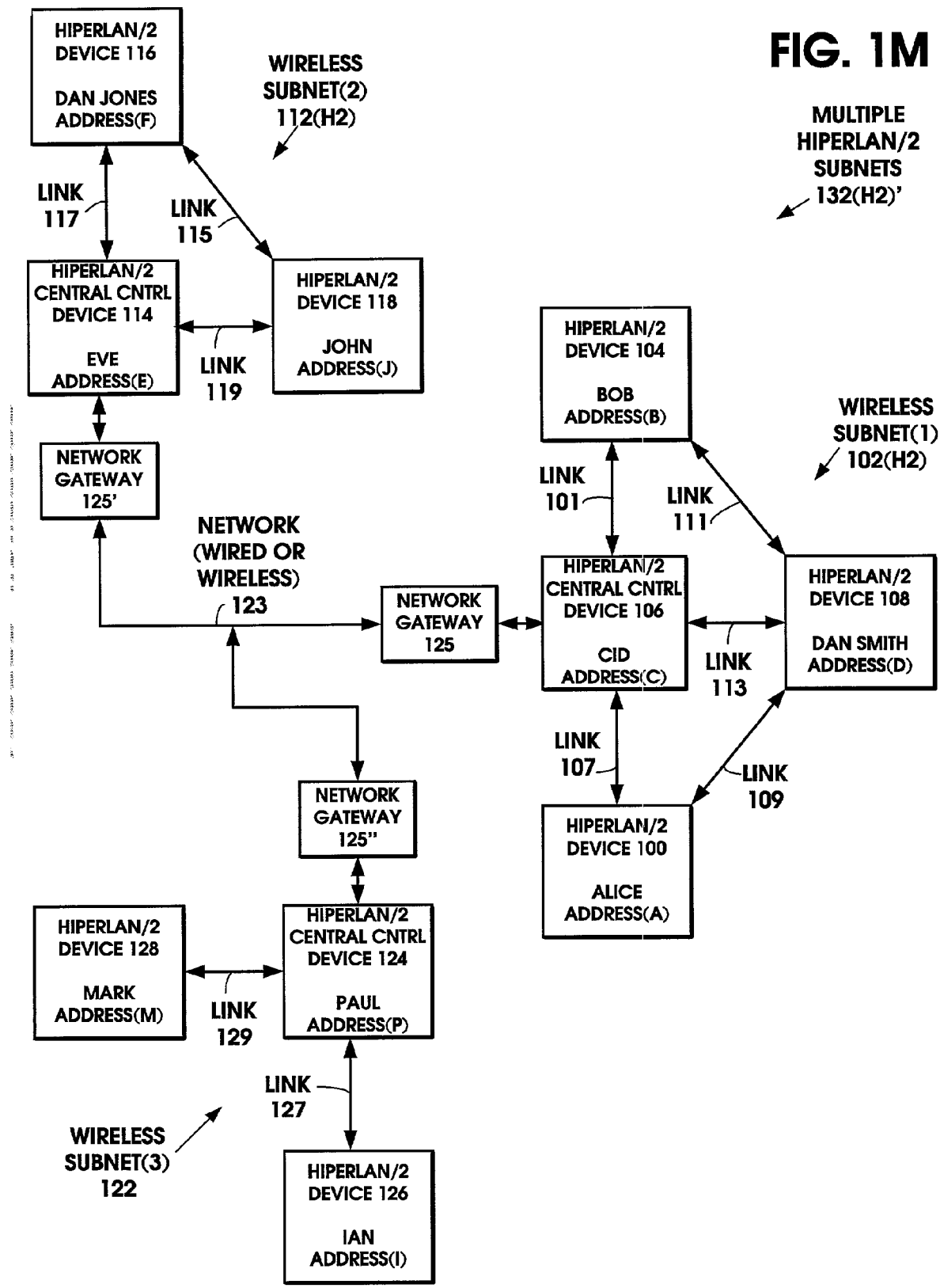

ALICE'S NAME MANAGER TABLE 232

| DEVICE ADDRESS | NAME | ALTERNATE NAME | CON FLICT FLAG | HOP CNT FLAG | TIME STAMP | MAX HOP CNT | CURRENT HOP CNT | FONT | COLOR/ ALT. COLOR | ANIMATION | SOUND | OK TO DISPLAY |
|---|---|---|---|---|---|---|---|---|---|---|---|---|
| ADDRESS(A) | ALICE | ALICE'S PC | | | 13:10 | 4 | 0 | ARIAL | RED/BLK | ROTATE-X | BEEP | YES |
| ADDRESS(B) | BOB | ROBERT | | | 13:18 | 4 | 1 | ARIAL | RED/BLK | ROTATE-X | BEEP | YES |
| ADDRESS(C) | CID'S PC | BIG CID | | | 13:19 | 4 | 1 | ARIAL | RED/BLK | ROTATE-X | BEEP | YES |
| ADDRESS(D) | DAN | DAN SMITH | | | 13:10 | 4 | 1 | ARIAL | RED/BLK | ROTATE-X | BEEP | YES |
| ADDRESS(E) | EVE | EVE'S PDA | | | 13:13 | 4 | 2 | SCRIPT | BLUE/YEL | PULSING | C,B,A,C | YES |
| ADDRESS(F) | DAN | DAN JONES | X | | 13:13 | 4 | 3 | ARIAL | RED/BLK | ROTATE-X | BEEP | YES |
| ADDRESS(I) | IAN | IAN'S PC | | | 13:15 | 4 | 4 | ARIAL | RED/BLK | ROTATE-X | BEEP | YES |
| ADDRESS(J) | JOHN | TERMINATOR | | | 13:14 | 4 | 3 | ARIAL | RED/BLK | ROTATE-X | BEEP | YES |
| ADDRESS(M) | MARK | MARK'S PC | | X | 13:17 | 4 | 6 | ARIAL | RED/BLK | ROTATE-X | BEEP | YES |
| ADDRESS(P) | PAUL | PAUL'S PC | | X | 13:16 | 4 | 5 | ARIAL | RED/BLK | ROTATE-X | BEEP | YES |

CONFLICT FLAG 231

HOP COUNT FLAG 233

ALICE'S NAME RECORD 236

PERMISSION TO DISPLAY DEVICE NAME HAS BEEN GRANTED AS INDICATED BY AUTHORIZATION 241

NAME COLOR AND ALTERNATE COLOR 235 ARE SWITCHED IN RESPONSE TO NAME FLASH MESSAGE

NAME ANIMATION 237 IS ACTIVATED IN RESPONSE TO NAME FLASH MESSAGE

SOUND 239 IS PLAYED IN RESPONSE TO NAME FLASH MESSAGE

FIG. 2B

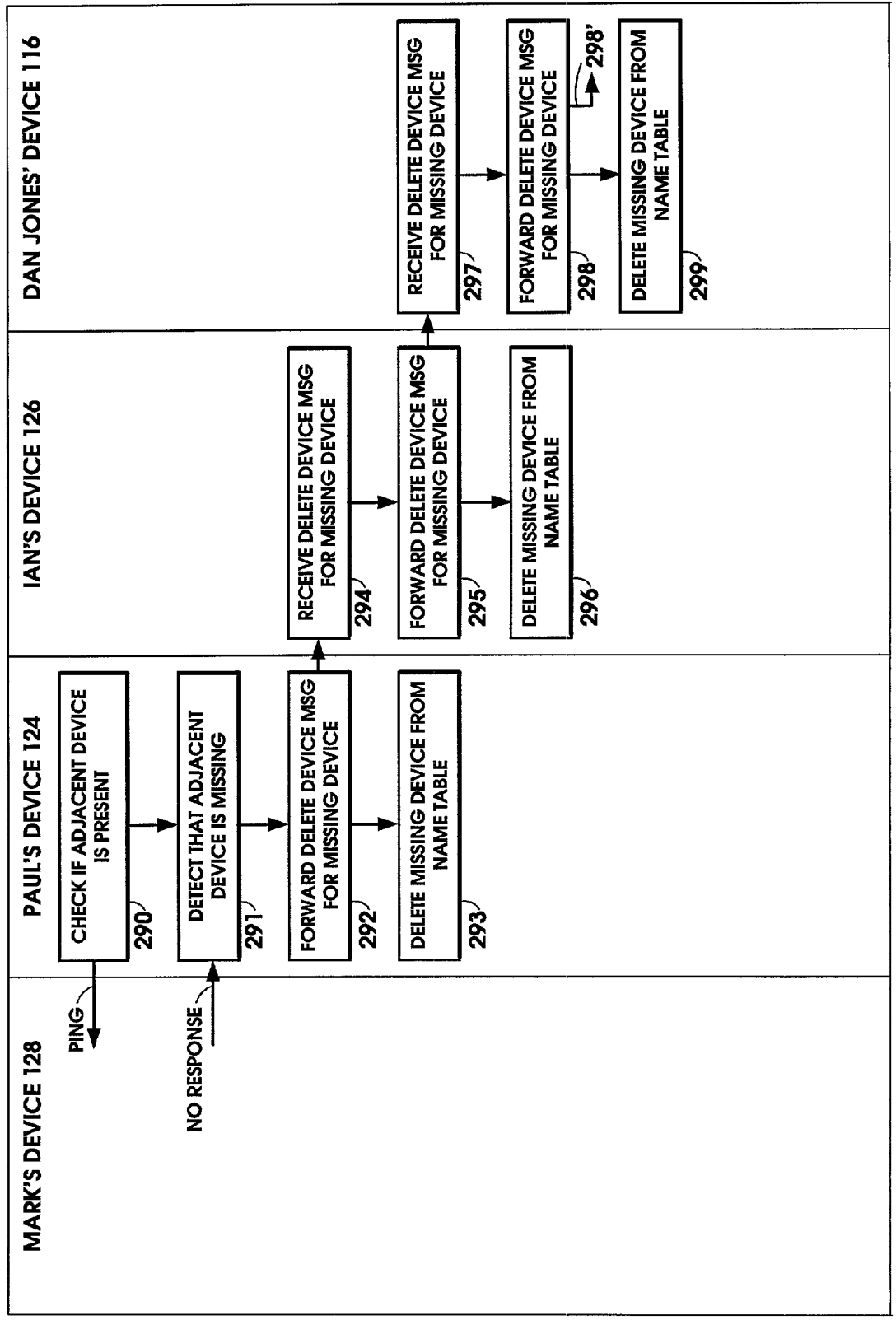

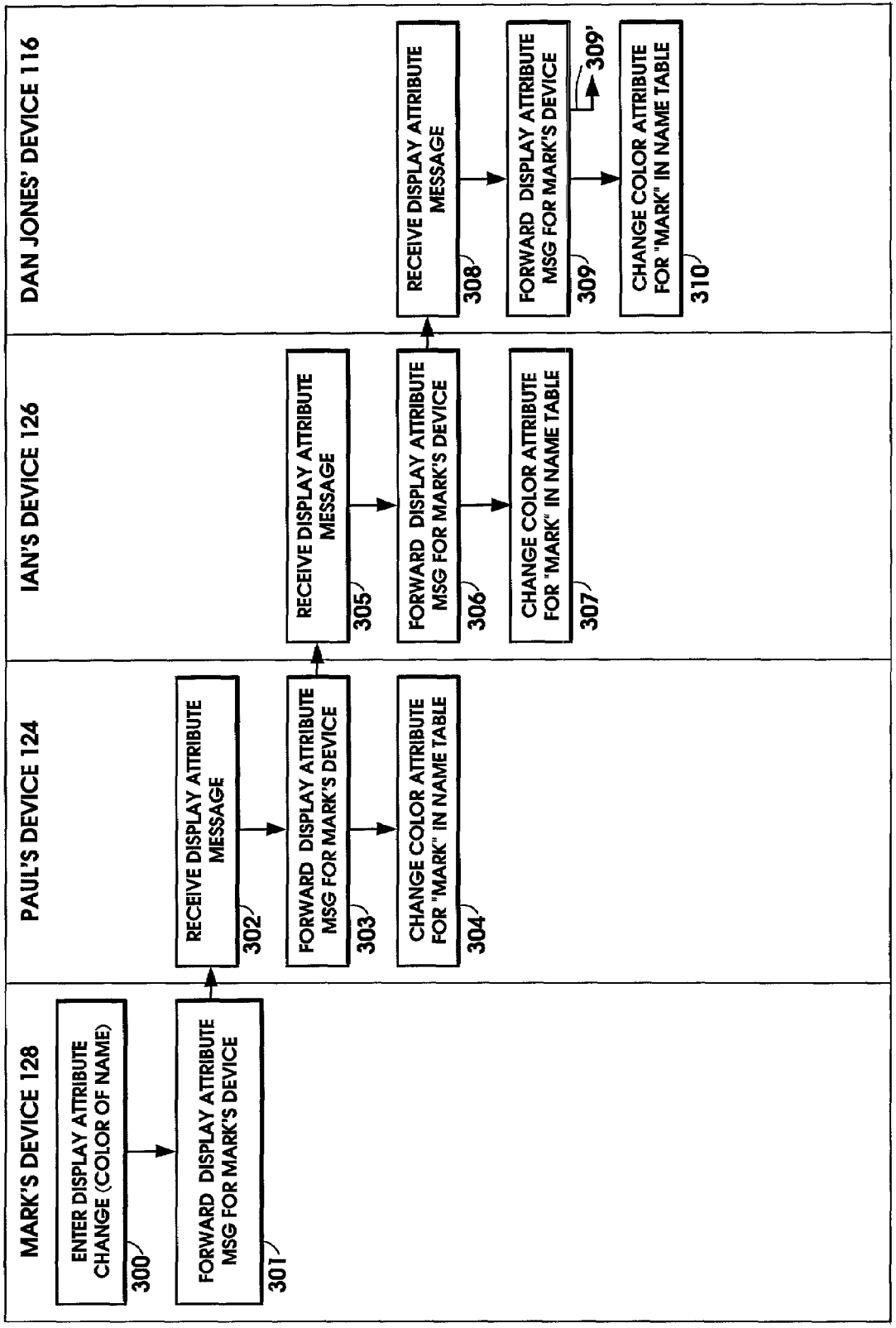

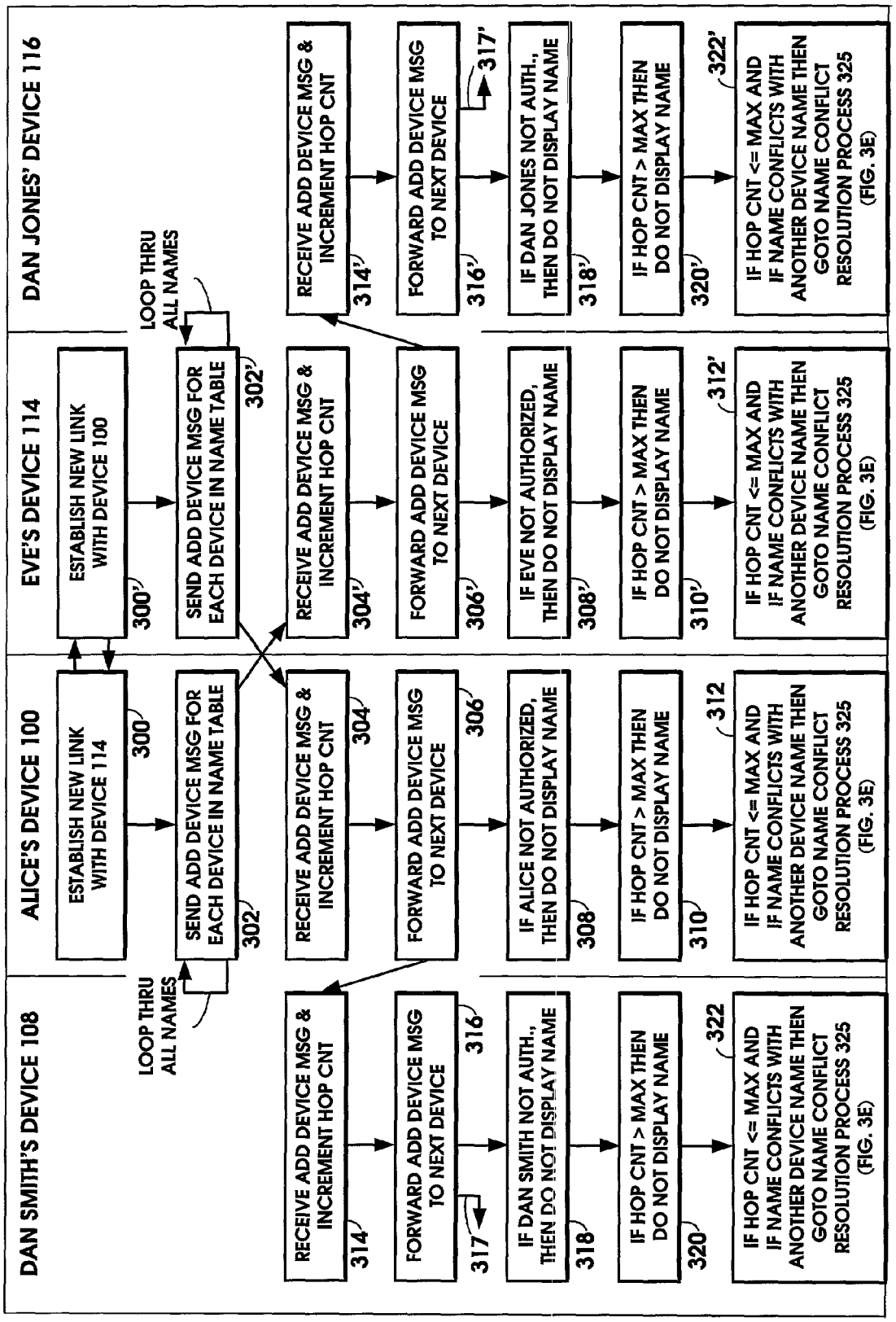

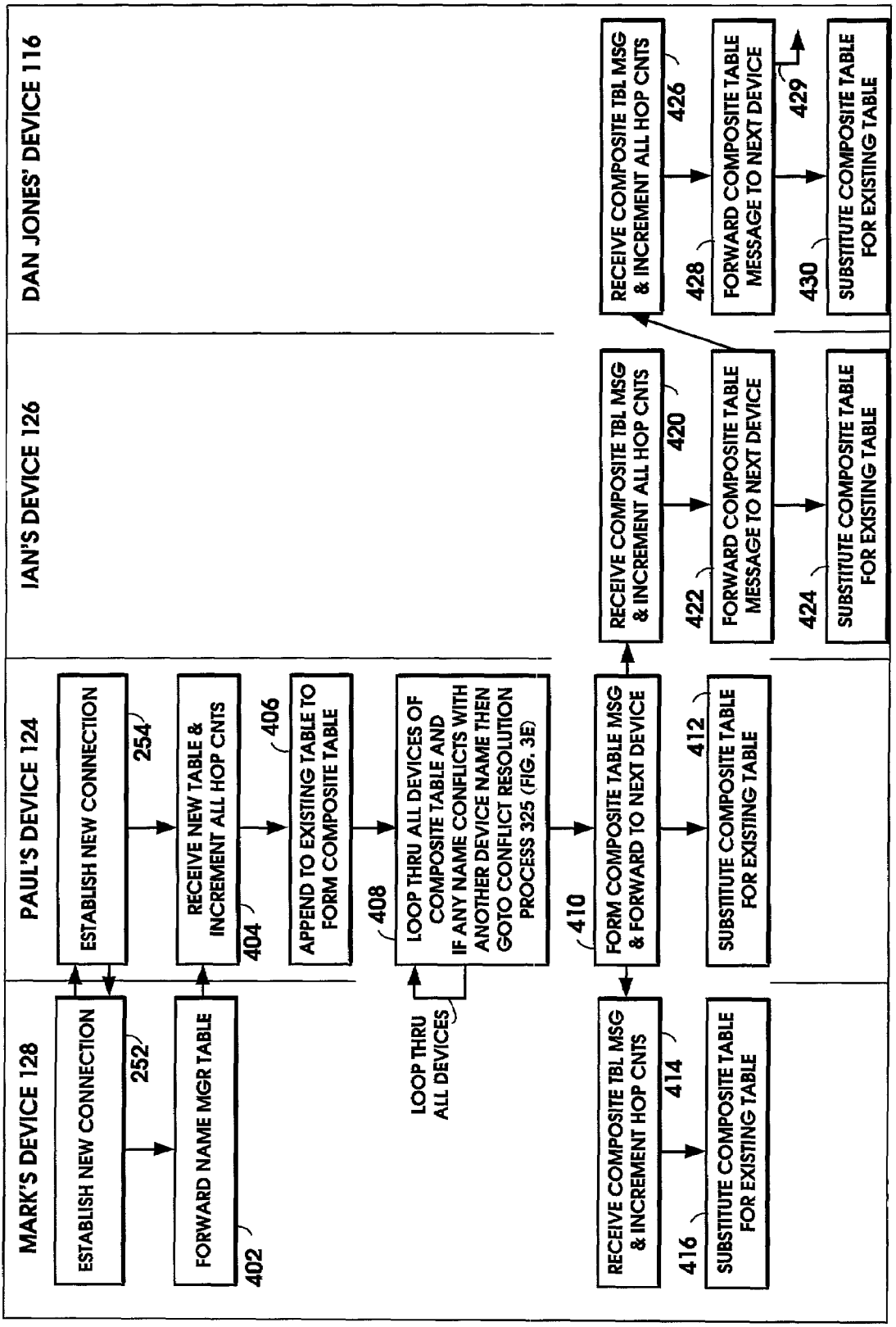

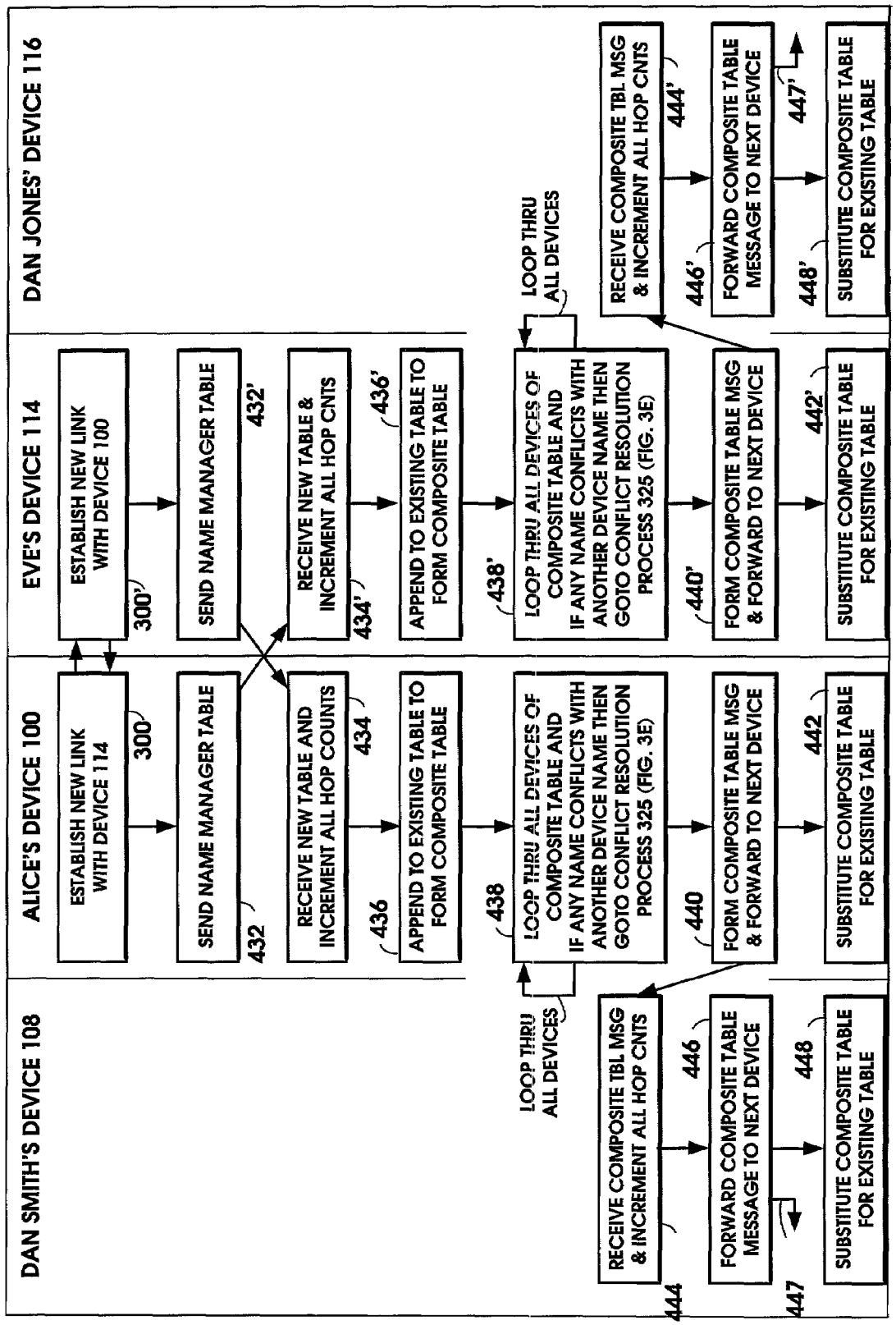

NAMING DISTRIBUTION METHOD FOR AD HOC NETWORKS

FIELD OF THE INVENTION

The invention disclosed broadly relates to ubiquitous computing and more particularly relates to improvements in short-range wireless systems.

BACKGROUND OF THE INVENTION

Short Range Wireless Systems

Short range wireless systems have a typical range of one hundred meters or less. They often combine with systems wired to the Internet to provide communication over long distances. The category of short range wireless systems includes wireless personal area networks (PANs) and wireless local area networks (LANs). They have the common feature of operating in unlicensed portions of the radio spectrum, usually either in the 2.4 GHz Industrial, Scientific, and Medical (ISM) band or the 5 GHz Unlicensed-National Information Infrastructure (U-NII) band. Wireless personal area networks use low cost, low power wireless devices that have a typical range of ten meters. The best known example of wireless personal area network technology is the Bluetooth Standard, which operates in the 2.4 GHz ISM band. It provides a peak air link speed of one Mbps and a power consumption low enough for use in personal, portable electronics such as PDAs and mobile phones. Wireless local area networks generally operate at higher peak speeds of between 10 to 100 Mbps and have a longer range, which requires greater power consumption. Wireless local area networks are typically used as wireless links from portable laptop computers to a wired LAN, via an access point (AP). Examples of wireless local area network technology include the IEEE 802.11 Wireless LAN Standard and the HIPERLAN Standard, which operates in the 5 GHz U-NII band.

Ad Hoc Networks

An ad hoc network is a short range wireless system composed primarily of mobile wireless devices, which associate together for a relatively short time to carry out a common purpose. A temporary network such as this is called a "piconet" in the Bluetooth Standard, an "independent basic service set" (IBSS) in the IEEE 802.11 Wireless LAN Standard, a "subnet" in the HIPERLAN Standard, and generally a radio cell or a "micro-cell" in other wireless LAN technologies. Ad hoc networks have the common property of being an arbitrary collection of wireless devices, which are physically close enough to be able to communicate and which are exchanging information on a regular basis. The networks can be constructed quickly and without much planning. Members of the ad hoc network join and leave as they move into and out of the range of each other. Most ad hoc networks operate over unlicensed radio frequencies at speeds of from one to fifty-four Mbps using carrier sense protocols to share the radio spectrum. The distance over which they can communicate ranges from ten meters for Bluetooth piconets to over one hundred meters for wireless LAN micro-cells in an open environment. Ad hoc networks consist primarily of mobile wireless devices, but can also include one or more access points, which are stationary wireless devices operating as a stand-alone server or connected as gateways to other networks.

The Bluetooth Short Range Wireless Technology

Bluetooth is a short-range radio network, originally intended as a cable replacement. It can be used to create ad hoc networks of up to eight devices operating together. The Bluetooth Special Interest Group, *Specification Of The Bluetooth System,* Volumes 1 and 2, Core and Profiles: Version 1.1, 22$^{nd}$ February, 2001., describes the principles of Bluetooth device operation and communication protocols. The devices operate in the 2.4 GHz radio band reserved for general use by Industrial, Scientific, and Medical (ISM) applications. Bluetooth devices are designed to find other Bluetooth devices within their ten meter radio communications range and to discover what services they offer, using a service discovery protocol (SDP). The SDP searching function relies on links being established between the requesting Bluetooth device in a client role and the responding Bluetooth device in a server role. Once a link has been established, it can be used to find out about services in the responding Bluetooth device and how to connect to them.

A connection between two Bluetooth devices is initiated by an inquiring device sending out an inquiry message searching for other devices in its vicinity. Any other Bluetooth device that is listening by means of conducting an inquiry scan, will recognize the inquiry message and respond. The inquiry response is a message packet containing the responding device's Bluetooth Device Address (BD_ADDR). A Bluetooth device address is a unique, 48-bit IEEE address that is electronically engraved into each Bluetooth device.

The inquiring device uses the information provided in the inquiry response packet, to prepare and send a paging message to the responding device. To establish a connection, the inquiring device must enter the page state. In the page state, the inquiring device will transmit initial paging messages to the responding device using the access code and timing information acquired from the inquiry response packet. The responding device must be in the page scan state to allow the inquiring device to connect with it. Once in the page scan state, the responding device will acknowledge the initial paging messages and the inquiring device will send a paging packet that provides the clock timing and access code of the inquiring device to the responding device. The responding device responds with a page acknowledgment packet. This enables the two devices to form a connection and both devices transition into the connection state. The inquiring device that has initiated the connection assumes the role of a master device and the responding device assumes the role of a slave device in a new ad hoc network piconet.

Each piconet has one master device and up to seven slave devices. All communication is directed between the master device and each respective slave device. The master initiates an exchange of data and the slave responds to the master. When two slave devices are to communicate with each other, they must do so through the master device. The master device maintains the piconet's network clock and controls when each slave device can communicate with the master device. Members of the ad hoc network piconet join and leave as they move into and out of the range of the master device. Piconets support distributed activities, such as collaborative work projects, collaborative games, multi-user gateways to the Internet, and the like. A user's device that joins a particular piconet, does so to enable its user to participate in the currently running collaborative activity.

A Bluetooth-enabled laptop computer can send information to a Bluetooth-enabled printer in the next room. A Bluetooth-enabled microwave oven can send a message to a Bluetooth-enabled mobile phone announcing that the meal is ready. Bluetooth will become the standard in mobile phones, PCs, laptops and other electronic devices, enabling users to share information, synchronize data, access the Internet, integrate with LANs or actuate electromechanical devices, such as unlocking a car. A passenger can write e-mails on his/her laptop on an airplane and then, after landing, the messages can be automatically forwarded to the Internet by Bluetooth devices that are ubiquitously located around the airport terminal. In another example, while waiting in an airport lounge, a the passenger can receive interesting duty-free offers directly on his/her mobile phone or play multiplayer games with friends.

The IEEE 802.11 Wireless LAN Standard

The IEEE 802.11 Wireless LAN Standard defines at least two different physical (PHY) specifications and one common medium access control (MAC) specification. The IEEE 802.11(a) Standard is designed for either the 2.4 GHz ISM band or the 5 GHz U-NII band, and uses orthogonal frequency division multiplexing (OFDM) to deliver up to 54 Mbps data rates. The IEEE 802.11(b) Standard is designed for the 2.4 GHz ISM band and uses direct sequence spread spectrum (DSSS) to deliver up to 11 Mbps data rates. The IEEE 802.11 Wireless LAN Standard describes two major components, the mobile station and the fixed access point (AP). IEEE 802.11 ad hoc networks have an independent configuration where the mobile stations communicate directly with one another, without support from a fixed access point. The IEEE 802.11 standard provides wireless devices with service inquiry features similar to the Bluetooth inquiry and scanning features. IEEE 802.11 ad hoc networks support distributed activities similar those of the Bluetooth piconets, except that they have ten times the communications range.

In order for a IEEE 802.11 mobile station to communicate with other mobile stations in an ad hoc network, it must first find the stations. The process of finding another station is by inquiring. Active inquiry requires the inquiring station to transmit queries and invoke responses from other wireless stations in an ad hoc network. In an active inquiry, the mobile station will transmit a probe request frame. If there is an ad hoc network on the same channel that matches the service set identity (SSID) in the probe request frame, a station in that ad hoc network will respond by sending a probe response frame to the inquiring station. The probe response includes the information necessary for the inquiring station to access a description of the ad hoc network. The inquiring station will also process any other received probe response and Beacon frames. Once the inquiring station has processed any responses, or has decided there will be no responses, it may change to another channel and repeat the process. At the conclusion of the inquiry, the station has accumulated information about the ad hoc networks in its vicinity. Once a station has performed an inquiry that results in one or more ad hoc network descriptions, the station may choose to join one of the ad hoc networks. The IEEE 802.11 Wireless LAN Standard is published in three parts as IEEE 802.11-1999; IEEE 802.11 a-1999; and IEEE 802.11b-1999, which are available from the IEEE, Inc. web site http:// grouper.ieee.org/groups/802/11.

High Performance Radio Local Area Network (HIPERLAN)

The HIPERLAN standard provides a wireless LAN with a high data rate of up to 54 Mbps and a medium-range of 50 meters. HIPERLAN wireless LANs provide multimedia distribution with video quality of service (QoS), reserved spectrum, and good in-building propagation. There are two HIPERLAN standards. HIPERLAN Type 1 is a dynamic, priority driven channel access protocol similar to wireless Ethernet. HIPERLAN Type 2 is reserved channel access protocol similar to a wireless version of asynchronous transfer mode (ATM). Both HIPERLAN Type 1 and HIPERLAN Type 2 use dedicated spectrum at 5 GHz. HIPERLAN Type 1 uses an advanced channel equalizer to deal with intersymbol interference and signal multipath. HIPERLAN Type 2 avoids these interference problems by using orthogonal frequency division multiplex (OFDM) and a frequency transform function. The HIPERLAN Type 2 specification offers options for bit rates of 6, 16, 36, and 54 Mbps. The physical layer adopts an OFDM multiple carrier scheme using 48 carrier frequencies per OFDM symbol. Each carrier may then be modulated using binary phase shift keying (BPSK), quadrature phase shift keying (QPSK), or quadrature amplitude modulation (QAM) formats of 16-QAM or 64-QAM to provide different data rates. The modulation schemes chosen for the higher bit rates achieve throughput in the range 30–50 Mbps.

The HIPERLAN Type 1 is a dynamic, priority driven channel access protocol that can form ad hoc networks of wireless devices. HIPERLAN Type 1 ad hoc networks support distributed activities similar those of the Bluetooth piconets and IEEE 802.11 independent basic service sets (IBSS). The HIPERLAN Type 1 standard provides wireless devices with service inquiry features similar to those of the Bluetooth inquiry and scanning features and the IEEE 802.11 probe request and response features. An overview of the HIPERLAN Type 1 principles of operation is provided in the publication *HIPERLAN Type 1 Standard,* ETSI ETS 300 652, WA2 December 1997.

HIPERLAN Type 2 is a reserved channel access protocol that forms ad hoc networks. HIPERLAN Type 2 ad hoc networks support distributed activities similar those of the HIPERLAN Type 1 ad hoc networks, Bluetooth piconets and IEEE 802.11 independent basic service sets (IBSS). HIPERLAN Type 2 provides high speed radio communication with typical data rates from 6 MHz to 54 Mbps. It connects portable devices with broadband networks that are based on IP, ATM and other technologies. Centralized mode is used to operate HIPERLAN Type 2 as an access network via a fixed access point. In addition a capability for direct link communication is provided. This mode is used to operate HIPERLAN Type 2 as an ad hoc network without relying on a cellular network infrastructure. In this case a central controller (CC), which is dynamically selected among the portable devices, provides the same level of QoS support as the fixed access point. Restricted user mobility is supported within the local service area. Wide area roaming mobility can also be supported. An overview of the HIPERLAN Type 2 principles of operation is provided in the Broadband Radio Access Networks (BRAN), *HIPERLAN Type 2; System Overview,* ETSI TR 101 683 VI.I.1 (2000-02) and a more detailed specification of its ad hoc network architecture is described in *HIPERLAN Type 2, Data Link Control (DLC) Layer; Part 4. Extension for Home Environment,* ETSI TS 101 761-4 V1.2.1 (2000-12).

Other Wireless Standards Supporting Ad Hoc Networks

Other wireless standards support ad hoc networks. Examples include the IEEE 802.15 Wireless Personal Area Network (WPAN) standard, the Infrared Data Association (IrDA) standard, the Digital Enhanced Cordless Telecommunications (DECT) standard, the Shared Wireless Access Protocol (SWAP) standard, the Japanese 3rd Generation (3G) wireless standard, and the Multimedia Mobile Access Communication (MMAC) Systems standard of the Japanese Association of Radio Industries and Businesses.

What would be desirable in the prior art is a way to unambiguously associate a name entered by the user with the device address of the user's wireless device, and distribute that name throughout the ad hoc network. It would be desirable to enable a member of an ad hoc network to select the user's displayed name on the member's wireless device, and have the user's address automatically appended to a message to be sent by the member to the user's device. What would be desirable is to reliably resolve naming conflicts between members with the same selected device name, which they have distributed throughout an ad hoc network. What would be desirable is a way to solve the problem of resolving device name conflicts when adding devices to existing ad hoc networks or when joining two ad hoc networks together.

SUMMARY OF THE INVENTION

In accordance with one aspect of the invention, the name or alternate name entered by a user is unambiguously associated with the device address of the user's wireless device as it is distributed throughout the ad hoc network, and naming conflicts are automatically resolved. For example, when the user's name is displayed in the browser on another member's device in the ad hoc network, the access code for the user's device is associated with the user's displayed name, such as by means of a hyperlink displayed with the name. Name records for each of the wireless devices in the ad hoc network are stored in a name manager table in the member's device. When the member selects the user's displayed name, the user's address is accessed from the user's name record stored in the member's device. The user's address is appended to a message, for example, which has been prepared by the member, and the message is automatically sent to the user's device. Even if there are members in the ad hoc network with the same selected device name as the user's selected name, the invention automatically resolves the name conflicts.

The invention solves the problem of resolving device name conflicts when adding devices to existing ad hoc networks or when joining two ad hoc networks together. In one aspect of the invention, after a connection has been established between a new device to be added and a first member device in the ad hoc network, the new device transfers a name distribution message to the first member device. The name distribution message will be passed from member device to member device in the ad hoc network, and at each member device a name record of the new device will be stored in a name manager table.

The name distribution message has a device address portion, an op code portion, and an operand portion. There are several types of name distribution messages. One embodiment used to add a new device is an ADD DEVICE message. The device address portion of the ADD DEVICE message contains the address of the new device. The op code portion of the ADD DEVICE message contains the op code "ADD_DV" that distinguishes this type of name distribution message from other types. The operand portion of the ADD DEVICE message includes the primary name selected by the user and an alternate name selected by the user to be substituted for the primary name in the event of a name conflict. There is wide latitude in the user's choice of such device names, which can include the user's own name, nick names, descriptive names, and the like. The operand portion of the ADD DEVICE message also includes a time stamp value, which is used to resolve naming conflicts, by exercising a preference for either the older or newer names, depending on the respective values of the time stamps.

Each of the name records of the member devices stored in a name manager table, includes both a primary name and an alternate name chosen by the member device's user. As the ADD DEVICE message is processed in the ad hoc network, the new device name is compared with all of the member device names in the name manager table. If there is a conflict, then the alternate name of the device with the younger time stamp is substituted for its primary name. If the new device to be added has the younger timestamp, then its alternate name will be recorded in the name manager table as the name to which the device is referred. If the member device has the younger timestamp, then its alternate name will be substituted for its primary name in the name manager table as the name to which the device is referred, and the name record created for the new device to be added will use the device's primary name. In an alternate embodiment, younger time stamps can be preferred over older time stamps.

The operand portion of the ADD DEVICE message also includes a maximum hop count value chosen by the user, which is the maximum number of devices to which his/her name may be given. The ADD DEVICE message has a current hop count of zero when it is initially transferred by the new device to the first member device. As the ADD DEVICE message is propagated through the ad hoc network, each member device increments the current hop count by one and compares it with the maximum hop count. When the current hop count becomes greater than the maximum hop count, the member device will not display the name of the new device.

The operand portion of the ADD DEVICE message also selectively includes a blanket grant of permission to display the new name. If the permission to display is not granted in the message, then member devices processing the ADD DEVICE message and creating a name record for the new device, will not display the name of the new device. The new device's user can subsequently issue a different type of name distribution message, a SECURITY ATTRIBUTES message, that includes an authorization list of member devices to whom display permission is granted. The SECURITY ATTRIBUTES message has a device address portion containing the new device's address, an op code portion that contains the op code "SEC_ATTR" that distinguishes this type of name distribution message from other types, and an operand portion that includes the authorization list. The operand portion can optionally include the new device user's public key, a trust certificate, message authentication codes, and/or digital signatures to enforce the security desired by the user for the display of his/her name.

An alternate embodiment to add a new device is a COMPOSITE TABLE message. The op code portion of the COMPOSITE TABLE message contains the op code "TABLE" that distinguishes this type of name distribution message from other types. Instead of propagating an ADD DEVICE message received from the new device, the new device's entire name manager table is passed to the ad hoc network. This embodiment enables the first device in the ad hoc network forming the connection with the new device, to perform only once, all of the processing necessary to resolve name conflicts in the ad hoc network. The resulting composite name manager table includes all of the name records contributed by both the new device, as well as those in the ad hoc network that it is joining. The resulting composite name manager table is the operand portion of the COMPOSITE TABLE message. The COMPOSITE TABLE message is then propagated from the first device in the ad hoc network forming the connection, to the rest of the ad hoc network, including the new device being added. This, embodiment allows a selection to be made in the tradeoff between optimizing the average processing load on the devices and optimizing the bandwidth necessary to communicate updates from device to device in the network.

Other types of name distribution messages include DELETE DEVICE messages, CHANGE NAME messages, and CHANGE ALTERNATE NAME messages. As their names imply, when these messages are propagated through the ad hoc network, they delete designated name records, change designated primary names, and change designated alternate names.

Still another type of name distribution message is the NAME DISPLAY ATTRIBUTES message, which enables the user to design the appearance of his/her name as it is displayed throughout the network. The NAME DISPLAY ATTRIBUTES message includes the user's device address and the op code "DISP_ATTR" that distinguishes this type of name distribution message from other types. The operands in NAME DISPLAY ATTRIBUTES message are FONT, COLOR, ALT. COLOR, ANIMATION, SOUND, and other attributes. As the NAME DISPLAY ATTRIBUTES message is propagated through the ad hoc network, each member device changes the name display attributes in the name manager table to those attributes designated by the user in the message.

Still another type of name distribution message is the NAME FLASH DISPLAY ATTRIBUTES message. When the NAME FLASH message is propagated through the ad hoc network, each member device toggles the name color or other designated name display attributes in its name manager table. This gives the appearance of flashing the name displayed on all of the devices in the network. The NAME FLASH message includes the user's device address field, and the op code "FLASH", that distinguishes this type of name distribution message from other types. The operands in NAME FLASH message are a flag "X" in each display attribute field that is desired to be flashed, for example in the color field and in the sound field. As the NAME FLASH message is propagated through the ad hoc network, each member device detects the color and sound flags. For the color flag, the member device accesses the color and alternate color attributes from the name record in the name manager table and then toggles the displayed name between the color and alternate colors specified in her name record. For the sound flag, the member device accesses the sound attribute from the name record in the name manager table and then plays the sound.

The invention solves the problem of resolving device name conflicts when joining two ad hoc networks together. The contents of the name manager tables of the two respective ad hoc networks must be exchanged. In one embodiment, this is accomplished by forming an ADD DEVICE message for each name record in the name manager tables of the two devices establishing the connection on behalf of their respective ad hoc networks. Then the ADD DEVICE messages formed in each respective ad hoc network are distributed to the other ad hoc network. In the process of distributing the ADD DEVICE messages through the other network, any name conflicts are commonly resolved in all of the devices in both ad hoc networks.

In an alternate embodiment, the COMPOSITE TABLE message is used when joining two ad hoc networks together. Instead of propagating a succession of ADD DEVICE messages received from the new ad hoc network, the new ad hoc network's name manager table is passed to the existing ad hoc network. This embodiment enables the first device in the existing ad hoc network forming the connection with the new ad hoc network, to perform only once, all of the processing necessary to resolve name conflicts in both ad hoc networks. The resulting composite name manager table includes all of the name records contributed by both the new ad hoc network, as well as those in the existing ad hoc network. The resulting composite name manager table is the operand portion of the COMPOSITE TABLE message. The COMPOSITE TABLE message is then propagated from the first device in the existing ad hoc network forming the connection to the new ad hoc network, to the rest of the existing ad hoc network. The corresponding first device in the new ad hoc network forming the connection to the existing ad hoc network, forms its own COMPOSITE TABLE message and propagates it to the rest of the new ad hoc network. This embodiment allows a selection to be made in the tradeoff between optimizing the average processing load on the devices and optimizing the bandwidth necessary to communicate updates from device to device in the networks.

Four example ad hoc network standards are described to embody the invention, the Bluetooth standard, the IEEE 802.11 Wireless LAN standard, the HIPERLAN Type 1 standard, and the HIPERLAN Type 2 standard. However, in addition to these four standards, the invention also applies to other wireless standards. The invention's principle of automatically resolving naming conflicts throughout an ad hoc network, is equally useful in many other wireless standards. The invention applies, for example, to the Infrared Data Association (IrDA) standard, the Digital Enhanced Cordless Telecommunications (DECT) standard, the Shared Wireless Access Protocol (SWAP) standard, the IEEE 802.15 Wireless Personal Area Network (WPAN) standard, the Japanese 3rd Generation (3G) wireless standard, and the Multimedia Mobile Access Communication (MMAC) Systems standard of the Japanese Association of Radio Industries and Businesses. The invention enables each of these wireless standards to automatically resolve naming conflicts throughout an ad hoc network.

The resulting invention unambiguously associates a name entered by the user with the device address of the user's wireless device, and distributes that name throughout the ad hoc network. The resulting invention enables a member of an ad hoc network to select the user's displayed name on the member's wireless device, and have the user's address automatically appended to a message to be sent by the member to the user's device. The resulting invention reliably resolves naming conflicts between members with the same selected device name, which they have distributed throughout an ad hoc network. The resulting invention solves the problem of resolving device name conflicts when adding devices to existing ad hoc networks or when joining two ad hoc networks together.

DESCRIPTION OF THE FIGURES

FIG. 1 applies to all short range wireless standards supporting ad hoc networks.

FIG. 1A shows an example generic wireless the enlarged ad hoc network 132, in which an additional wireless device 128 is being added as a seventh device to the ad hoc network. The figure illustrates the propagation of an ADD- DEVICE message, which the wireless device 128 distributes to the rest of the ad hoc network 132, to distribute its name to the network. The figure shows the incrementing of the hop count value attributed to the added device 128 as the ADD-DEVICE message transits each device in the ad hoc network. FIG. 1A applies to all short range wireless standards supporting ad hoc networks.

FIG. 1B applies to all short range wireless standards supporting ad hoc networks.

FIG. 1C applies to all short range wireless standards supporting ad hoc networks.

FIG. 1D applies to all short range wireless standards supporting ad hoc networks.

FIG. 1E shows name distribution messages, which are distributed by the wireless devices in an ad hoc network, to add a new device, delete a device, change the name of a device, substitute a new name manager table, specify security attributes for distributing the name, specify display attributes for displaying the name, and specify name flash display attributes for remotely flashing the displayed name. FIG. 1E applies to all short range wireless standards supporting ad hoc networks.

FIG. 1F applies to all short range wireless standards supporting ad hoc networks.

FIG. 1G applies to all short range wireless standards supporting ad hoc networks.

FIG. 1H shows two ad hoc networks 102 and 112, which are joining together by forming a new link 120. The figure shows the resolution of a name conflict between the two ad hoc networks by substituting an alternate name for the conflicted name in the name manager tables of the devices in the two ad hoc networks. FIG. 1H applies to all short range wireless standards supporting ad hoc networks.

FIG. 1L shows the application of the invention to multiple IEEE 802.11 Wireless LAN infrastructure basic service sets 102(I), 112(I), and 122(I).

FIG. 1M shows the application of the invention to multiple HIPERLAN Type 2 Wireless LAN subnets 102(H2), 112(H2), and 122(H2).

FIG. 2A applies to all short range wireless standards supporting ad hoc networks.

FIG. 2B shows the name manager table 232 for the device 100. The figure shows the association of each device's address with its user-selected name and alternate name. The figure also shows a current hop count, a maximum hop count and a time stamp associated with each device's name. The figure also shows user selected display attributes for each respective name, such as font, color, alternate color, animation features, and sound. The figure also shows the inclusion of a display permission for each respective name. FIG. 2B applies to all short range wireless standards supporting ad hoc networks.

FIG. 2C applies to all short range wireless standards supporting ad hoc networks.

FIG. 3 applies to all short range wireless standards supporting ad hoc networks.

FIG. 3A is a network flow diagram of the process flow in the ad hoc network 132, illustrating the propagation of the DELETE DEVICE message for deleting the device 128 from the network. FIG. 3A applies to all short range wireless standards supporting ad hoc networks.

FIG. 3B is a network flow diagram of the process flow in the ad hoc network 132, illustrating the propagation of the DISPLAY-ATTRIBUTE message for changing the name color of the device 128 as it is displayed on the devices in the network. FIG. 3B applies to all short range wireless standards supporting ad hoc networks.

FIG. 3C applies to all short range wireless standards supporting ad hoc networks.

FIG. 3D is a network flow diagram of a first embodiment process flow in the ad hoc networks 102 and 112 of FIG. 1H, illustrating the process to join the two ad hoc networks. In particular, the figure shows the process of exchanging name manager tables between the two ad hoc networks and then distributing ADD DEVICE messages for the new devices being added to the two networks. FIG. 3D applies to all short range wireless standards supporting ad hoc networks.

FIG. 3E applies to all short range wireless standards supporting ad hoc networks.

FIG. 3F is a network flow diagram of an alternate embodiment of the process flow in the ad hoc network 132, illustrating the propagation of the composite name manager table 232" for adding the device 128 to the network. FIG. 3F applies to all short range wireless standards supporting ad hoc networks.

FIG. 3G is a network flow diagram of an alternate embodiment of the process flow in the ad hoc networks 102 and 112 of FIG. 1H, in which the existing name manager tables 232' are exchanged when joining the two ad hoc networks. FIG. 3G applies to all short range wireless standards supporting ad hoc networks.

DISCUSSION OF THE PREFERRED EMBODIMENT

This specification is organized into five major sections:
I. Generic Embodiment for All Short Range Wireless Systems
II. Example Embodiment Implemented in the Bluetooth Standard
III. Example Embodiment Implemented In The IEEE 802.11 Wireless LAN Standard
IV. Example Embodiments Implemented In The HIPER-LAN Standard
V. Other Wireless Standards
I. Generic Embodiment for All Short Range Wireless Systems This section is organized into the following subsections:
A. Overview
B. Process to Add New Device to Ad Hoc Network
C. Process to Delete Device from Ad Hoc Network
D. Process to Change Displayed Name Attributes in Network
E. Process to Flash Displayed Name in Ad Hoc Network
F. Process to Join Two Ad Hoc Networks
G. The Wireless Device
A. Overview FIGS. 1, 1A to 1H, 2A to 2C, 3, and 3A to 3E describe the generic embodiment of the invention, which applies to all short range wireless systems supporting ad hoc networks.

Figure 1:
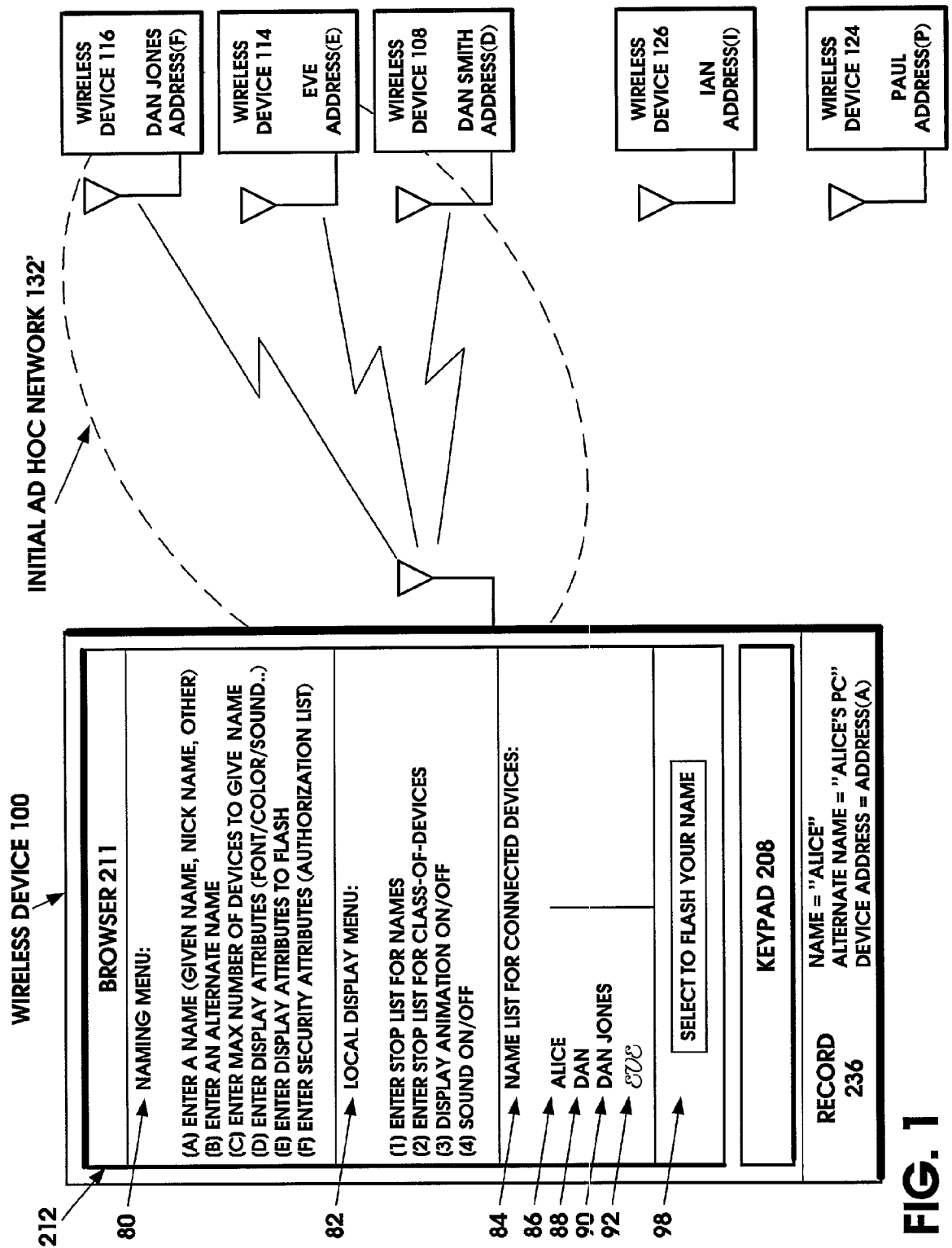
FIG. 1 shows an example appearance of the wireless device 100 and the naming menu 80 displayed to the user for entering the user's name, alternate name, the maximum number of devices to which to distribute the name, and other attributes of the name to be distributed to the ad hod network. The browser 211 of the device 100 displays a name list 84 the names of four wireless devices connected in the initial ad hoc network 132'.

FIG. 1 shows an example appearance of the wireless device 100 used by a user named Alice, which includes a display 212 that displays a naming menu 80 in its browser 211. The naming menu enables Alice to enter her name or any alternate name, specify the conditions under which it will be distributed, and design the appearance in which it will be displayed on other devices in the ad hoc network 132' of which she has become a member. The user Alice has become a member of an initial ad hoc network 132' consisting of her wireless device 100 and three other devices, wireless device 108 used by a user named Dan Smith, wireless device 114 used by a user named Eve, and wireless device 116 used by a user named Dan Jones. Each of these devices is similarly equipped with a naming menu in its browser.

In accordance with one aspect of the invention, the name or alternate name entered in the naming menu 80 is associated with the device address of the respective wireless device. For example, the four users in FIG. 1 may be running a distributed program, such as a game 95 shown in FIG. 1G, in which messages 97 are exchanged between the players as a part of the game. When the Alice's name is displayed in the browser of Dan Jones' wireless device 116 during the course of the game, the access code for Alice's device 100 is associated with the display of the Alice's name, such as by means of a hyperlink displayed with her name 86 on Dan's device 116. Name records 236 for each of the wireless devices 100, 108, 114, and 116 in the ad hoc network 132' are stored in Dan's device 116. When Dan Jones selects Alice's name 86 displayed by the browser 211 in his device 116, Alice's access code ADDRESS(A) is accessed from her name record 236 stored in Dan's device 116. Alice's access code is appended to a message 97, which has been prepared by Dan, and the message is automatically sent to Alice's device 100 where it is received as message 97'.

The browser 211 in Alice's wireless device 100 of FIG. 1, also displays a local display menu 84, which allows Alice to specify how names are displayed on her own device. A stop list can be entered of user names that are not to be displayed. A stop list can be entered of classes of devices that are not to be displayed, such as vending machines. Since names can be animated accompanying a name flash in a display, Alice can specify that this feature be selectively not displayed on her browser. Alice can also specify that the sound accompanying a name flash, is to be turned off in her device.

The browser 211 in Alice's wireless device 100 of FIG. 1, also displays a name list for the devices 100, 108, 114, and 116 connected in the ad hoc network 132' of FIG. 1. In accordance with an aspect of the invention, the three names "ALICE" 86, "DAN" 88, and "DAN JONES" 90 are displayed in the Arial font in the color of black, as has been specified by these three users. The fourth user Eve has designed her name to be displayed as "EVE" 92 in a script font and in a different color.

The browser 211 in Alice's wireless device 100 also displays the button 98 labeled "SELECT TO FLASH YOUR NAME". In accordance with an aspect of the invention, when actuated, the display of Alice's name 86 is flashed on the browsers of the other users in the ad hoc network.

Alice's wireless device 100 also includes a key pad 208 for the user to type in commands and text and a pointing device to control the position of a cursor on the display 212. Alice's device 100 stores a name record 236 that specifies, among other things, Alice's selected name "ALICE" and alternate name "ALICE'S PC", which it associates, with the device address "ADDRESS(A)".

B. Process to Add New Device to Ad Hoc Network

Note in FIG. 1 that there are two users with the first name of "Dan", each of whom has selected that name as his primary name to be distributed in the ad hoc network 132'. An important feature of the invention is the mechanism used for distributing the user's selected name throughout an ad hoc network so as to resolve name conflicts, which may occur when two users have selected the same name. In accordance with an aspect of the invention, a set of name distribution messages is employed, each of which includes a device address for the device to which it pertains, an op code portion to identify its function, and an operand portion to provide the user's selected names or other values. An example set of name distribution messages is shown in FIG. 1E.

Among set of name distribution messages is the ADD DEVICE message 244, that includes the address of the device to be added, the op code ADD_DV that specifies the purpose of the message is to add a device, and an operand portion that includes the primary name "MARK" selected by the user and an alternate name "MARK'S PC" selected by the user to be substituted for the primary name in the event of a name conflict Also included in the operand portion of message 244 is a current hop count value for the device to be added, which begins with the value "0" and is incremented by "1" as the ADD-DEVICE message transits, during its distribution, each existing device in the ad hoc network. The current hop count value is stored as CURRENT HOP CNT in the operand portion of the ADD DEVICE message 244.

Figure 1B:
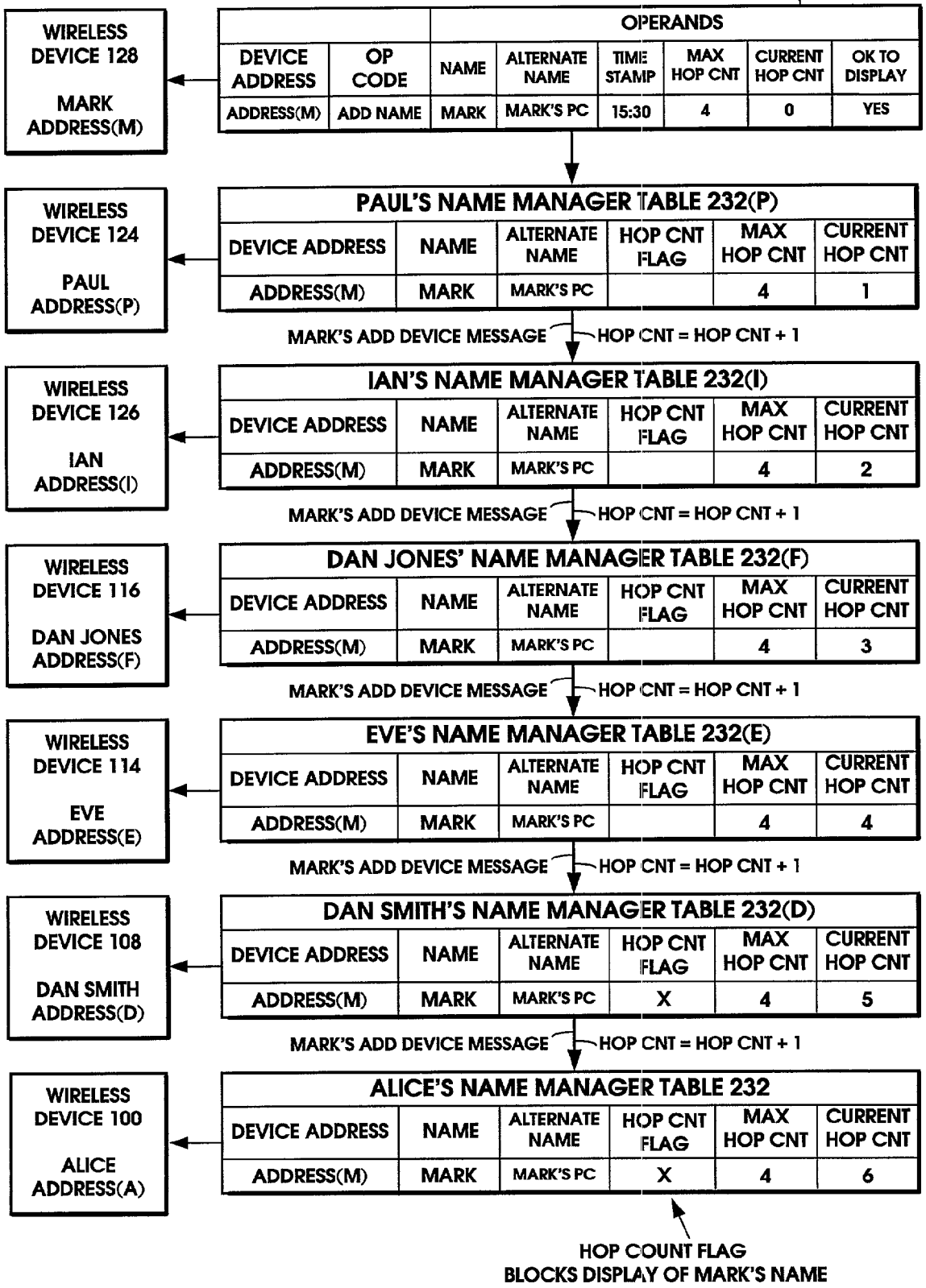
FIG. 1B shows an example format of the ADD-DEVICE message 244(M), which the wireless device 128 distributes to the rest of the enlarged ad hoc network 132, to distribute its name to the network. The figure shows the incrementing of the hop count value attributed to the added device 128, as it appears in the name manager table of each device receiving the ADD-DEVICE message 244(M) in the ad hoc network.
Figure 3:
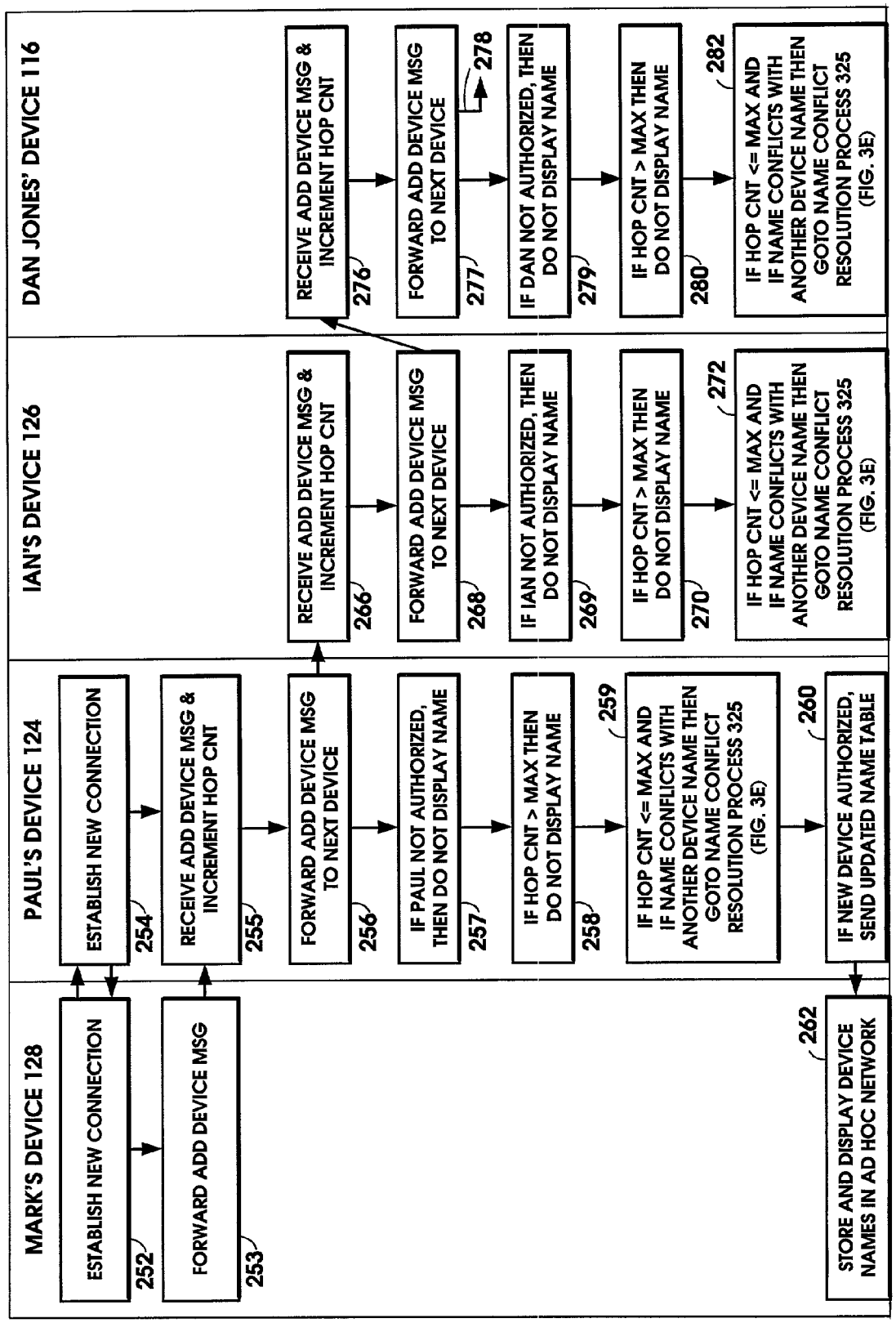
FIG. 3 is a network flow diagram of a first embodiment process flow in the ad hoc network 132, illustrating the propagation of the ADD-DEVICE message for adding the device 128 to the network.

FIG. 1A, shows the propagation of the ADD-DEVICE message 244(M) to add Mark's wireless device 128 to the ad hoc network 132. FIG. 1A applies to all short range wireless standards supporting ad hoc networks. The FIG. 1A shows the incrementing of the current hop count value attributed to Mark's added device 128 as the ADD-DEVICE message transits each existing device in the ad hoc network. As shown in FIG. 1, in addition to specifying a name or alternate name on the naming menu 80, the user may also enter a maximum hop count value, which is the maximum number of devices to which his/her name may be given. This value is stored as MAX HOP CNT in the operand portion of the ADD DEVICE message 244(M). As the user, Mark's ADD DEVICE message 244(M) propagates through consecutive ones of the wireless devices 124, 126, 116, 114, 108, and 100 in FIG. 1A, the current hop count value CURRENT HOP CNT in the message is incremented by "1" and is compared with the value of MAX HOP CNT. This process is shown in FIG. 3, which is a network flow diagram of the process flow in the ad hoc network 132, illustrating the propagation of the ADD-DEVICE message for adding the device 128 to the network. The effect of processing the ADD-DEVICE message in each consecutive wireless device 124, 126, 116, 114, 108, and 100 is shown in FIG. 1B. FIG. 1B shows the incrementing of the current hop count value attributed to Mark's added device 128, as it appears in the name manager table 232 stored in each consecutive device receiving Mark's ADD-DEVICE message 244(M) in the ad hoc network. FIG. 1B applies to all short range wireless standards supporting ad hoc networks.

A portion of the process to add a new device is shown in FIG. 3 for the first three devices in the ad hoc network 132, Paul's device 124, Ian's device 126, and Dan Jones' device 116. The process continues through the remaining devices 114, 108, and 100. Before joining the ad hoc network 132, the user Mark enters his primary name "MARK", an alternate name "MARK'S PC", and the maximum hop count value of "4" that be desires, into his naming menu 80. These values are stored as operands in the ADD DEVICE message 244(M) of FIG. 1B. Mark's device 128 then joins the ad hoc network 132 in step 252, by forming a communications link with Paul's wireless device 124 in step 254, using the appropriate short range wireless system protocol to establish a wireless connection. This can be the protocol to establish a connection in the Bluetooth standard, in the IEEE 802.11 Wireless LAN standard, in the HIPERLAN Type 1 standard, in the HIPERLAN Type 2 standard, or in other wireless standards. Mark's wireless device 128 then sends the ADD DEVICE message 244(M) of FIG. 1B, to Paul's wireless device 124 in step 253.

Paul's wireless device 124 receives the ADD DEVICE message 244(M) in step 255 of FIG. 3. FIG. 2C is a functional block diagram of the op code parser 242 in the application group 234 for the device 100 of FIG. 2A, which is substantially identical to Paul's wireless device 124. The op code parser 242 interprets the op code field ADD_DV of name distribution messages to be processed by the device and in response to the ADD DEVICE message 244(M), invokes subroutine 201 in the application program 238 to process the ADD DEVICE message 244(M).

Step 255 of FIG. 3 increments the current hop count value of "0" by "1", and writes the new value of "1" into the CURRENT HOP CNT field of the A/D DEVICE message 244(M). FIG. 1B shows the name manager table 232(P) in Paul's device 124, in which a name record is created for Mark's device 128, to store information copied from Mark's ADD DEVICE message 244(M). Among the fields in the name manager table 232(P) are DEVICE ADDRESS, NAME, ALTERNATE NAME, HOP CNT FLAG, MAX HOP CNT, and CURRENT HOP CNT. The values copied from Mark's ADD DEVICE message 244(M) are DEVICE ADDRESS ="ADDRESS(M)", NAME="MARK", ALTERNATE NAME="MARK'S PC", MAX HOP CNT="4", and CURRENT HOP CNT="1". An example of a name manager table 232 similar to the name manager table 232(P) in Paul's device 124, is shown in FIG. 2B for Alice's device 100.

FIG. 2B shows the name manager table 232 for the device 100. Each device maintains its own name manager table 232. The figure shows name records 236 for each device in the ad hoc network. Each name record associates its device's address with its user-selected name and alternate name. Each name record 236 includes a current hop count, a maximum hop count and a time stamp associated with each device's name. A conflict flag is stored in field 231 and a hop count flag is stored in field 233. Each name record 236 includes, user selected display attributes for each respective name, such as font, color and alternate color in field 235, animation features in field 237, and sound in field 239. Each name record 236 includes a display permission in field 241 for each respective name.

Step 255 then flows to step 256 where the ADD DEVICE message 244(M) with its newly incremented hop count value of "1" is forwarded to the next device, which is Ian's wireless device 126. Step 256 in Paul's device 124, flows to step 257 where a determination is made as to whether Paul is authorized to display with his device 124, the name or alternate name provided in the received ADD DEVICE message 244(M). Reference to the ADD DEVICE message 244(M) in FIG. 1B shows that the operand portion of the message includes a field "OK TO DISPLAY", in which the user Mark has stored a "YES" value. This field gives a blanket authorization to all receiving devices, if its value is "YES". The "YES" permission is stored in the display permission in field 241 of the name manager table 232.

Alternately, if the value is "NO", then there is no blanket authorization granted by the user Mark to display his name or alternate name. The lack of permission is stored as a value "NO" in the display permission in field 241 of the name manager table 232. In order to enable a device receiving an ADD DEVICE message without a blanket authorization, to display the name or alternate name provided in the message, a subsequent SECURITY ATTRIBUTES message 248, shown in FIG. 1E, must be received from the user Mark. The SECURITY ATTRIBUTES message 248, shown in FIG. 1E, includes Mark's device address ADDRESS(M), an op code SEC_ATTR to identify its function as a security attribute message, and an operand portion that includes an AUTHORIZATION LIST. If the AUTHORIZATION LIST includes the name of a device, then that receiving device is authorized to display Mark's name or alternate name. In the example SECURITY ATTRIBUTES message 248 shown in FIG. 1E, the authorization list includes "ALICE", "IAN", and "PAUL". Thus, in this example, if Mark's ADD DEVICE message 244(M) had specified "NO" in the "OK TO DIS- PLAY" field, then Dan Jones' device 116 would not have received authorization, and his device would be restricted from displaying Mark's names. This restriction can be enforced by appropriate cryptographic techniques.

As an example of a method to enforce the restriction of name display, the SECURITY ATTRIBUTES message 248 of FIG. 1E includes fields for DIGITAL SIGNATURE, CERTIFICATE, and PUBLIC KEY. Each device in the ad hoc network can distribute its public key and a trust certificate verifying the authenticity of its public key, signed by a trusted third party. Each device retains a private key corresponding to its own public key, to enable it to decrypt messages encrypted under its public key. Public keys can be used to restrict which devices can display a name. For example, the expression of the originating user Mark's name "MARK" and his alternate name "MARK'S PC" stored in the operand portion of the ADD DEVICE message 244(M), can be encrypted under the public key of an intended recipient, such as the public key of the user Paul. Then, only Paul's device 124 can decrypt the originating user Mark's name "MARK" and his alternate name "MARK'S PC", which is then capable of display with Paul's device 124. The originating user Mark's name and his alternate name can be accompanied with a message authentication code to insure the integrity of the data. Alternately, the NAME and ALTERNATE NAME fields of Mark's ADD DEVICE message 244(M) can be left blank and a "NO" value specified in its "OK TO DISPLAY" field. Then the originating user Mark's name "MARK" and his alternate name "MARK'S PC" can be encrypted under Paul's public key and stored with their message authentication codes in the AUTHORIZATION LIST of the SECURITY ATTRIBUTES message 248. Then, only Paul's device 124 can decrypt the originating user Mark's name "MARK" and his alternate name "MARK'S PC", which is then capable of display with Paul's device 124. Methods to provide message authentication to insure the integrity of data are described in the book by Stephen Thomas entitled *SSL and TLS,* published by John Wiley and Sons, 2000. Two example algorithms for message authentication are RSA's Message Digest (MD5) and the Secure Hash Algorithm (SHA), both of which are described in the book by Stephen Thomas. Another reference that goes into greater detail in its discussion of data integrity methods is the book by Bruce Schneier entitled *Applied Cryptography*-2nd Edition" published by John Wiley and Sons., 1996. The originating user, Mark's digital signature can be used to sign the name "MARK" and his alternate name "MARK'S PC", to insure that Mark is the true source of the name and alternate name. Methods to generate and evaluate digital signatures are described in the book by Richard E. Smith entitled *Internet Cryptography,* published by Addison Wesley, 1997.

Step 257 of FIG. 3 flows to step 258, where Paul's device 124 determines if the current hop count value of "1" for Mark's device, in the name manager table 232(P), is greater than the value "4" in the MAX HOP CNT field. If it is, then a hop count flag is set in the HOP CNT FLAG field 233 of the name manager table 232(P), which will prevent the Mark's name or alternate name from being displayed. In this stage of the example, the hop count flag is not set and thus Mark's name is not prevented from display with Paul's device 124.

Step 258 of FIG. 3 flows to step 259, where Paul's device 124 determines if the primary name "MARK" in Mark's ADD DEVICE message 244(M) conflicts with another device name currently in the name manager table 232(P) in Paul's device 124. If there is a conflict, then one of those two conflicting devices must have its alternate name substituted for its primary name. This determination is performed by the resolution process 325 shown in the flow diagram of FIG. 3E. An example of a name manager table 232 similar to the name manager table 232(P) in Paul's device 124, is shown in FIG. 2B for Alice's device 100. There it is seen that name manager table 232 stores the primary names and the alternate names of all of the devices 124, 126, 116, 114, 108, and 100 in the ad hoc network of FIG. 1A. Step 259 compares the primary name "MARK" in Mark's ADD DEVICE message 244(M) with each of the respective names "PAUL", "IAN", "DAN JONES", "EVE", "DAN", and "ALICE". Note that where an existing name already has a conflict flag "X" in field 231, for example where the alternate name "DAN JONES" has been substituted for the primary name "DAN", then step 259 compares the primary name "MARK" of the added device 128 with the existing alternate name "DAN JONES" of the device 116.

Figure 2A:
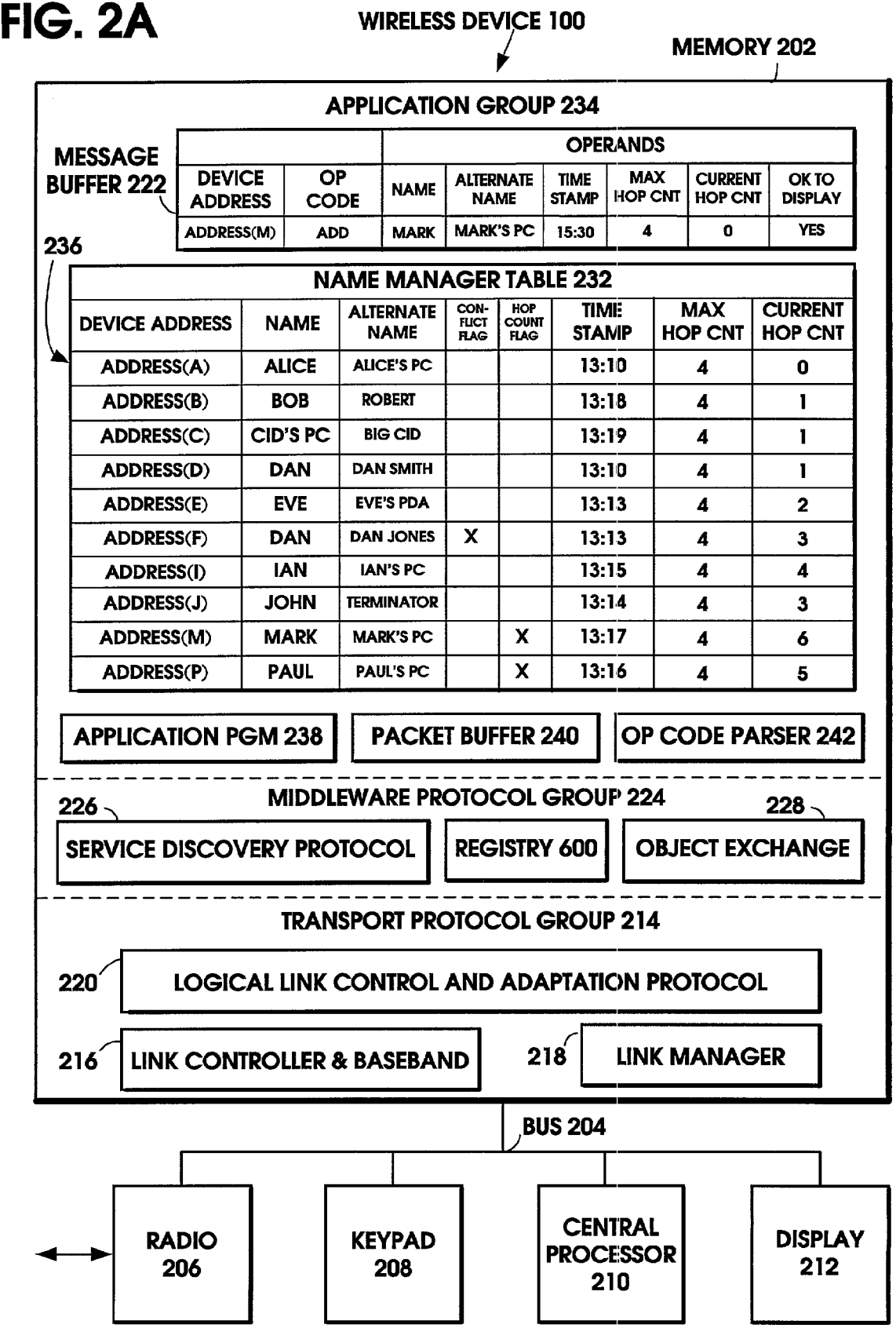
FIG. 2A is a functional block diagram of the wireless device 100, showing the application group 234, the middleware protocol group 224, and the transport protocol group 214.
Figure 3C:
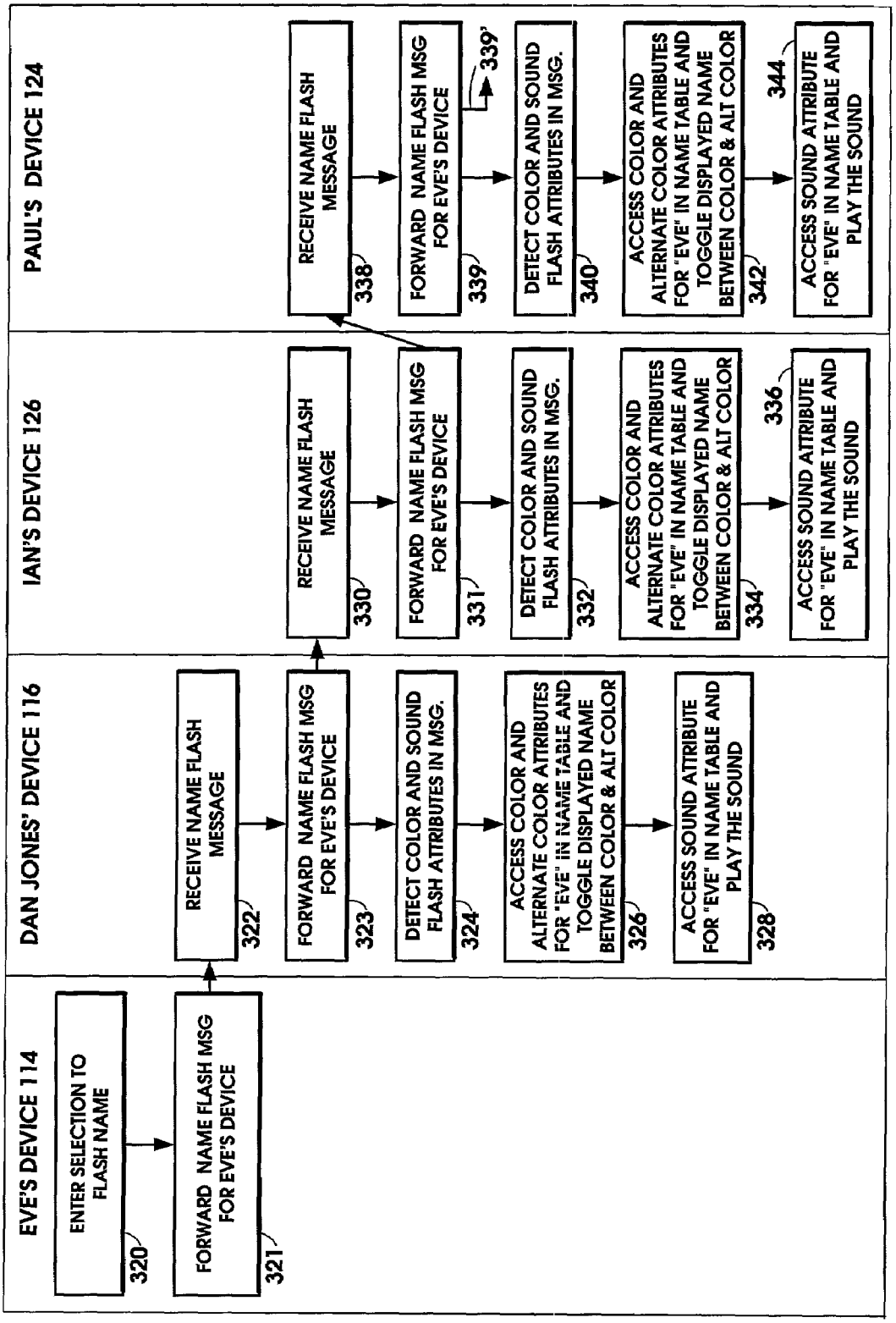
FIG. 3C is a network flow diagram of the process flow in the ad hoc network 132, illustrating the propagation of the NAME-FLASH message for toggling the name color, and other display attributes of the device 128, as they are displayed on the devices in the network.
Figure 3E:
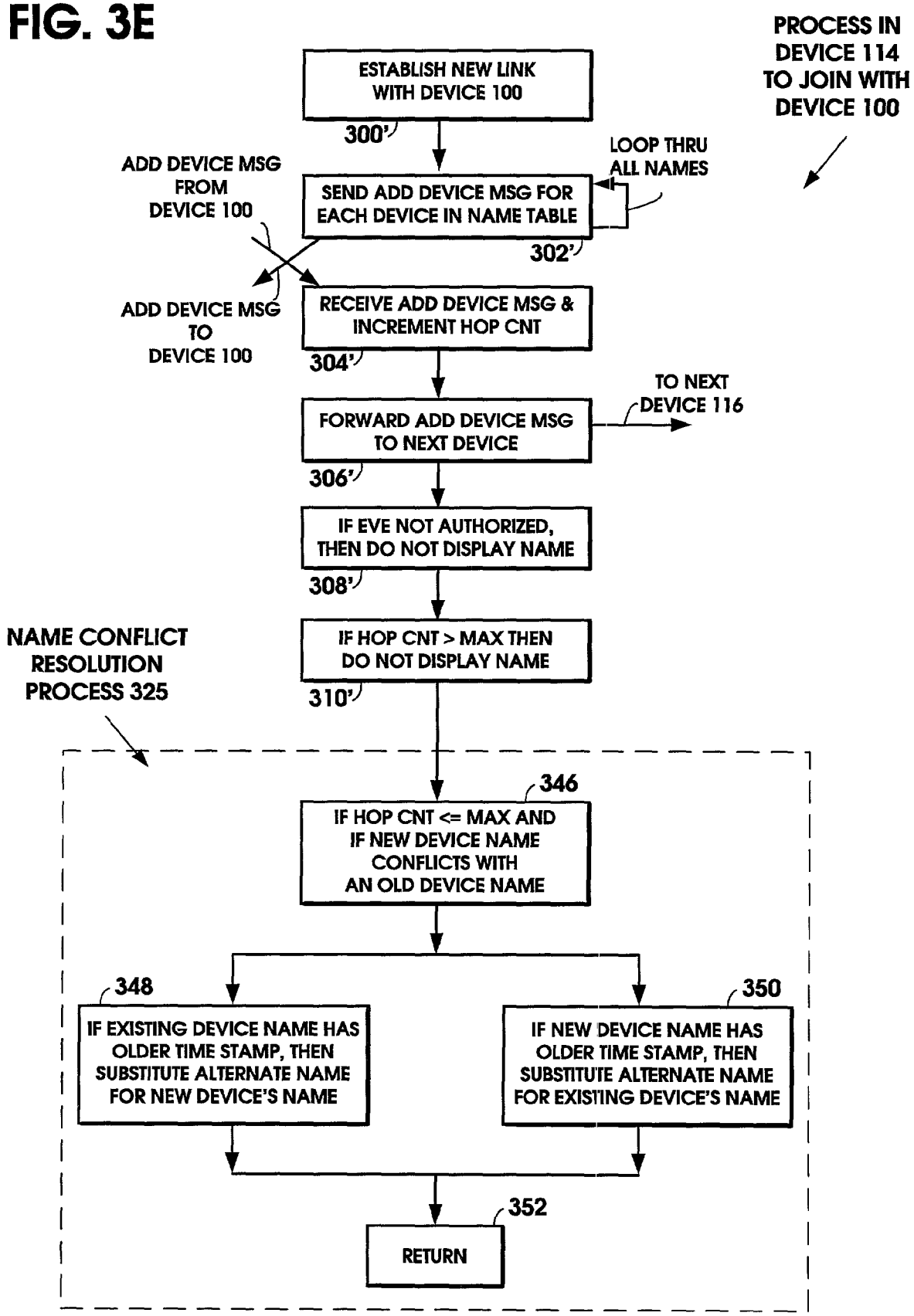
FIG. 3E is a process flow diagram showing the process 325 to resolve name conflicts when joining devices 114 and 100 in FIG. 3D.

The resolution process 325 shown in the flow diagram of FIG. 3E makes use of the TIME STAMP field in the name manager table 232. Each ADD DEVICE message 244 includes a TIME STAMP field. The TIME STAMP field in Mark's ADD DEVICE message 244(M) contains the value "15:30", which is the time at which Mark's device completed its connection to the ad hoc network 132. The value in the TIME STAMP field in Mark's ADD DEVICE message 244(M) is copied into each name manager table 232, as shown in FIG. 2B. In step 346 of name conflict resolution process 325 of FIG. 3E, if the primary name "MARK" in Mark's ADD DEVICE message 244(M) conflicts with another device name currently in the name manager table 232(P) in Paul's device 124, then the program flows to either step 348 or step 350. The value of a time stamp can be the local time of day, the time of day expressed in coordinated universal time (UTC), or the instant of occurrence of other events, such as the manufacturing date of the device, the user's birth date, or the user's starting date with an organization of which he/she is a member.

In step 348, if the existing device in the ad hoc network has the older time stamp, then Mark's device's alternate name "MARK'S PC" must be substituted for its primary name "MARK". In step 350, if Mark's added device 128 has the older time stamp, then the existing device in the ad hoc network must have its alternate name substituted for its primary name. Then steps 348 and 350 flow to the return step 352. In an alternate embodiment, younger time stamps can be preferred over older time stamps.

Step 259 in FIG. 3 than flows to step 260, where it is determined in Paul's device whether Mark's device 128 to be added is authorized to join the ad hoc network 132. This determination can be based on a prior blanket prohibition against the addition of certain types of devices or particular user names, which can be provided in a stop list entered by the user Paul. The browser 211 in the wireless device 100 shown in FIG. 1, displays a local display menu 84, which allows the user to specify user names or classes of devices that are not to be connected, such as vending machines. If Mark's device 128 is authorized to join the ad hoc network 132, then step 260 sends a copy of the updated name manager table 232 to Mark's device 128. This is accomplished by forming an ADD DEVICE message 244 for each name record in the name manager table 232(P) of Paul's device 124 and forwarding it to Mark's device 128.

Step 260 then flows to step 262 in Mark's device 128, where each name record in the updated name manager table 232 is received and stored as Mark's name manager table.

Mark's device 128 can then display the names of the devices in the ad hoc network 132 shown in FIG. 1A.

If any of the devices in the ad hoc network 132 is not aware of the process to add a new device in FIG. 3, then when that unaware device receives the ADD DEVICE message 244, it will respond with an error message. In response to this error message, the forwarding device will use any alternate wireless connections that it currently has or which it can establish to any other devices in the network, to continue the propagation of the ADD DEVICE message 244. Reference can be made to FIG. 1I, which shows the ad hoc network 132 of FIG. 1A embodied as an IEEE 802.11 Wireless LAN independent basic service set (IBSS) 132(I). Wireless devices in IEEE 802.11 ad hoc networks operating in the independent configuration mode, communicate directly with one another and can establish alternate paths, as shown in FIG. 1I, to circumvent unaware devices. Reference can also be made to FIG. 1J, which shows the ad hoc network 132 of FIG. 1A embodied as a HIPERLAN Type 2 Wireless LAN subnet 132(H2). Wireless devices in HIPERLAN Type 2 ad hoc networks communicate directly with one another and can establish alternate paths to circumvent unaware devices. Reference can also be made to FIG. 1K, which shows the ad hoc network 132 of FIG. 1A embodied as a Bluetooth scatternet 132(BT) composed of multiple, interconnected piconets. All communication in Bluetooth scatternet ad hoc networks is directed between the master device and each respective slave device in a piconet. Any Bluetooth device can belong to two piconets, and can either be a slave device in both piconets or a slave device in one piconet and a master device in the other. Bluetooth devices in the scatternet ad hoc network 132(BT) can establish alternate paths to circumvent unaware devices by establishing memberships in more than one piconet.

Figures 1C, 1D:
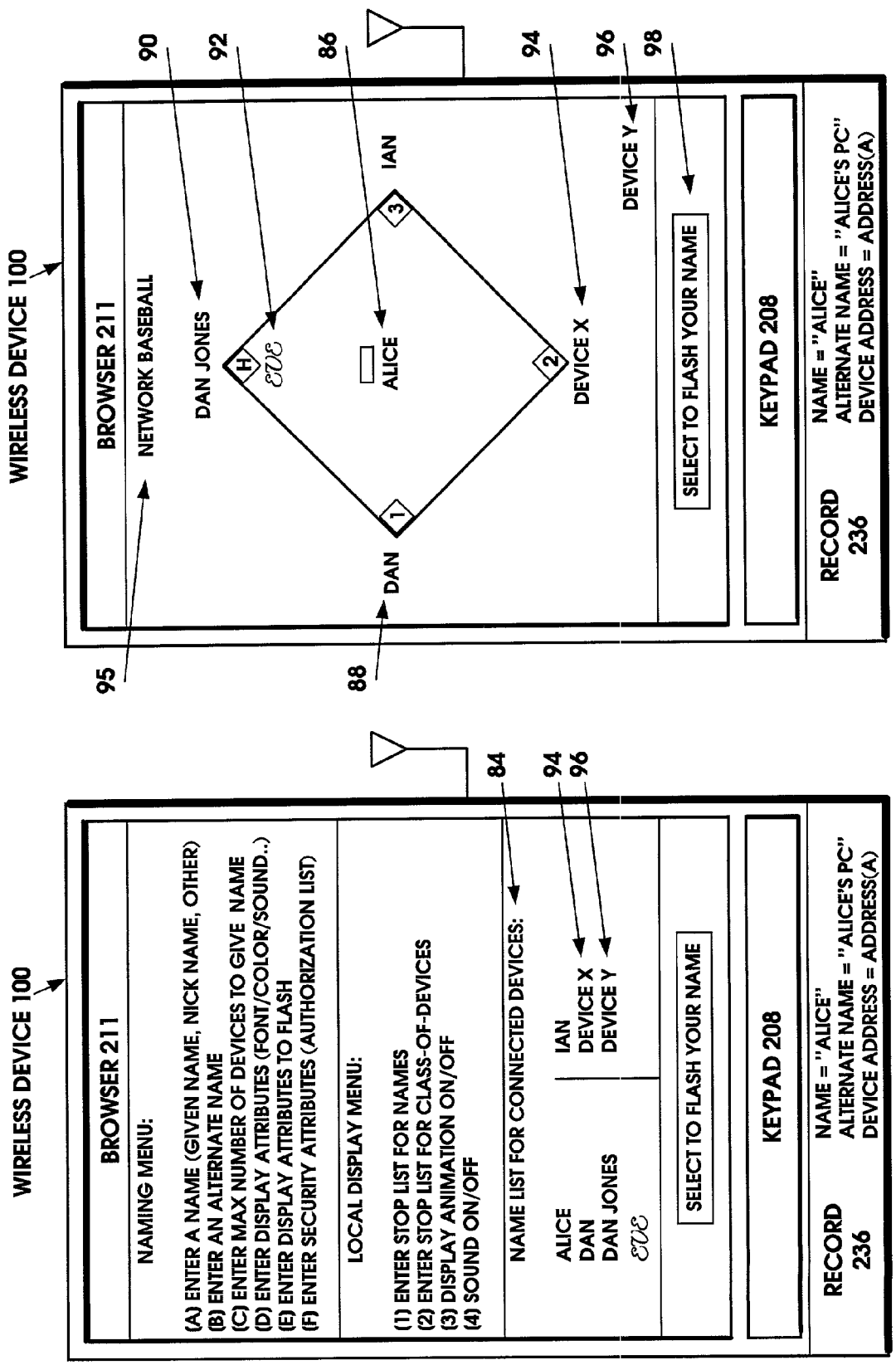
FIG. 1C shows an example appearance of the wireless device 100, in which the browser 211 displays the name list 84 with the names of the seven wireless devices connected in the enlarged ad hoc network 132 shown in FIG. 1A.
FIG. 1D shows an example appearance of the wireless device 100, in which the browser 211 displays a network baseball game application 95, which displays the names of some of the wireless devices connected in the enlarged ad hoc network 132 shown in FIG. 1A.

FIG. 1C shows an example appearance of Alice's wireless device 100, in which the browser 211 displays the name list 84 with the names of the seven wireless devices connected in the ad hoc network 132 shown in FIG. 1A. FIG. 1C applies to all short range wireless standards supporting ad hoc networks. Note that the CURRENT HOP COUNT for Paul's device 124 is "5", which is greater than the MAX HOP CNT in Alice's name manager table 232 of FIG. 2B. Also notice that the CURRENT HOP COUNT for Mark's device is "6", which is greater than the MAX HOP CNT in Alice's name manager table 232 of FIG. 2B. Thus, neither Paul's device name 94 nor Mark's device name 96 is displayed in Alice's browser 211 in FIG. 1C. FIG. 1D shows an example appearance of the wireless device 100, in which the browser 211 displays a network baseball game application 95, which displays the names of some of the wireless devices connected in the ad hoc network 132 shown in FIG. 1A. Neither Paul's device name 94 nor Mark's device name 96 is displayed in Alice's browser 211 in FIG. 1D. Optional substitute, generic names can be displayed, such as "DEVICE X" for Paul's name 94 and "DEVICE Y" for Mark's name 96. FIG. 1D applies to all short range wireless standards supporting ad hoc networks.

The network process of FIG. 3 continues in a similar fashion as described for Paul's device 124, by propagating Mark's ADD DEVICE message 244(M) to Ian's device 126. Steps 266, 268, 269, 270, and 272 in Ian's device 126 respectively correspond to steps 255, 256, 257, 258, 259, and 260 of Paul's device 124.

Similarly, the network process of FIG. 3 continues in a similar fashion as described for Paul's device 124, by propagating Mark's ADD DEVICE message 244(M) to Dan Jones' device 116. Steps 276, 277, 279, 280, and 282 in Dan Jones' device 116 respectively correspond to steps 255, 256, 257, 258, 259, and 260 of Paul's device 124. Step 277 in Dan Jones device 116 passes Mark's ADD DEVICE message 244(M) to Eve's device 114 in FIG. 1A over path 278, where it is similarly processed. Mark's ADD DEVICE message 244(M) is similarly passed to Dan Smith's device 108 and Alice's device 100 in FIG. 1A, where it is similarly processed.

In an alternate embodiment of the invention, there may be additional alternate names provided for each device, to enable a second, third or more choices in resolving naming conflicts. The plurality of alternate names would be provided for a device, in its name distribution message and in its name record in the name manager table. The name conflict flag in field 231 of the name record for a device in this alternate embodiment, would store an index value identifying which of the plurality of alternate names was chosen for the device.

FIG. 3F is a network flow diagram of an alternate embodiment of the process flow in the ad hoc network 132, illustrating the propagation of the composite name manager table 232" of FIG. 1H, for adding the device 128 to the ad hoc network 132. FIG. 3F applies to all short range wireless standards supporting ad hoc networks. This alternate embodiment to add a new device uses the COMPOSITE TABLE message 247 of FIG. 1E. The op code portion of the COMPOSITE TABLE message 247 contains the op code "TABLE" that distinguishes this type of name distribution message from other types. Instead of propagating an ADD DEVICE message 244 received from the new device 128 in FIG. 1A, the new device's entire name manager table 232 is passed to the ad hoc network 132. This embodiment enables the first device (Mark's device 124 in FIG. 1A) in the ad hoc network forming the connection with the new device (Paul's device 128 in FIG. 1A), to perform only once, all of the processing necessary to resolve name conflicts in the ad hoc network. The resulting composite name manager table 232" includes all of the name records contributed by both the new device, as well as those in the ad hoc network that it is joining. FIG. 1H shows Alice's device 100 forming a connection to Eve's device 114 to join the ad hoc network 112, but the principle is the same as that for Mark's device 128 forming a connection with Paul's device 124 to join the ad hoc network 132 of FIG. 1A. In FIG. 1H, the resulting composite name manager table 232" includes all of the name records in the existing table 232' contributed by the Alice's new device 100, as well as all of the name records in the existing table 232(E)' contributed by the ad hoc network 112 that it is joining. Note that composite name manager table 232" formed in Alice's device 100 is identical with the composite name manager table 232(E)" formed in Eve's device 114, except for their differing hop count values. The resulting composite name manager table 232" is the operand portion of the COMPOSITE TABLE message 247 for Alice's device 100. The resulting composite name manager table 232(E)" is the operand portion of the COMPOSITE TABLE message 247 for Eve's device 114. The COMPOSITE TABLE message 247 is then propagated from the first device (Eve's device in FIG. 1H or Paul's device 124 in FIG. 1A) in the ad hoc network forming the connection, to the rest of the ad hoc network (network 112 for Eve's device in FIG. 1H and network 132 for Paul's device in FIG. 1A, respectively). This embodiment allows a selection to be made in the tradeoff between optimizing the average processing load on the devices and optimizing the bandwidth necessary to communicate updates from device to device in the network.

FIG. 3F shows Mark's device 128 joins the ad hoc network 132 in step 252, by forming a communications link with Paul's wireless device 124 in step 254, using the appropriate short range wireless system protocol to establish a wireless connection. Mark's wireless device 128 then sends its existing name manager table 232(M)', to Paul's wireless device 124 in step 402.

Paul's wireless device 124 receives the Mark's existing name manager table 232(M)' in step 404 of FIG. 3F. Step 404 increments the current hop count value of all name records in Mark's existing name manager table 232(M)'. Step 406 then appends Mark's existing name manager table 232(M)' to Paul's existing name manager table 232(P)' to form the composite name manager table 232(P)". The resulting composite name manager table 232(P)" includes all of the name records in the Mark's existing table 232(M)' contributed by the Mark's device 128, as well as all of the name records in Paul's existing table 232(P)' contributed by the ad hoc network 132 that Mark's device 128 is joining.

Step 408 of FIG. 3F loops through all of the name records of the devices in the composite name manager table 232(P)". If there are any name conflicts between any of the name records of any of the devices in the composite name manager table 232(P)", then the program goes to the name conflict resolution process 325 of FIG. 3E.

In step 410 of FIG. 3F, the resulting composite name manager table 232(P)", which includes the resolved name conflicts, is formed into the operand portion of the COMPOSITE TABLE message 247 for Paul's device 124. The COMPOSITE TABLE message 247 is then propagated from the Paul's device 124 in FIG. 1A to devices Ian's device 126 in the ad hoc network 132.

In step 410 of FIG. 3F, the COMPOSITE TABLE message 247 is also propagated from the Paul's device 124 in FIG. 1A back to Mark's device 128, but without having incremented the hop count for Mark's name record.

In step 412, Paul's device substitutes the composite name manager table 232(P)" for Paul's existing name manager table 232(P)'.

In step 414, Mark's device 128 receives the COMPOSITE TABLE message 247 and increments all hop counts in the composite table 232(P)", except its own hop count. Step 414 then flows to step 416, which substitutes the composite table 232(P)", including the updated hop counts, for Mark's existing table 232(M)'.

Step 420 in Ian's device 126 of FIG. 1A, receives the COMPOSITE TABLE message 247 and increments all hop counts in the composite table 232(P)", which is contained in the in the message 247. Step 420 then flows to step 422, which propagates the COMPOSITE TABLE message 247, including its updated hop count values, to Dan Jones' device 116. Step 422 then flows to step 424, which substitutes the composite table 232(P)", including the updated hop counts, for the existing table 232(IAN)' in Ian's device 126.

Step 426 in Dan Jones' device 116 of FIG. 1A, receives the COMPOSITE TABLE message 247 and increments all hop counts in the composite table 232(P)", which is contained in the in the message 247. Step 426 then flows to step 428, which propagates the COMPOSITE TABLE message 247, including its updated hop count values, to the next device over path 429, which is Eve's device 114, followed by Dan Smith's device 108, followed by Alice's device 100. Step 428 then flows to step 430, which substitutes the composite table 232(P)", including the updated hop counts, for the existing table 232(IAN)' in Dan Jones' device 116.

C. Process to Delete Device from Ad Hoc Network

FIG. 3A is a network flow diagram of the process flow in the ad hoc network 132, illustrating the propagation of the DELETE DEVICE message 245 for deleting the device 128 from the network. The DELETE DEVICE message 245 is shown in FIG. 1E. Continuing with the example ad hoc network of FIG. 1A, Paul's device 124 periodically checks if Mark's device 128 is present in step 290 of FIG. 3A, by sending a "ping" signal. If there is no response after a given period, step 291 detects that Mark's device 128 is missing. The program then flows to step 292 in Paul's device 124, to forward a DELETE DEVICE message 245 to Ian's device 126, specifying the address of the missing device. The DELETE DEVICE message 245 shown in FIG. 1E includes Mark's device address "ADDRESS(M)" and the op code "DELETE_DV". Step 292 then flows to step 293 where Paul's device 124 deletes the name record for Mark's device 128 from Paul's name manager table 232(M).

Ian's device 126 receives the DELETE DEVICE message 245 at step 294 of FIG. 3A. FIG. 2C is a functional block diagram of the op code parser 242 in the application group 234 for the device 100 of FIG. 2A, which is substantially identical to Ian's wireless device 126. The op code parser 242 interprets the op code field DELETE_DV of name distribution messages to be processed by the device and in response to the DELETE DEVICE message 245, invokes subroutine 203 in the application program 238 to process the DELETE DEVICE message 245.

Step 294 of FIG. 3A flows to step 295. The network process of FIG. 3A continues in a similar fashion as described for Paul's device 124, by propagating Mark's DELETE DEVICE message 245 to Dan Jones' device 116. Step 295 then flows to step 296 where Ian's device 126 deletes the name record for Mark's device 128 from Ian's name manager table 232(I). Dan Jones' device 116 receives the DELETE DEVICE message 245 in step 297 and flows to step 298. The network process of FIG. 3A continues in a similar fashion as described for Paul's device 124, by propagating Mark's DELETE DEVICE message 245 to Eve's next device 114 over path 298', where it is similarly processed. Step 298 then flows to step 299 where Dan Jones' device 116 deletes the name record for Mark's device 128 from Dan Jones' name manager table 232(F). Mark's DELETE DEVICE message 245 is similarly passed to Dan Smith's device 108 and Alice's device 100 in FIG. 1A, where it is similarly processed.

FIG. 1E shows an additional name distribution message, the CHANGE NAME message 246 designated by the op code "CH_NAME". As its name suggests, this message contains the address of the device whose name or alternate name is to be changed. An example of their use is to carry out a change in the spelling of the name "MARK" to a different spelling "MARC".

D. Process to Change Displayed Name Attributes in Network

Returning to FIG. 1, in addition to specifying a name or alternate name on the naming menu 80, the user may also specify display attributes for the name, such as its font, preferred color, alternate color, animation features, and sounds to accompany the display of the name on the browsers of the other users in the ad hoc network. The user also has the option of specifying which of these display attributes may be briefly modified by a signal from the user, to flash the display of the name on the browsers of the other users in the ad hoc network, thereby drawing attention to the name. The user may also specify security requirements for the distribution of the name, such as an authorization list of those users who are allowed to display the name.

FIG. 1E shows the name distribution message NAME DISPLAY ATTRIBUTES message 249. FIG. 3B is a network flow diagram of the process flow in the ad hoc network 132, illustrating the propagation of the NAME DISPLAY ATTRIBUTES message 249 for changing the name color of the device 128 as it is displayed by the devices in the network. Continuing with the example ad hoc network of FIG. 1A, the user Mark of device 128 enters a display attribute change for the color of his name in step 300. Step 300 flows to step 301, which forwards the NAME DISPLAY ATTRIBUTES message 249 for Mark's device to Paul's device 124. The program then flows to step 302, which receives the message in Paul's device 124.

Paul's wireless device 124 receives the NAME DISPLAY ATTRIBUTES message 249 in step 302 of FIG. 3B. FIG. 2C is a functional block diagram of the op code parser 242 in the application group 234 for the device 100 of FIG. 2A, which is substantially identical to Paul's wireless device 124. The op code parser 242 interprets the op code field DISP_ATTR of name distribution messages to be processed by the device and in response to the NAME DISPLAY ATTRIBUTES message 249, invokes subroutine 205 in the application program 238 to process the NAME DISPLAY ATTRIBUTES message 249.

Step 302 flows to step 303 to forward the NAME DISPLAY ATTRIBUTES message 249 to Ian's device 126. The NAME DISPLAY ATTRIBUTES message 249 shown in FIG. 1E includes Mark's device address "ADDRESS(M)" and the op code "DISP_ATTR". The operands in NAME DISPLAY ATTRIBUTES message 249 are FONT="ARIAL", COLOR="RED", ALT. COLOR="BLACK", ANIMATION="NONE", SOUND="BEEP". Step 303 then flows to step 304 where Paul's device 124 changes the color attribute in field 235 of Mark's name record for Mark's device 128 in Paul's name manager table 232. Ian's device 126 receives the NAME DISPLAY ATTRIBUTES message 249 in step 305 and flows to step 306. The network process of FIG. 3B continues in a similar fashion as described for Paul's device 124, by propagating Mark's NAME DISPLAY ATTRIBUTES message 249 to Dan Jones' device 116. Step 306 then flows to step 307 where Ian's device 126 changes the color attribute for Mark's name record for Mark's device 128 in Ian's name manager table 232(I). Dan Jones' device 116 receives the NAME DISPLAY ATTRIBUTES message 249 in step 308 and flows to step 309. The network process of FIG. 3B continues in a similar fashion as described for Paul's device 124, by propagating Mark's NAME DISPLAY ATTRIBUTES message 249 to Eve's next device 114 over path 309', where it is similarly processed. Step 309 then flows to step 310 where Dan Jones' device 116 changes the color attribute for Mark's name record for Mark's device 128 in Dan Jones' name manager table 232(F). Mark's NAME DISPLAY ATTRIBUTES message 249 is similarly passed to Dan Smith's device 108 and Alice's device 100 in FIG. 1A, where it is similarly processed.

An example of a font change, color change, animation change, and sound change is illustrated by Eve's name 92 shown in FIG. 1D. Eve is playing on the opposing team in the network baseball game 95 being played by the members of the ad hoc network 132. The name record for Eve's name 92 is shown in Alice's name manager table 232 of FIG. 2B. There, it is seen that Eve has created a distinctive appearance for her name 92, which is different from that of the other team's, by specifying a script font, a blue principal color and a yellow alternate color in field 235, a pulsing animation in field 237, and four musical notes as her sound in field 239. She accomplishes these changes to the display attributes for her name by creating a NAME DISPLAY ATTRIBUTES message 249 containing these attributes and propagating that message through the ad hoc network 132. Other annunciator attributes can be specified as operands in the NAME DISPLAY ATTRIBUTES message 249, for example ta tile sensations such as a mechanical vibration or sounds such as distinctive ringing tones.

E. Process to Flash Displayed Name in Ad Hoc Network

FIG. 1E shows the name distribution message NAME FLASH DISPLAY ATTRIBUTES message 250. FIG. 3C is a network flow diagram of the process flow in the ad hoc network 132, illustrating the propagation of the NAME-FLASH message 250 for toggling the name color, and other display attributes of the device 128, as they are displayed on the devices in the network. Continuing with the example of Eve's distinctive name attributes, the user Eve of device 114 enters on browser button 98 in FIG. 1D her selection to flash her name to the other devices in the network, as shown in step 320 of FIG. 3C. Step 320 flows to step 321, which forwards the NAME-FLASH message 250 for Eve's device to Dan Jones' device 116. The program then flows to step 322, which receives the message in Dan Jones' device 116.

Dan Jones' device 116 receives the NAME FLASH DISPLAY ATTRIBUTES message 250 in step 322 of FIG. 3C. FIG. 2C is a functional block diagram of the op code parser 242 in the application group 234 for the device 100 of FIG. 2A, which is substantially identical to Dan Jones' device 116. The op code parser 242 interprets the cp code field FLASH of name distribution messages to be processed by the device and in response to the NAME FLASH DISPLAY ATTRIBUTES message 250, invokes subroutine 207 in the application program 238 to process the NAME FLASH DISPLAY ATTRIBUTES message 250.

Step 322 of FIG. 3C flows to step 323 to forward the NAME FLASH message 250 to Ian's device 126. The NAME FLASH message 259 shown in FIG. 1E includes a device address field, that in this example would contain Eve's device address "ADDRESS(E)" and the op code "FLASH". The operands in NAME FLASH message 250 for Eve's device would be a flag "X" in each display attribute field that was desired to be flashed. In this example, Eve wants to flash here color and her sound. Thus, the COLOR/ALT. COLOR field 235 would have a flag "X" and the SOUND field 239 would have a flag "X". Step 323 then flows to step 324 where Dan Jones' device 116 detects the color and sound flags in the NAME FLASH message 250 and then flows to step 326. In step 326, Dan Jones' device 116 accesses the color and alternate color attributes from Eve's name record in Dan Jones' name manager table 232. Dan Jones' device 116 then toggles the displayed name 92 of Eve between the blue and the yellow colors she has specified in her name record. Then step 328 accesses the sound attribute from Eve's name record in Dan Jones' name manager table 232. Dan Jones' device 116 then plays the sound. Ian's device 126 receives the NAME FLASH message 250 in step 330 and flows to step 331. The network process of FIG. 3C continues in a similar fashion as described for Eve's device 114, by propagating in step 331 Eve's NAME FLASH message 250 to Paul's device 124. Step 331 then flows to step 332 where Ian's device 126 detects the color and sound flags in the NAME FLASH message 250 and then flows to step 334. In step 334, Ian's device 126 accesses the color and alternate color attributes from Eve's name record in Ian's name manager table 232. Ian's device 126 then toggles the displayed name 92 of Eve between the blue and the yellow colors she has specified in her name record. Then step 336 accesses the sound attribute from Eve's name record in Ian's name manager table 232.

Ian's device 116 then plays the sound. Eve's NAME FLASH message 250 is similarly passed to Paul's device 124, where it is similarly processed.

Figure 1F:
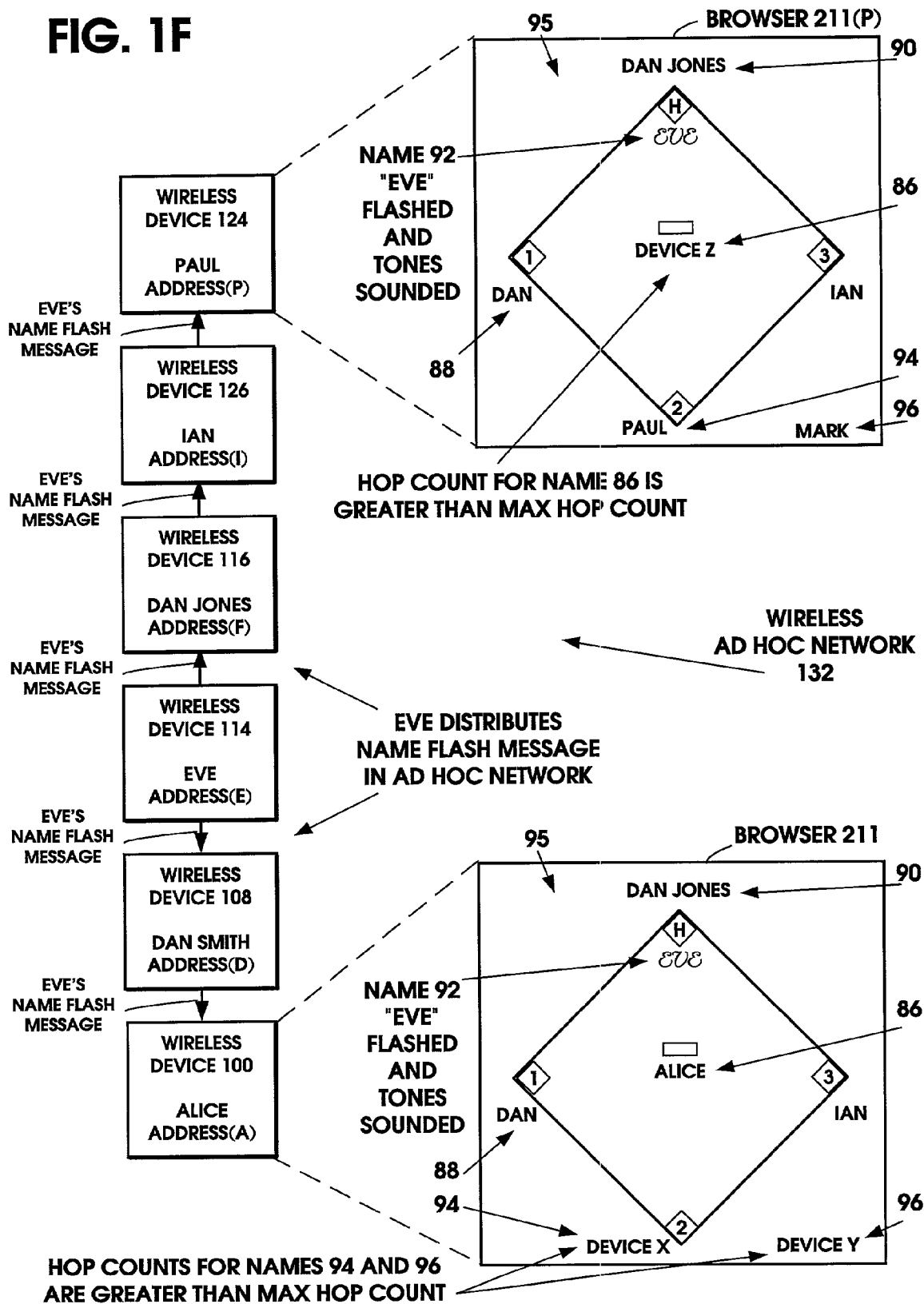
FIG. 1F shows the ad hoc network 132 of FIG. 1A as it propagates a name flash message from device 114 to the rest of the ad hoc network. The figure shows the appearance of the browser 211 in device 100, in which the name for device 114 is flashing in response to the message. The figure also shows that two device names 94 and 96 are not displayed in browser 211 because their corresponding hop counts are greater than their maximum specified value.
Figure 1G:
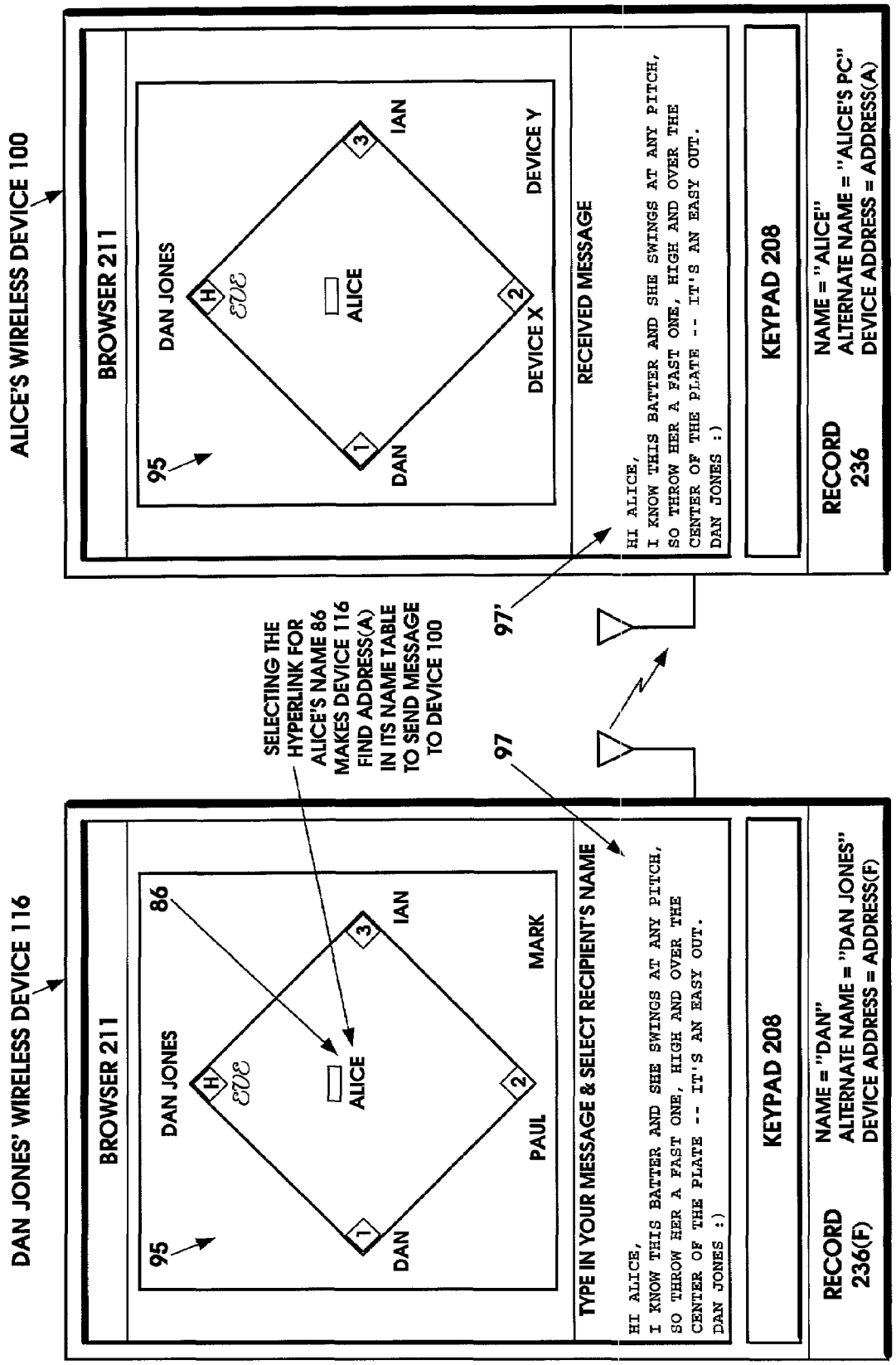
FIG. 1G shows an example appearance of the wireless devices 116 and 100, in which both devices are running a network baseball game application 95, which displays the names of some of the wireless devices connected in the ad hoc network 132 shown in FIG. 1A. In particular, the figure shows selecting a hyperlink for a recipient's name on the display of device 116, to send a message to the recipient.
Figure 1I:
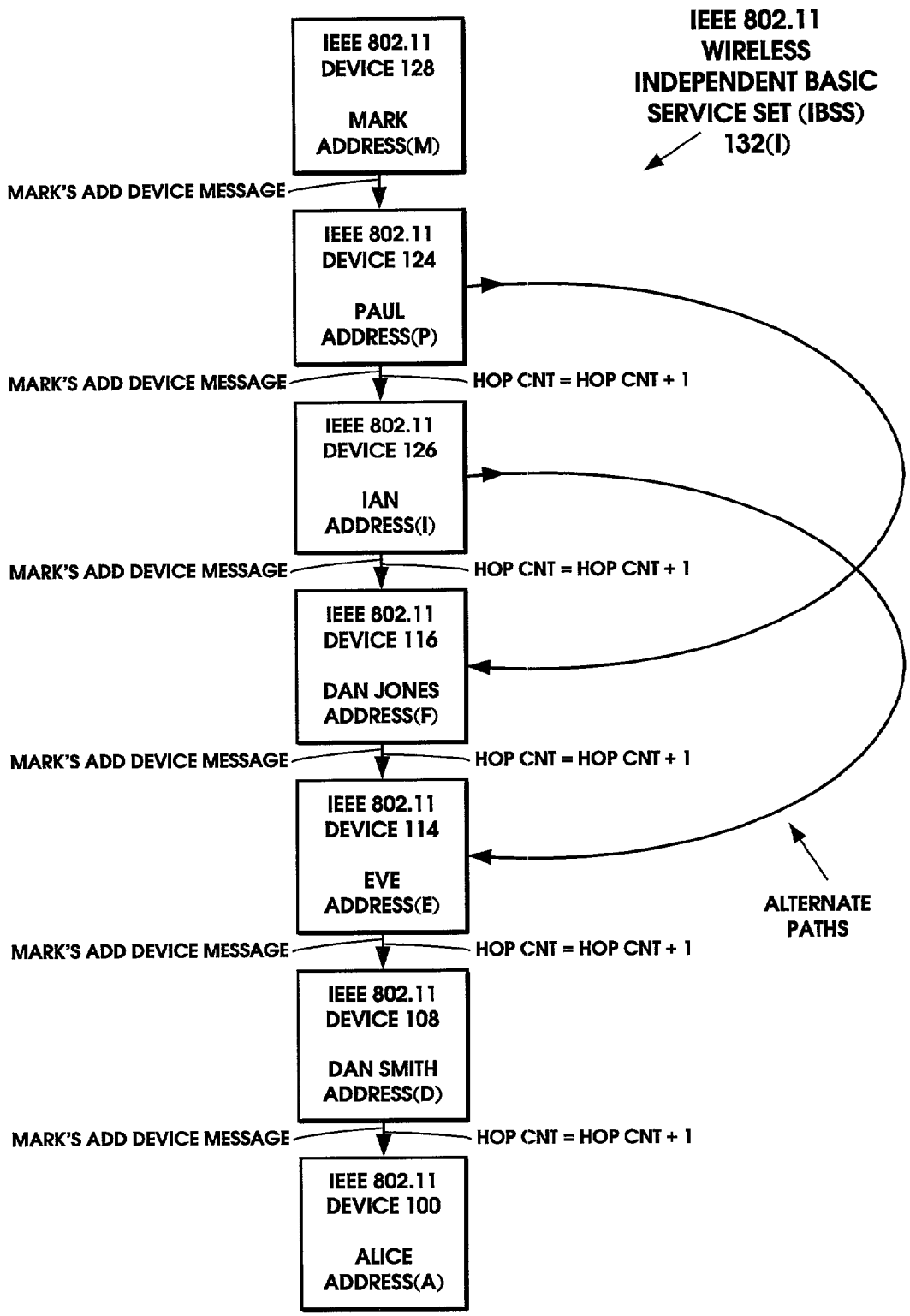
FIG. 1I shows an embodiment of the ad hoc network 132 of FIG. 1A as an IEEE 802.11 Wireless LAN independent basic service set (IBSS) 132(I).
Figure 1J:
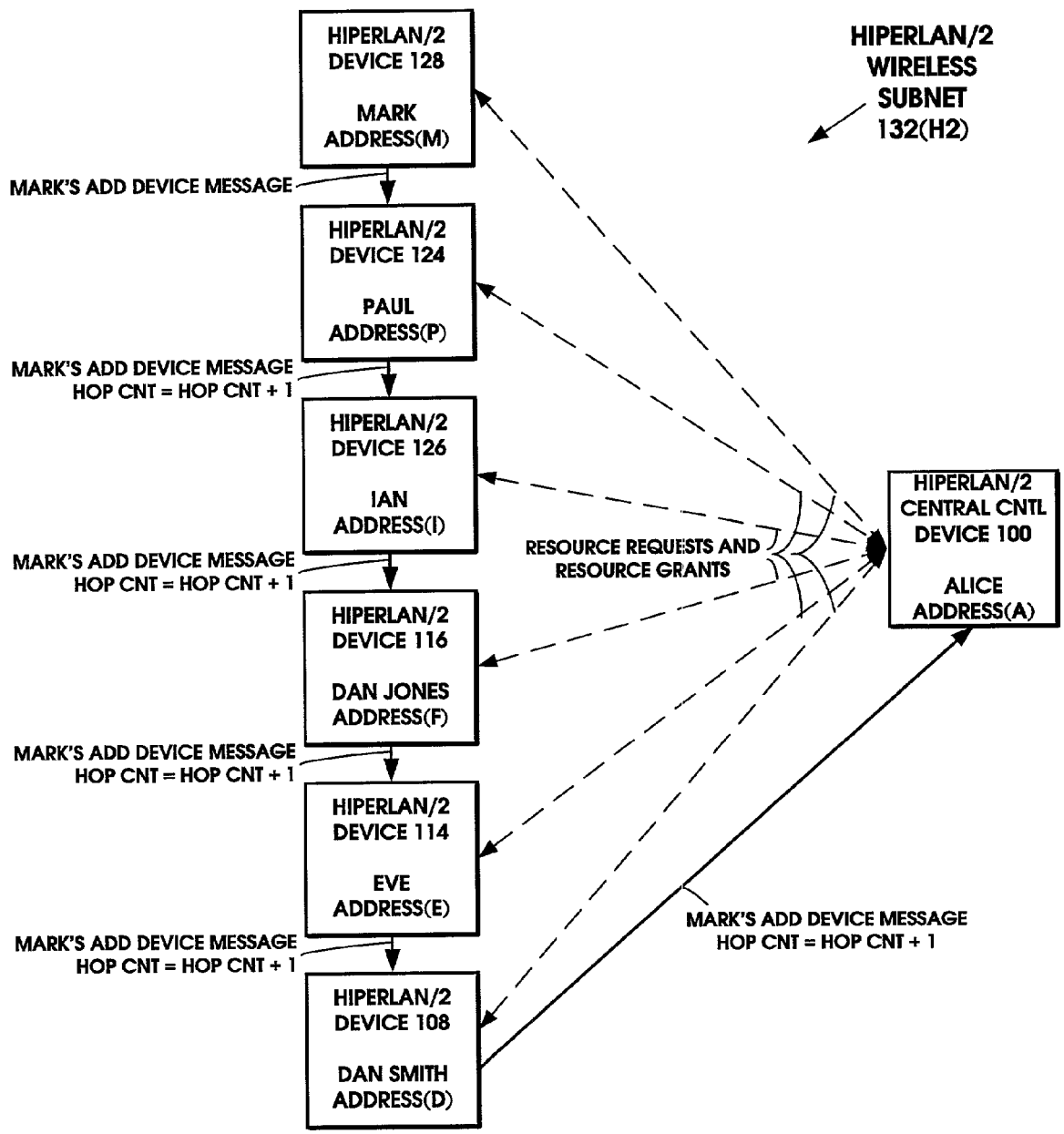
FIG. 1J shows an embodiment of the ad hoc network 132 of FIG. 1A as a HIPERLAN Type 2 Wireless LAN subnet 132(H2).
Figure 1K:
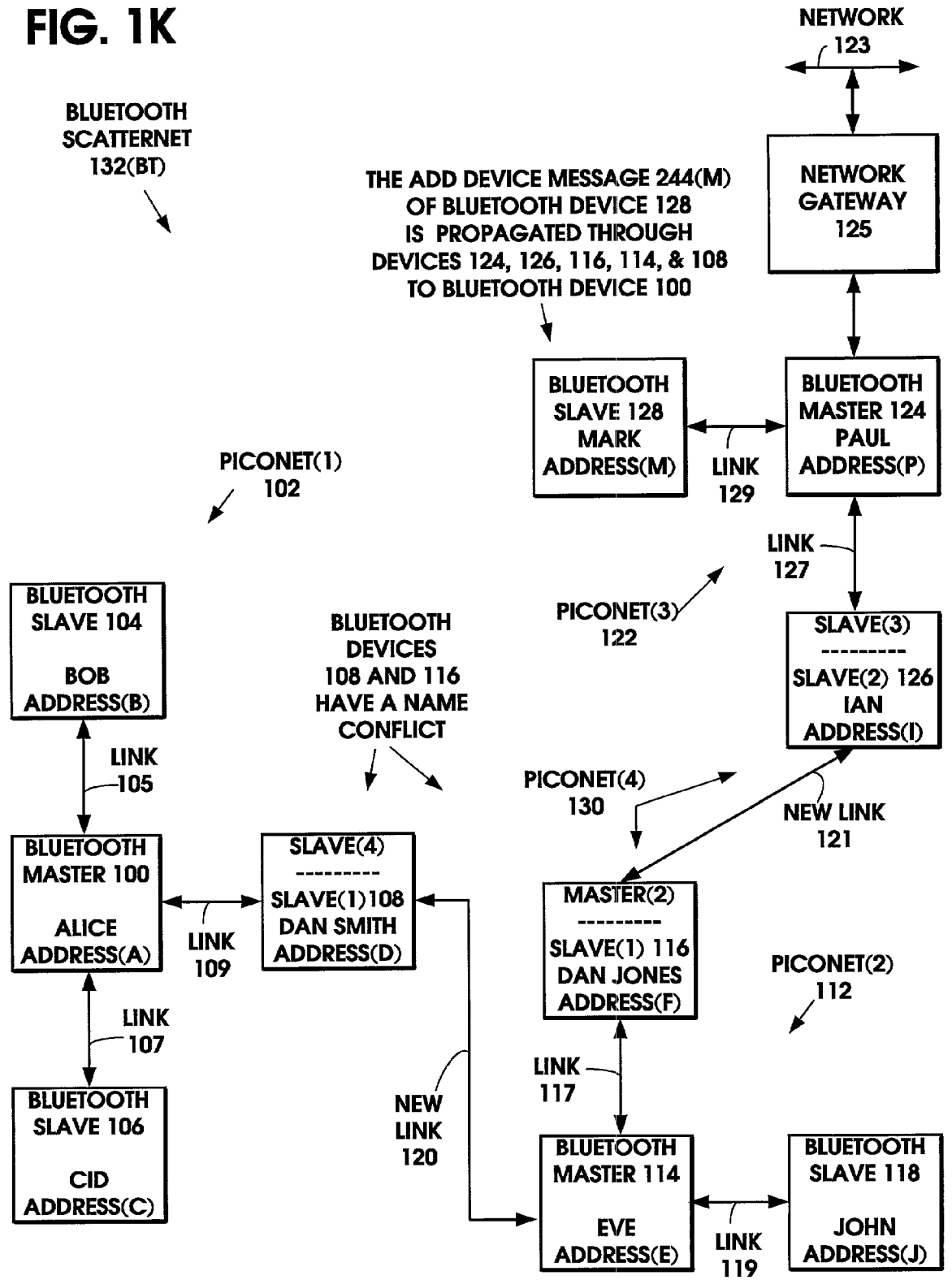
FIG. 1K shows an embodiment of the ad hoc network 132 of FIG. 1A as a Bluetooth scatternet 132(BT).

FIG. 1F shows the ad hoc network 132 of FIG. 1A as it propagates a NAME FLASH message 250 from Eve's device 114 to the rest of the ad hoc network 132. The figure shows the appearance of the browser 211 in Alice's device 100 and the appearance of the browser 211(P) in Paul's device 124, in which the name for Eve's device 114 is flashing in response to the NAME FLASH message 250. The figure also shows that two device names 94 and 96 for Paul and for Mark are not displayed in browser 211 of Alice's device 100 because their corresponding hop counts are greater than their maximum specified value of "4".

F. Process to Join Two Ad Hoc Networks

The ADD DEVICE message 244 helps solve the problem of how to resolve name conflicts when joining two ad hoc networks. FIG. 1H shows two ad hoc networks 102 and 112, which are joining together by forming a new link 120. Note in FIG. 1H that there are two wireless devices, 108 and 116, whose users have selected the primary name of "DAN", in the respective ad hoc networks, 102 and 112. User Dan Smith's device 108 is a member of first ad hoc network 102 that also includes user Alice's device 100 and user Cid's device 106. In the first ad hoc network 102, the name manager table 232' in Alice's device 100 is shown in FIG. 1H in its state before forming the connection between the two ad hoc networks. The name records of Alice's device 100, Cid's device 106, and Dan Smith's device 108 in the name manager table 232', show their respective time stamps when they joined the ad hoc network 102. Alice's device 100 and Dan Smith's device 108 formed their connection at the time "13:10" creating the initial ad hoc network 102 and Cid's device 106 formed his connection to Alice's device 100 at the time "13:19". In the second ad hoc network 112, the name manager table 232(E)' in Eve's device 114 is shown in FIG. 1H in its state before forming the connection between the two ad hoc networks. The name records of Eve's device 114, Dan Jones' device 116, and John's device 118 in the name manager table 232(E)', show their respective time stamps when they joined the ad hoc network 112. Eve's device 114 and Dan Jones' device 116 formed their connection at the time "13:13" creating the initial ad hoc network 112 and John's device 118 formed his connection to Alice's device 100 at the time "13:14".

FIG. 3D is a network flow diagram of a first embodiment process flow in the ad hoc networks 102 and 112 of FIG. 1H, illustrating a first embodiment process to join the two ad hoc networks. In particular, the figure shows the process of exchanging the contents of the respective existing name manager tables 232' and 232(E)' between the two ad hoc networks. This is accomplished by forming an ADD DEVICE message 244 for each name record in the name manager table of the two devices 100 and 114 forming the connection on behalf of their respective ad hoc networks 102 and 112, and then distributing each ADD DEVICE message 244 to the other ad hoc network. In the process of distributing the ADD DEVICE messages 244 through the other network, the name conflict between Dan Smith and Dan Jones is commonly resolved in all of the devices in both ad hoc networks.

FIG. 3D shows that the steps performed by Alice's device 100 and Eve's device 114 are mirror images of each other, in carrying out the process to join the two ad hoc networks. This is indicated by the primed reference number for the process steps in Eve's device 114. In step 300 in Alice's device 100 in the first ad hoc network 102, the new connection is established with Eve's device 114 in the second ad hoc network 112. Then in step 302, Alice's device 100 forms three ADD DEVICE messages 244, one for each of the three name records in the name manager table 232'. The ADD DEVICE message 244 formed for Dan Smith's name record includes Dan Smith's device address "ADDRESS(D)" and the op code ADD_DV. The operand portion includes Dan Smith's primary name "DAN" and Dan Smith's alternate name "DAN SMITH", selected by the user, Dan Smith to be substituted for the primary name in the event of a name conflict. Also included in the operand portion of the ADD DEVICE message 244 is Dan Smith's current hop count value, which begins in Alice's device 100 with the value "1" and is incremented by "1" as Dan Smith's ADD-DEVICE message 244 transits each device 114, 116, and 118 in the second ad hoc network 112. Dan Smith's ADD DEVICE message 244 includes the TIME STAMP field with a value of "13:10". If the primary name "DAN" in Dan Smith's ADD DEVICE message 244 conflicts with another device name currently in the name manager table of any of the devices 114, 116, or 118 in the second ad hoc network 112, then if the existing device in the second ad hoc network 112 has the older time stamp, then Dan Smith's device's alternate name "DAN SMITH" must be substituted for its primary name "DAN". If Dan Smith's device has the older time stamp, then the existing device in the second ad hoc network 112 must have its alternate name substituted for its primary name. In an alternate embodiment, younger time stamps can be preferred over older time stamps.

Step 302 in Alice's device 100 in the first ad hoc network 102, sends each ADD DEVICE message 244 to Eve's device 114 in the second ad hoc network 112 where it is received in step 304'. Dan Smith's ADD-DEVICE message 244 is thus sent to Eve's device 114. Step 304' in Eve's device 114 increments the current hop count in Dan Smith's ADD-DEVICE message 244 to a new value of "2". From this point on, the processing of Dan Smith's ADD-DEVICE message 244 in the second ad hoc network 112 is the same as that described for the process to add a new device in FIG. 3, described above. Step 304' flows to step 306' where the ADD DEVICE message 244 with its newly incremented hop count value of "2" is forwarded to the next device, which is Dan Jones' wireless device 116. Step 306' lows to step 308' in Eve's device 114, where a determination is made as to whether Eve is authorized to display with her device 114, the name or alternate name provided in the received ADD DEVICE message 244.

Step 308' flows to step 310', where Eve's device 114 determines if the current hop count value of "2" for Dan Smith's device, in Dan Smith's ADD DEVICE message 244, is greater than the value "4" in the MAX HOP CNT field. If it is, then a hop count flag is set in the HOP CNT FLAG field 233 of the name manager table 232(E)" that will prevent the Dan Smith's name or alternate name from being displayed. In this stage of the example, the hop count flag is not set and thus Dan Smith's name is not prevented from display with Eve's device 114.

Step 310' flows to step 312', where Eve's device 114 determines if the primary name "DAN" in Dan Smith's ADD DEVICE message 244 conflicts with another device name currently in the name manager table 232(E)' in Eve's device 114. If there is a conflict, then one of those two conflicting devices must have its alternate name substituted for its primary name. This determination is performed by the resolution process 325 shown in the flow diagram of FIG. 3E. Eve's name manager table 232(E)' stores the primary names and the alternate names of the original devices 114, 116, and 118 in the second ad hoc network 112. Step 312' compares the primary name "DAN" in Dan Smith's ADD DEVICE message 244 with each of the respective names "EVE", "DAN", and "JOHN". Currently, there is no existing name in Eve's name manager table 232(E)' that already has a conflict flag "X" in field 231. Then step 312' compares the primary name "DAN" of Dan Smith's device 108 with the existing primary name "DAN" of Dan Jones' device 116. There is a name conflict, and thus step 312' of FIG. 3D goes to the name conflict resolution process 325 of FIG. 3E.

The resolution process 325 shown in the flow diagram of FIG. 3E makes use of the TIME STAMP field in Eve's name manager table 232(E)'. The TIME STAMP field in Dan Smith's ADD DEVICE message 244 contains the value "13:10", which is the time at which Dan Smith's device completed its connection to the first ad hoc network 102. In step 346 of name conflict resolution process 325 of FIG. 3E, if the primary name "DAN" in Dan Smith's ADD DEVICE message 244 conflicts with another device name currently in Eve's name manager table 232(E)' in Eve's device 114, then the program flows to either step 348 or step 350. In step 350, since Dan Smith's added device 108 has an older time stamp of 13:10 than Dan Jones' device 116, which is 13:13, then Dan Jones' device 116 must have its alternate name "DAN JONES" substituted for its primary name "DAN", and a conflict flag is set for Dan Jones' name record in Eve's name manager table 232(E)". In an alternate embodiment, younger time stamps can be preferred over older time stamps.

The network process of FIG. 3D continues in a similar fashion as described for Eve's device 114, by propagating Dan Smith's ADD DEVICE message 244 to Dan Jones' device 116. Steps 304', 306', 308', 310', and 312' in Eve's device 114 respectively correspond to steps 314', 316', 318', 320', and 322' of Dan Jones' device 116. The network process of FIG. 3D continues in a similar fashion as described for Eve's device 114, by propagating Dan Smith's ADD DEVICE message 244 to John's device 118.

The network process of FIG. 3D continues in a similar fashion as described for Dan Smith's ADD DEVICE message 244, by propagating Alice's and Cid's ADD DEVICE messages through the second ad hoc network 112. This results in forming the name manager table 232(E)" in Eve's device 114 with the new name records 142 for Alice, Cid, and Dan Smith shown in FIG. 1H.

FIG. 3D shows that the steps performed by the first ad hoc network 102 and the second ad hoc network 112 are mirror images of each other, in carrying out the process to join the two ad hoc networks. The network process of FIG. 3D continues in a similar fashion as described for Eve's device 114, by propagating Eve's, Dan Jones', and John's ADD DEVICE messages through the first ad hoc network 102. This results in forming the composite name manager table 232" in Alice's device 100 with the new name records 140 for Eve, Dan Jones, and John shown in FIG. 1H.

FIG. 3G is a network flow diagram of an alternate embodiment of the process flow in the ad hoc networks 102 and 112 of FIG. 1H, in which the existing name manager tables 232' are exchanged when joining the two ad hoc networks. FIG. 3G applies to all short range wireless standards supporting ad hoc networks. In the alternate embodiment, the COMPOSITE TABLE message 247 is used when joining two ad hoc networks; together. Instead of propagating a succession of ADD DEVICE messages 244 received from the new ad hoc network 102 in FIG. 1H, the new ad hoc network's existing name manager table 232' is passed to the existing ad hoc network 112. This embodiment enables the first device, Eve's device 114, in the existing ad hoc network 112 forming the connection with the new ad hoc network 102, to perform only once, all of the processing necessary to resolve name conflicts in both ad hoc networks 102 and 112. The resulting composite name manager table 232(E)" formed in Eve's device 114, includes all of the name records 142 contributed by the new ad hoc network 102, as well as the name records 140 contributed by the existing ad hoc network 112. The resulting composite name manager table 232(E)" is the operand portion of the COMPOSITE TABLE message 247 formed in Eve's device 114. The COMPOSITE TABLE message 247 formed in Eve's device 114 is then propagated from Eve's device 114 in the existing ad hoc network 112 to the rest of the existing ad hoc network 114. Correspondingly, Alice's device 100 in the new ad hoc network 102 forming the connection to the existing ad hoc network 112, forms its own COMPOSITE TABLE message 247 and propagates it to the rest of the new ad hoc network 102. This embodiment allows a selection to be made in the tradeoff between optimizing the average processing load on the devices and optimizing the bandwidth necessary to communicate updates from device to device in the networks.

FIG. 3G shows that the steps performed by Alice's device 100 and Eve's device 114 are mirror images of each other, in carrying out the process to join the two ad hoc networks. This is indicated by the primed reference number for the process steps in Eve's device 114. In step 300 in Alice's device 100 in the first ad hoc network 102, the new connection is established with Eve's device 114 in the second ad hoc network 112. Then in step 432, Alice's device 100 sends the existing name manager table 232' shown in FIG. 1H, to Eve's device 114.

Then in step 434' Eve's device 114 in FIG. 3G, receives Alice's existing name manager table 232' and increments all current hop count values for all of the name records in table 232'. Step 436' then appends Alice's existing name manager table 232' to Eve's existing name manager table 232(E)' to form the composite name manager table 232(E)". The resulting composite name manager table 232(E)" includes all of the name records in the Alice's existing table 232' contributed by the Alice's device 100, as well as all of the name records in Eve's existing table 232(E)' contributed by the ad hoc network 112 that Alice's device 100 is joining.

Step 438' of FIG. 3G loops through all of the name records of the devices in the composite name manager table 232(E)". If there are any name conflicts between any of the name records of any of the devices in the composite name manager table 232(E)", then the program goes to the name conflict resolution process 325 of FIG. 3E.

In step 440' of FIG. 3G, the resulting composite name manager table 232(E)" in Eve's device 114, which includes the resolved name conflicts, is formed into the operand portion of the COMPOSITE TABLE message 247 for Eve's device 114. The COMPOSITE TABLE message 247 is then propagated from the Eve's device 114 in FIG. 1H to Dan Jones' device 116 in the ad hoc network 112.

In step 442' of FIG. 3G, Eve's device 114 substitutes the composite name manager table 232(E)" for Eve's existing name manager table 232(E)'.

Step 444' in Dan Jones' device 116 of FIG. 1H, receives the COMPOSITE TABLE message 247 and increments all hop counts in the composite table 232(E)", which is contained in the in the message 247. Step 444' then flows to step 446', which propagates the COMPOSITE TABLE message 247, including its updated hop count values, to the next device over path 447'. Step 446' then flows to step 448, which substitutes the composite table 232(E)", including the updated hop counts, for the existing table 232(F)' in Dan Jones' device 116.

The op code parser 242 of FIG. 2C interprets the op code field TABLE of name distribution messages to be processed by the device and in response, invokes subroutine 209 in the application program 238 to process the COMPOSITE TABLE message 247. In subroutine 209, step 420' receives the COMPOSITE TABLE message 247 and increments all hop counts in the composite table 232", which is contained in the in the message 247. Step 420' then flows to step 422', which propagates the COMPOSITE TABLE message 247, including its updated hop count values, to the next device. Step 422' then flows to step 424', which substitutes the composite table 232", including the updated hop counts, for the existing table 232', as shown in FIG. 1H.

G. The Wireless Device

Figure 2C:
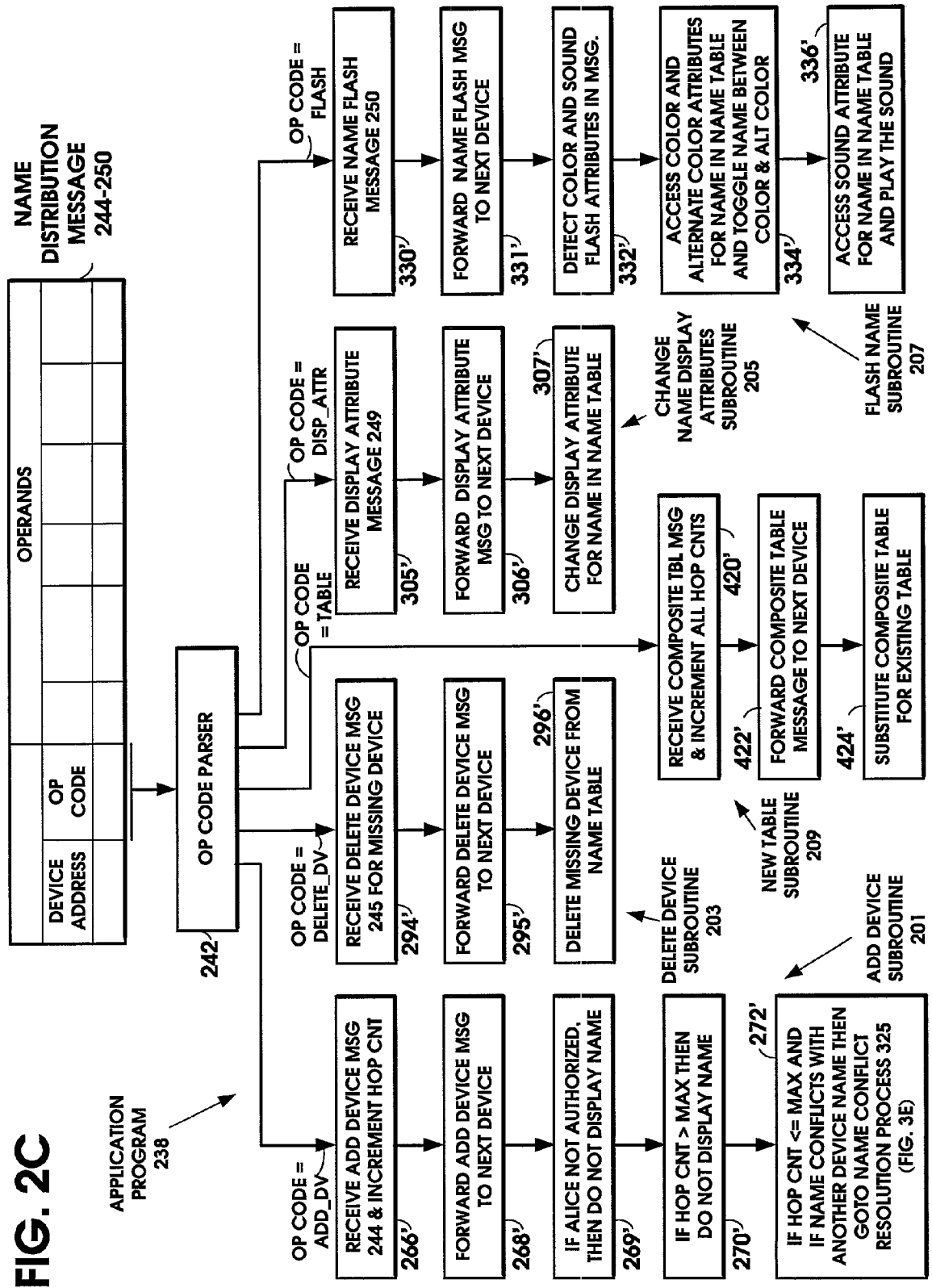
FIG. 2C is a functional block diagram of the op code parser 242 in the application group 234 for the device 100 of FIG. 2A, which interprets the op code field of name distribution messages to be processed by the device 100 and in response, invokes subroutines in the application programs 238 to process the add device message 244, the delete device message 245, the composite table message 247, the display attribute message 249, or the name flash message 250.

FIG. 2A is a functional block diagram of the wireless device 100 of FIG. 1. This figure applies to all wireless standards supporting ad hoc networks. Wireless device 100 can be embodied as a laptop computer, palmtop computer, handheld personal computer, pen-based computer, personal digital assistant (PDA), handheld scanner and data collector, handheld printer, or the like. The functional block diagram of FIG. 2A shows the various program modules stored in its memory 202 for the transport protocol group 214, middleware protocol group 224, and application group 234. The memory 202 is connected by the bus 204 to the radio 206, the keypad 208, the central processor 210, and the display 212.

The various program modules stored in the memory 202 of FIG. 2A are sequences of operational instructions which, when executed by the central processor 210, carry out the methods of the invention. The application group 234 includes the message buffer 222, which buffers name distribution messages. Also included is the name manager table 232. Also included are the application programs 238 that carry out the methods of the flow diagrams of FIGS. 3, 3A, 3B, 3C, 3D, and 3E. Also included is the op code parser 242 and the packet buffer 240 for buffering the packets and protocol data units (PDUs) exchanged between the devices.

FIG. 2C is a functional block diagram of the op code parser 242 in the application group 234 for the device 100 of FIG. 2A, which interprets the op code field of name distribution messages to be processed by the device 100 and in response, invokes subroutines to selectively process the add device message 244, the delete device message 245, the composite table message 247, the display attribute message 249, or the name flash message 250.

The op code parser 242 of FIG. 2C interprets the op code field ADD_DV of name distribution messages to be processed by the device and in response, invokes subroutine 201 in the application program 238 to process the ADD DEVICE message 244(M). In subroutine 201, step 266' receives the ADD DEVICE message 244 and increments the current hop count. Step 266' flows to step 268' where the ADD DEVICE message 244 with its newly incremented hop count value is forwarded to the next device. Step 268' flows to step 269', where a determination is made as to whether the instant device, Alice's device in this example, is authorized to display the name or alternate name provided in the received ADD DEVICE message 244. Step 269' flows to step 270', where it is determined if the current hop count value in the ADD DEVICE message 244 is greater than the value in the MAX HOP CNT field of the name manager table 232. If it is, then a hop count flag is set in the HOP CNT FLAG field 233 of the name manager table 232' that will prevent the name or alternate name from being displayed. Step 270' flows to step 272', where it is determined if the primary name in the ADD DEVICE message 244 conflicts with another device name currently in the name manager table 232. If there is a conflict, then one of those two conflicting devices must have its alternate name substituted for its primary name. This determination is performed by the resolution process 325 shown in the flow diagram of FIG. 3E. The name manager table 232' stores the primary names and the alternate names of the existing devices in the ad hoc network. Step 272' compares the primary name in the ADD DEVICE message 244 with each of the respective existing names in the name manager table 232. If there is an existing name in the name manager table 232 that already has a conflict flag "X" in field 231, the comparison is made with the existing alternate name in the name manager table 232. If there is a name conflict, step 272' goes to the name conflict resolution process 325 of FIG. 3E.

The resolution process 325 shown in the flow diagram of FIG. 3E makes use of the TIME STAMP field in the name manager table 232. In step 346 of name conflict resolution process 325 of FIG. 3E, if the primary name in the ADD DEVICE message 244 conflicts with another device name currently in the name manager table 232, then the program flows to either step 348 or step 350. In step 350, if the added device has an older time stamp than the existing device, then the existing device must have its alternate name substituted for its primary name, and a conflict flag is set in field 231 for the existing name record in the name manager table 232. In an alternate embodiment, younger time stamps can be preferred over older time stamps.

The op code parser 242 of FIG. 2C interprets the op code field DELETE_DV of name distribution messages to be processed by the device and in response, invokes subroutine 203 in the application program 238 to process the DELETE DEVICE message 245. In subroutine 203, step 294' receives the DELETE DEVICE message 245. Step 294' flows to step 295', which propagates the DELETE DEVICE, message 245 to the next device. Step 295' then flows to step 296' where the name record 236 for the device is deleted from the name manager table 232.

The op code parser 242 of FIG. 2C interprets the op code field DISP_ATTR of name distribution messages to be processed by the device and in response, invokes subroutine 205 in the application program 238 to process the NAME DISPLAY ATTRIBUTES message 249. In subroutine 205, step 305' receives the NAME DISPLAY ATTRIBUTES message 249 and flows to step 306'. Step 306' propagates the NAME DISPLAY ATTRIBUTES message 249 to the next device. Step 306' then flows to step 307' where the color attribute is changed in field 235, for example, in the name record 236 in the name manager table 232.

The op code parser 242 of FIG. 2C interprets the op code field FLASH of name distribution messages to be processed by the device and in response, invokes subroutine 207 in the application program 238 to process the NAME FLASH DISPLAY ATTRIBUTES message 250. In subroutine 207, step 330' receives the NAME FLASH message 250 and flows to step 331'. Step 331' propagates the NAME FLASH message 250 to the next device. Step 331' then flows to step 332', which detects the color flag, for example, in the NAME FLASH message 250 and then flows to step 334'. In step 334', the color and alternate color attributes are accessed from field 235 of the name record 236 in the name manager table 232. The displayed name is then toggled between the first and alternate colors specified in the name record. If there are additional attribute flags in the NAME FLASH DISPLAY ATTRIBUTES message 250, for example the sound flag, then the sound attribute is accessed from field 239 of the name record 236 in the name manager table 232, and the sound is played.

The op code parser 242 of FIG. 2C interprets the op code field TABLE of name distribution messages to be processed by the device and in response, invokes subroutine 209 in the application program 238 to process the COMPOSITE TABLE message 247. In subroutine 209, step 420' receives the COMPOSITE TABLE message 247 and increments all hop counts in the composite table 232", which is contained in the in the message 247. Step 420' then flows to step 422', which propagates the COMPOSITE TABLE message 247, including its updated hop count values, to the next device. Step 422' then flows to step 424', which substitutes the composite table 232", including the updated hop counts, for the existing table 232', as shown in FIG. 1H.

The middleware protocol group 224 of FIG. 2A includes the Service Discovery Protocol 226, the Object Exchange 228, and the SDP registry 600. The transport protocol group 214 includes the Logical Link Control and Adaptation Protocol (L2CAP) 220, the Link Controller and Baseband 216, and the Link Manager 218. The Link Controller carries out link level operations over several packet durations in response to higher level commands from the Link Manager. The Baseband handles channel coding and decoding and low level timing control and management of the link within a single data packet transfer.

II. Example of the Invention Implemented in the Bluetooth Standard

FIGS. 1, 1A to 1H, 2A to 2C, 3, and 3A to 3E apply to an implementation of the invention in the Bluetooth Standard. FIG. 1K shows an embodiment of the ad hoc network 132 of FIG. 1A as a Bluetooth scatternet 132(BT). The Bluetooth scatternet 132(BT) is composed of four piconets, 102, 112, 122, and 130. The name distribution messages 244 to 250 are propagated in the same manner through consecutive ones of the Bluetooth devices 124, 126, 116, 114, 108, and 100 in the ad hoc network 132(BT) of FIG. 1K, as was described above for FIGS. 3, 3A, 3B, 3C, 3D, and 3E.

For the Bluetooth standard, the radio 206 in FIG. 2A operates in the 2.4 GHz ISM radio band and uses Gaussian frequency shift keying (GFSK) modulation with one symbol per bit, to provide a gross bit rate of 1 Mbps. The 2.4 GHz ISM radio band is divided into 79 channels, each being 1 MHz wide. The radio 206 operates in a frequency-hopping spread spectrum (FHSS) pattern at a rate of 1600 hops per second. The pattern of the hops is a pseudo-random pattern, which is based on the device's Bluetooth Device Address (BD_ADDR) value. The radiated peak output power of the radio 206 for a class 3 Bluetooth device is approximately one milliWatt (0 dBm), giving it a maximum communicating distance of approximately 10 meters. Class 2 devices operate at 2.5 milliWatt (4 dBm). Class 1 devices operate at 100 milliWatt (20 dBm), giving them a maximum range of 100 meters.

Bluetooth devices have a communication range of ten meters. They are designed to find other Bluetooth devices within that range and to exchange information, using a communications protocol. Up to eight Bluetooth devices can join together in an ad hoc communications network called a piconet. Each piconet has one master device and up to seven slave devices. All communication is directed between the master device and each respective slave device. When two slave devices are to communicate with each other, they must do so through the master device. The master device maintains the piconet's network clock and controls when each slave device can communicate with the master device.

Several file transfer protocols are available in the Bluetooth devices to exchange name distribution messages 244–250, as described above. In accordance with the invention, Bluetooth devices can distribute user-selected device names to other Bluetooth devices in an ad hoc network, using the ADD DEVICE name distribution message 244, as described above. These names can be the user's given name, nick name, or other forms of user-supplied information. Each Bluetooth device, whether a slave or a master device, includes a name manager table 232, as described above. Each device stores in its name manager table 232, information derived from the name distribution messages 244–250 it receives from other devices. The user-selected device name and the device's address in the ad hoc network are associated in the name manager table 232 stored in the device's memory 202. Since all communication between Bluetooth devices must be between master and slave devices, the Bluetooth device must determine whether it is a master device member or a slave device member of the ad hoc network. If it is a slave device, then it transmits name distribution messages 244–250 to the master device in the ad hoc network. The master then forwards the name distribution messages 244–250 by broadcasting them to all of the slave devices in the ad hoc network.

The invention enables any Bluetooth device in the ad hoc network to display the name list 84 shown in FIG. 1C, listing the user-selected device names accessed from the name manager table 232. The device can associate each device name in the name list 80 with the respective device address accessed from the name manager table 232. This enables the user to choose a friend's name and to have the associated device address automatically appended to a message to be sent to the friend. Another feature of the invention is that it can include a hop count value in the ADD DEVICE name distribution message 244, to limit the number of devices to which the name can be passed. Still another feature of the invention is that it can include a time stamp value in the ADD DEVICE name distribution message 244. This is used to resolve naming conflicts, by exercising a preference for either the older or newer name files, depending on the respective values of the time stamps.

Scatternets, such as shown in FIG. 1K, are ad hoc networks that have at least two piconets 102 and 112, in which the two respective master devices 100 and 114 are each connected to the same slave device 108. In accordance with the invention, each master device stores a name manager table 232 that includes the master device's name record 236 and name records 236 for each slave device in its piconet. The master device can form an ADD DEVICE name distribution message 244 for each name record 236 in its name manager table 232. These ADD DEVICE name distribution messages 244 can be broadcast to all of the slave devices in its piconet, so that each device has a complete name manager table 232. Each slave device determines whether it is a member of more than one piconet, i.e., whether it is connected to more than one master device. If a slave device is connected to a second master device, it transfers to the second master, an ADD DEVICE name distribution message 244 for each name record 236 in its name manager table 232, as described above in FIG. 3D. The second master device derives information about each device in the first piconet and stores it in its name manager table 232. As the second master receives each ADD DEVICE name distribution message 244, it performs the name conflict check described above for FIG. 3E, comparing the new name with the names in the its name manager table 232. The second master device then broadcasts each ADD DEVICE name distribution message 244 to the slave devices in the second piconet.

The Piconet(1) 102 in the Scatternet 132(BT) of FIG. 1K consists of the master device 100 and three slave devices 104, 106, and 108. Device 108 is also a slave device to master device 114 in the second piconet(2) 112. Piconet(2) 112 consists of the master device 114 and two slave devices 116 and 118. The slave device 116 is also a master device in piconet(4) 130. Piconet(4) 130 consists of master device 116 and slave device 126. Slave device 126 is also a slave device to master device 124 in piconet(3) 122. Piconet(3) 122 consists of master device 124 and two slave devices 126 and 128. The topology of the communications path for devices 124, 126, 116, 114, 108, and 100 in the Bluetooth ad hoc network 132(BT) of FIG. 1K is the same as that for devices 124, 126, 116, 114, 108, and 100 in the ad hoc network 132 of FIG. 1A.

The name distribution messages 244 to 250 of FIG. 1E are transmitted in the payload portion of the Bluetooth Packet structures exchanged between wireless devices 124, 126, 116, 114, 108, and 100 in the ad hoc network 132(BT) of FIG. 1K. FIG. 1K, shows the propagation of the ADD-DEVICE message 244(M) to add Mark's wireless device 128 to the Bluetooth ad hoc network 132(BT). The FIG. 1K shows the incrementing of the current hop count value attributed to Mark's added device 128 as the ADD-DEVICE message transits each existing device in the Bluetooth ad hoc network. As the user, Mark's ADD DEVICE message 244(M) propagates through consecutive ones of the wireless devices 124, 126, 116, 114, 108, and 100 in FIG. 1K, the current hop count value CURRENT HOP CNT in the message is incremented by "1" and is compared with the value of MAX HOP CNT. This process is shown in FIG. 3, which is a network flow diagram of the process flow in the Bluetooth ad hoc network 132(BT), illustrating the propagation of the ADD-DEVICE message for adding the device 128 to the network. The effect of processing the ADD-DEVICE message in each consecutive wireless device 124, 126, 116, 114, 108, and 100 is shown in FIG. 1B. FIG. 1B shows the incrementing of the current hop count value attributed to Mark's added device 128, as it appears in the name manager table 232 stored in each consecutive device receiving Mark's ADD-DEVICE message 244(M) in the Bluetooth ad hoc network.

A portion of the process to add a new device is shown in FIG. 3 for the first three devices in the Bluetooth ad hoc network 132(BT), Paul's device 124, Ian's device 126, and Dan Jones' device 116. The process continues through the remaining devices 114, 108, and 100. Before joining the Bluetooth ad hoc network 132(BT), the user Mark enters his primary name "MARK", an alternate name "MARK'S PC", and the maximum hop count value of "4" that he desires, into his naming menu 80. These values are stored as operands in the ADD DEVICE message 244(M) of FIG. 1B. Mark's device 128 then joins the Bluetooth ad hoc network 132(BT) in step 252, by forming a communications link with Paul's wireless device 124 in step 254, using the Bluetooth protocol described above to establish a wireless connection.

Paul's wireless device 124 receives the ADD DEVICE message 244(M) in step 255 of FIG. 3. The op code parser 242 of FIG. 2C interprets the op code field of name distribution messages to be processed by the device and in response to the ADD DEVICE message 244(M), and invokes subroutines in the application program 238 to process the ADD DEVICE message 244(M).

Step 255 of FIG. 3 increments the current hop count value of "0" by "1", and writes the new value of "1" into the CURRENT HOP CNT field of the ADD DEVICE message 244(M). FIG. 1B shows the name manager table 232(P) in Paul's device 124, in which a name record is created for Mark's device 128, to store information copied from Mark's ADD DEVICE message 244(M). The values copied from Mark's ADD DEVICE message 244(M) are DEVICE ADDRESS="ADDRESS(M)", NAME="MARK", ALTERNATE NAME="MARK'S PC", MAX HOP CNT="4", and CURRENT HOP CNT="1".

Step 255 then flows to step 256 where the ADD DEVICE message 244(M) with its newly incremented hop count value of "1" is forwarded to the next device, which is Ian's wireless device 126. Step 256 in Paul's device 124, flows to step 257 where a determination is made as to whether Paul is authorized to display with his device 124, the name or alternate name provided in the received ADD DEVICE message 244(M). Reference to the ADD DEVICE message 244(M) in FIG. 1B shows that the operand portion of the message includes a field "OK TO DISPLAY", in which the user Mark has stored a "YES" value. This field gives a blanket authorization to all receiving devices, if its value is "YES".

Step 257 of FIG. 3 flows to step 258, where Paul's device 124 determines if the current hop count value of "1" for Mark's device, in the name manager table 232(P), is greater than the value "4" in the MAX HOP CNT field. If it is, then a hop count, flag is set in the HOP CNT FLAG field 233 of the name manager table 232(P), which will prevent the Mark's name or alternate name from being displayed. In this stage of the example, the hop count flag is not set and thus Mark's name is not prevented from display with Paul's device 124.

Step 258 of FIG. 3 flows to step 259, where Paul's device 124 determines if the primary name "MARK" in Mark's ADD DEVICE message 244(M) conflicts with another device name currently in the name manager table 232(P) in Paul's device 124. If there is a conflict, then one of those two conflicting devices must have its alternate name substituted for its primary name. This determination is performed by the resolution process 325 shown in the flow diagram of FIG. 3E. In FIG. 2B, the name manager table 232 stores the primary names and the alternate names of all of the devices 124, 126, 116, 114, 108, and 100 in the Bluetooth ad hoc network of FIG. 1K. Step 259 compares the primary name "MARK" in Mark's ADD DEVICE message 244(M) with each of the respective names "PAUL", "IAN", "DAN JONES", "EVE", "DAN", and "ALICE". Where an existing name already has a conflict flag "X", for example where the alternate name "DAN JONES" has been substituted for the primary name "DAN", then step 259 compares the primary name "MARK" of the added device 128 with the existing alternate name "DAN JONES" of the device 116.

The resolution process 325 shown in the flow diagram of FIG. 3E makes use of the TIME STAMP field in the name manager table 232. The TIME STAMP field in Mark's ADD DEVICE message 244(M) contains the value "15:30", which is the time at which Mark's device completed its connection to the Bluetooth ad hoc network 132(BT). The value in the TIME STAMP field in Mark's ADD DEVICE message 244(M) is copied into each name manager table 232, as shown in FIG. 2B. In step 346 of name conflict resolution process 325 of FIG. 3E, if the primary name "MARK" in Mark's ADD DEVICE message 244(M) conflicts with another device name currently in the name manager table 232(P) in Paul's device 124, then the program flows to either step 348 or step 350.

In step 348, if the existing device in the Bluetooth ad hoc network has the older time stamp, then Mark's device's alternate name "MARK'S PC" must be substituted for its primary name "MARK". In step 350, if Mark's added device 128 has the older time stamp, then the existing device in the Bluetooth ad hoc network must have its alternate name substituted for its primary name. Then steps 348 and 350 flow to the return step 352. In an alternate embodiment, younger time stamps can be preferred over older time stamps.

Step 259 in FIG. 3 than flows to step 260, where it is Determined in Paul's device whether Mark's device 128 to be added is authorized to join the Bluetooth ad hoc network 132(BT). This determination can be based on a prior blanket prohibition against the addition of certain types of devices or particular user names, which can be provided in a stop list entered by the user Paul. If Mark's device 128 is authorized to join the Bluetooth ad hoc network 132(BT), then step 260 sends a copy of the updated name manager table 232 to Mark's device 128. This is accomplished by forming an ADD DEVICE message 244 for each name record in the name manager table 232(P) of Paul's device 124 and forwarding it to Mark's device 128.

Step 260 then flows to step 262 in Mark's device 128, where each name record in the updated name manager table 232 is received and stored as Mark's name manager table. Mark's device 128 can then display the names of the devices in the Bluetooth ad hoc network 132(BT) shown in FIG. 1K.

If any of the devices in the Bluetooth ad hoc network 132(BT) is not aware of the process to add a new device in FIG. 3, then when that unaware device receives the ADD DEVICE message 244, it will respond with an error message. In response to this error message, the forwarding device will use any alternate wireless connections that it currently has or which it can establish to any other devices in the network, to continue the propagation of the ADD DEVICE message 244.

FIG. 3F is a network flow diagram of an alternate embodiment of the process flow in the ad hoc network 132(BT), illustrating the propagation of the composite name manager table 232" for adding the device 128 to the Bluetooth network.

III. Example of the Invention Implemented in the IEEE 802.11 Wireless LAN Standard FIGS. 1, 1A to 1H, 2A to 2C, 3, and 3A to 3E apply to an implementation of the invention in the IEEE 802.11 Wireless LAN Standard. FIG. 1 shows an embodiment of the ad hoc network 132 of FIG. 1A as an IEEE 802.11 Wireless LAN independent basic service set (IBSS) 132(I). The name distribution messages 244 to 250 of FIG. 1E are propagated in the same manner through consecutive ones of the IEEE 802.11 Wireless LAN devices 124, 126, 116, 114, 108, and 100 in the ad hoc network 132(I) of FIG. 1I, as was described above for FIGS. 3, 3A, 3B, 3C, 3D, and 3E. The IEEE 802.11 Wireless LAN IBSS 132(I) also includes alternate, direct paths between devices 124–166 and between 126–114. FIG. 1L shows the application of the invention to multiple IEEE 802.11 Wireless LAN infrastructure basic service sets 102(I), 112(I), and 122(I), which communicate through access points 106, 114, and 124 and network gateways 125, 125', and 125", over the wired or wireless network 123.

The IEEE 802.11 Wireless LAN Standard describes two major components, the mobile station 100(I) and the fixed access point (AP). IEEE 802.11 ad hoc networks have an independent configuration where the mobile stations communicate directly with one another in an independent ad hoc network having limited or no support from a fixed access point. The medium access control (MAC) protocol regulates access to the RF physical link. The MAC provides a basic access mechanism with clear channel assessment, channel synchronization, and collision avoidance using the Carrier sense Multiple Access (CSMA) principle. It also provides service inquiring, which is similar to the Bluetooth inquiry and scan operation. The MAC provides link setup, data fragmentation, authentication, encryption, and power management.

The IEEE 802.11 wireless LAN architecture is built around a basic service set (BSS) of stations that communicate with one another. When all of the stations in the BSS are mobile stations and there is no connection to a wired network, the BSS is called an independent BSS (IBSS) or ad hoc network. The ad hoc network is the entire network and only those stations communicating with each other in the ad hoc network are part of the LAN. An ad hoc network is typically a short-lived network, with a small number of stations, which is created for a particular purpose, e.g., to exchange data with a vending machine or to collaborate with other stations. In an ad hoc network, the mobile stations all communicate directly with one another. Thus, if one mobile station must communicate with another, they must be in direct communication range.

Synchronization is the process of the stations in an IEEE 802.11 ad hoc network getting in step with each other, so that reliable communication is possible. The MAC provides the synchronization mechanism to allow support of physical layers that make use of frequency hopping or other time-based mechanisms where the parameters of the physical layer change with time. The process involves beaconing to announce the presence of an ad hoc network, and inquiring to find an ad hoc network. Once an ad hoc network is found, a station joins the ad hoc network. This process is entirely distributed in ad hoc networks, and relies on a common timebase provided by a timer synchronization function (TSF). The TSF maintains a 64-bit timer running at 1 MHz and updated by information from other stations. When a station begins operation, it resets the timer to zero. The timer may be updated by information received in Beacon frames.

In an IEEE 802.11 ad hoc network, there is no access point (AP) to act as the central time source for the ad hoc network. In an ad hoc network, the timer synchronization mechanism is completely distributed among the mobile stations of the ad hoc network. Since there is no AP, the mobile station that starts the ad hoc network will begin by resetting its TSF timer to zero and transmitting a Beacon, choosing a beacon period. This establishes the basic beaconing process for this ad hoc network. After the ad hoc network has been established, each station in the ad hoc network will attempt to send a Beacon after the target beacon transmission time arrives. To minimize actual collisions of the transmitted Beacon frames on the medium, each station in the ad hoc network will choose a random delay value, which it will allow to expire before it attempts its Beacon transmission.

In order for a mobile station to communicate with other mobile stations in an ad hoc network, it must first find the stations. The process of finding another station is by inquiry. The inquiring may be either passive or active. Passive inquiry involves only listening for IEEE 802.11 traffic. Active inquiry requires the inquiring station to transmit and invoke responses from IEEE 802.11 stations.

Active inquiry allows an IEEE 802.11 mobile station to find an ad hoc network while minimizing the time spent inquiring. The station does this by actively transmitting queries that invoke responses from stations in an ad hoc network. In an active inquiry, the mobile station will move to a channel and transmit a probe request frame. If there is an ad hoc network on the channel that matches the service set identity (SSID) in the probe request frame, the responding station in that ad hoc network will respond by sending a probe response frame to the inquiring station. This probe response includes the information necessary for the inquiring station to extract a description of the ad hoc network. The inquiring station will also process any other received probe response and Beacon frames. Once the inquiring station has processed any responses, or has decided there will be no responses, it may change to another channel and repeat the process. At the conclusion of the inquiry, the station has accumulated information about the ad hoc networks in its vicinity.

Once a station has performed an inquiry that results in one or more ad hoc network descriptions, the station may choose to join one of the ad hoc networks. The joining process is a purely local process that occurs entirely internal to the IEEE 802.11 mobile station. There is no indication to the outside world that a station has joined a particular ad hoc network. While the IEEE 802.11 standard does describe what is required of a station to join an ad hoc network, it does not describe how a station should choose one ad hoc network over another.

Joining an ad hoc network requires that all of the mobile station's MAC and physical parameters be synchronized with the desired ad hoc network. To do this, the station must update its timer with the value of the timer from the ad hoc network description, modified by adding the time elapsed since the description was acquired. This will synchronize the timer to the ad hoc network. The BSSID of the ad hoc network must be adopted, as well as the parameters in the capability information field. Once this process is complete, the mobile station has joined the ad hoc network and is ready to begin communicating with the stations in the ad hoc network.

Most of the functional block diagram of FIG. 2A applies to the IEEE 802.11 wireless LAN embodiment of the device 100, as well as it does to the Bluetooth embodiment. FIG. 2A, shows the various program modules stored in its memory 202 for the transport protocol group 214, middleware protocol group 224, and application group 234. The memory 202 is connected by the bus 204 to the keypad 208, the central processor 210, and the display 212. The memory 202 is connected by the bus 204 to the radio 206, which in the case of the IEEE 802.11 embodiment, is the radio having the RF spectrum and modulation specified by the IEEE 802.11 standard. The radio 206 for IEEE 802.11 wireless LAN devices operates in the 2.4 GHz ISM radio band and uses a variety of modulation types, depending on the type of physical layer defined for the device. A first type of physical layer device uses frequency-hopping spread spectrum (FHSS) and Gaussian frequency shift keying (GFSK) modulation with one symbol per bit, to provide a gross bit rate of 1 Mbps. The 2.4 GHz ISM radio band is divided into three sets of 22 frequency-hopping channels each, with each channel being 1 MHz wide. Two other physical layer device types use direct sequence spread spectrum (DSSS), one at 1 Mbps using differential binary phase shift keying (DBPSK) modulation and another at 2 Mbps using differential quaternary phase shift keying (DQPSK) modulation. The US Federal Communications Commission (FCC) allows use of the 2.4 GHz ISM radio band without a license if the transmitter output power is less than 1 Watt.

The middleware protocol group 224 and the transport protocol group 214 of FIG. 2A are different in the IEEE 802.11 embodiment, from that shown for the Bluetooth embodiment. The IEEE 802.11 wireless LAN specification provides a detailed description of the middleware protocol group 224 and the transport protocol group 214. These modules are the MAC Service Interface, the MAC Management Service Interface, the Medium Access Control Sublayer, the MAC Management, the Physical Service Interface, the Physical Management Service, the Physical Layer, and the Physical Management.

The general IEEE 802.11 frame format begins with a MAC header. The start of the header is the frame control field, followed by a field that contains the duration information for network allocation. This is followed by three addressing fields and frame sequence information. The final field of the MAC header is a fourth address field. Not all of these fields in the MAC header are used in all frames. Following the MAC header is the frame body, which contains the MAC service data unit (MSDU) from the higher layer protocols. The final field in the MAC frame is the frame check sequence. The frame body field contains the information specific to the particular data or management frames. This field is variable length and may be as long as 2304 bytes, which allows an application to send 2048-byte pieces of information, which can then be encapsulated by as many as 256 bytes of upper layer protocol headers and trailers.

The name distribution messages 244 to 250 of FIG. 1E are transmitted in the frame body of the IEEE 802.11 frames exchanged between 124, 126, 116, 114, 108, and 100 in the ad hoc network 132(I) of FIG. 1I. FIG. 1I, shows the propagation of the ADD-DEVICE message 244(M) to add Mark's wireless device 128 to the IEEE 802.11 ad hoc network 132(I). The FIG. 1I shows the incrementing of the current hop count value attributed to Mark's added device 128 as the ADD-DEVICE message transits each existing device in the IEEE 802.11 ad hoc network. As the user, Mark's ADD DEVICE message 244(M) propagates through consecutive ones of the wireless devices 124, 126, 116, 114, 108, and 100 in FIG. 1I, the current hop count value CURRENT HOP CNT in the message is incremented by "1" and is compared with the value of MAX HOP CNT. This process is shown in FIG. 3, which is a network flow diagram of the process flow in the IEEE 802.11 ad hoc network 132(I), illustrating the propagation of the ADD-DEVICE message for adding the device 128 to the network. The effect of processing the ADD-DEVICE message in each consecutive wireless device 124, 126, 116, 114, 108, and 100 is shown in FIG. 1B. FIG. 1B shows the incrementing of the current hop count value attributed to Mark's added device 128, as it appears in the name manager table 232 stored in each consecutive device receiving Mark's ADD-DEVICE message 244(M) in the IEEE 802.11 ad hoc network.

A portion of the process to add a new device is shown in FIG. 3 for the first three devices in the IEEE 802.11 ad hoc network 132(I), Paul's device 124, Ian's device 126, and Dan Jones' device 116. The process continues through the remaining devices 114, 108, and 100. Before joining the IEEE 802.11 ad hoc network 132(I), the user Mark enters his primary name "MARK", an alternate name "MARK'S PC", and the maximum hop count value of "4" that he desires, into his naming menu 80. These values are stored as operands in the ADD DEVICE message 244(M) of FIG. 1B. Mark's device 128 then joins the IEEE 802.11 ad hoc network 132(I) in step 252, by forming a communications link with Paul's wireless device 124 in step 254, using the IEEE 802.11 protocol described above to establish a wireless connection.

Paul's wireless device 124 receives the ADD DEVICE message 244(M) in step 255 of FIG. 3. The op code parser 242 of FIG. 2C interprets the op code field of name distribution messages to be processed by the device and in response to the ADD DEVICE message 244(M), and invokes subroutines in the application program 238 to process the ADD DEVICE message 244(M).

Step 255 of FIG. 3 increments the current hop count value of "0" by "1", and writes the new value of "1" into the CURRENT HOP CNT field of the ADD DEVICE message 244(M). FIG. 1B shows the name manager table 232(P) in Paul's device 124, in which a name record is created for Mark's device 128, to store information copied from Mark's ADD DEVICE message 244(M). The values copied from Mark's ADD DEVICE message 244(M) are DEVICE ADDRESS="ADDRESS(M)", NAME="MARK", ALTERNATE NAME="MARK'S PC", MAX HOP CNT="4", and CURRENT HOP CNT="1".

Step 255 then flows to step 256 where the ADD DEVICE message 244(M) with its newly incremented hop count value of "1" is forwarded to the next device, which is Ian's wireless device 126. Step 256 in Paul's device 124, flows to step 257 where a determination is made as to whether Paul is authorized to display with his device 124, the name or alternate name provided in the received ADD DEVICE message 244(M). Reference to the ADD DEVICE message 244(M) in FIG. 1B shows that the operand portion of the message includes a field "OK TO DISPLAY", in which the user Mark has stored a "YES" value. This field gives a blanket authorization to all receiving devices, if its value is "YES".

Step 257 of FIG. 3 flows to step 258, where Paul's device 124 determines if the current hop count value of "1" for Mark's device, in the name manager table 232(P), is greater than the value "4" in the MAX HOP CNT field. If it is, then a hop count flag is set in the HOP CNT FLAG field 233 of the name manager table 232(P), which will prevent the Mark's name or alternate name from being displayed. In this stage of the example, the hop count flag is not set and thus Mark's name is not prevented from display with Paul's device 124.

Step 258 of FIG. 3 flows to step 259, where Paul's device 124 determines if the primary name "MARK" in Mark's ADD DEVICE message 244(M) conflicts with another device name currently in the name manager table 232(P) in Paul's device 124. If there is a conflict, then one of those two conflicting devices must have its alternate name substituted for its primary name. This determination is performed by the resolution process 325 shown in the flow diagram of FIG. 3E. In FIG. 2B, the name manager table 232 stores the primary names and the alternate names of all of the devices 124, 126, 116, 114, 108, and 100 in the IEEE 802.11 ad hoc network of FIG. 1I. Step 259 compares the primary name "MARK" in Mark's ADD DEVICE message 244(M) with each of the respective names "PAUL", "IAN", "DAN JONES", "EVE", "DAN", and "ALICE". Where an existing name already has a conflict flag "X", for example where the alternate name "DAN JONES" has been substituted for the primary name "DAN", then step 259 compares the primary name "MARK" of the added device 128 with the existing alternate name "DAN JONES" of the device 116.

The resolution process 325 shown in the flow diagram of FIG. 3E makes use of the TIME STAMP field in the name manager table 232. The TIME STAMP field in Mark's ADD DEVICE message 244(M) contains the value "15:30", which is the time at which Mark's device completed its connection to the IEEE 802.11 ad hoc network 132(I). The value in the TIME STAMP field in Mark's ADD DEVICE message 244(M) is copied into each name manager table 232, as shown in FIG. 2B. In step 346 of name conflict resolution process 325 of FIG. 3E, if the primary name "MARK" in Mark's ADD DEVICE message 244(M) conflicts with another device name currently in the name manager table 232(P) in Paul's device 124, then the program flows to either step 348 or step 350.

In step 348, if the existing device in the IEEE 802.11 ad hoc network has the older time stamp, then Mark's device's alternate name "MARK'S PC" must be substituted for its primary name "MARK". In step 350, if Mark's added device 128 has the older time stamp, then the existing device in the IEEE 802.11 ad hoc network must have its alternate name substituted for its primary name. Then steps 348 and 350 flow to the return step 352. In an alternate embodiment, younger time stamps can be preferred over older time stamps.

Step 259 in FIG. 3 than flows to step 260, where it is determined in Paul's device whether Mark's device 128 to be added is authorized to join the IEEE 802.11 ad hoc network 132(I). This determination can be based on a prior blanket prohibition against the addition of certain types of devices or particular user names, which can be provided in a stop list entered by the user Paul. If Mark's device 128 is authorized to join the IEEE 802.11 ad hoc network 132(I), then step 260 sends a copy of the updated name manager table 232 to Mark's device 128. This is accomplished by forming an ADD DEVICE message 244 for each name record in the name manager table 232(P) of Paul's device 124 and forwarding it to Mark's device 128.

Step 260 then flows to step 262 in Mark's device 128, where each name record in the updated name manager table 232 is received and stored as Mark's name manager table. Mark's device 128 can then display the names of the devices in the IEEE 802.11 ad hoc network 132(I) shown in FIG. 1I.

If any of the devices in the IEEE 802.11 ad hoc network 132(I) is not aware of the process to add a new device in FIG. 3, then when that unaware device receives the ADD DEVICE message 244, it will respond with an error message. In response to this error message, the forwarding device will use any alternate wireless connections that it currently has or which it can establish to any other devices in the network, to continue the propagation of the ADD DEVICE message 244. FIG. 1I shows the IEEE 802.11 ad hoc network 132(I) devices operating in the independent configuration mode, where they communicate directly with one another and can establish alternate paths to circumvent unaware devices.

FIG. 3F is a network flow diagram of an alternate embodiment of the process flow in the ad hoc network 132(I), illustrating the propagation of the composite name manager table 232" for adding the device 128 to the IEEE 802.11 network.

IV. High Performance Radio Local Area Network (HIPERLAN)

The HIPERLAN standard provides a wireless LAN with a high data rate of up to 54 Mbps and a medium-range of 50 meters. HIPERLAN wireless LANs provide multimedia distribution with video QoS, reserved spectrum, and good in-building propagation. There are two HIPERLAN standards. HIPERLAN Type 1 is a dynamic, priority driven channel access protocol similar to wireless Ethernet. HIP- ERLAN Type 2 is reserved channel access protocol similar to a wireless version of ATM. Both HIPERLAN Type 1 and HIPERLAN Type 2 use dedicated spectrum at 5 GHz. HIPERLAN Type 1 uses an advanced channel equalizer to deal with intersymbol interference and signal multipath. HIPERLAN Type 2 avoids these interference problems by using OFDM and a frequency transform function. The HIPERLAN Type 2 specification offers options for bit rates of 54, 36, 16, and 6 Mbps. The physical layer adopts an OFDM multiple carrier scheme using 48 carrier frequencies per OFDM symbol. Each carrier may then be modulated using BPSK, QPSK, 16-QAM, or 64-QAM to provide different data rates. The modulation schemes chosen for the higher bit rates achieve throughput in the range 30–50 Mb/s.

IV-A. Example of the Invention Implemented in the HIPERLAN Type 1 Standard

HIPERLAN Type 1 is a dynamic, priority driven channel access protocol that lends itself well to the formation of ad hoc networks. The HIPERLAN Type 1 ad hoc network is an arbitrary collection of wireless devices, which are physically close enough to be able to communicate, and which are exchanging information on a regular basis. Members of the ad hoc network join and leave as they move into and out of the range of the devices in the network. HIPERLAN Type 1 ad hoc networks support distributed activities similar those of the Bluetooth piconets and IEEE 802.11 independent basic service sets (IBSS).

FIGS. 1, 1A to 1H, 2A to 2C, 3, and 3A to 3E apply to apply to an implementation of the invention in the HIPERLAN Type 1 Standard. The ad hoc network topology shown in FIG. 1I for the IEEE 802.11 Wireless LAN, also applies to the HIPERLAN Type 1 subnet. The name distribution messages 244 to 250 are propagated in the same manner through consecutive ones of the HIPERLAN Type 1 devices 124, 126, 116, 114, 108, and 100 in the ad hoc network 132(I) of FIG. 1I, as was described above for FIGS. 3, 3A, 3B, 3C, 3D, and 3E. The HIPERLAN Type 1 subnet also includes alternate, direct paths between devices 124–166 and between 126–114. The topology of FIG. 1L also applies to multiple HIPERLAN Type 1 subnets, which communicate through access points 106, 114, and 124 and network gateways 125, 125', and 125", over the wired or wireless network 123.

IV-B. Example of the Invention Implemented in the HIPERLAN Type 2 Standard

HIPERLAN Type 2 is a reserved channel access protocol that is capable of forming ad hoc networks. The HIPERLAN Type 2 ad hoc network is a collection of wireless devices, which are physically close enough to be able to communicate, and which are exchanging information on a regular basis. Members of the ad hoc network join and leave as they move into and out of the range of the devices in the network. HIPERLAN Type 2 ad hoc networks support distributed activities similar those of the Bluetooth piconets and IEEE 802.11 independent basic service sets (IBSS).

FIGS. 1, 1A to 1H, 2A to 2C, 3, and 3A to 3E apply to apply to an implementation of the invention in the HIPERLAN Type 2 Standard. FIG. 1J shows an embodiment of the ad hoc network 132 of FIG. 1A as a HIPERLAN Type 2 subnet 132(H2). The name distribution messages 244 to 250 are propagated in the same manner through consecutive ones of the HIPERLAN Type 2 devices 124, 126, 116, 114, 108, and 100 in the ad hoc network 132(H2) of FIG. 1J, as was described above for FIGS. 3, 3A, 3B, 3C, 3D, and 3E. The HIPERLAN Type 2 subnet 132(H2) also includes alternate, direct paths between devices. FIG. 1M shows the application of the invention to multiple HIPERLAN Type 2 infrastructure basic service sets 102(H2), 112(H2), and 122(H2), which communicate through central controllers 106, 114, and 124 and network gateways 125, 125', and 125", over the wired or wireless network 123.

HIPERLAN Type 2 supports two basic modes of operation, the Centralized mode and the Direct mode. In the Centralized mode (sometimes referred to as the "business system"), subnets include an access point, which is connected to network gateway 125 and the network 123, which serves the wireless devices associated with it. In the centralized mode, all traffic has to pass the access point, regardless of whether the data exchange is between a wireless device and the network 123 or between wireless devices belonging to this access point. A HIPERLAN Type 2 network for Centralized mode environment consists typically of a number of access points, each of them covering its own geographic area. Together they form a radio access network with full or partial coverage of a region. The coverage areas can overlap each other, thus simplifying routing of wireless devices inside the radio access network. Each access point serves a number of wireless devices that have to be associated with it. In the case where the quality of the radio link degrades to an unacceptable level, the wireless device may move to another access point by performing a handover. To the extent that devices may arrive and leave the subnet, the subnet is also considered an ad hoc network.

The Direct mode supports ad hoc networks. In the Direct mode (sometimes referred to as the "home system"), the medium access is still managed in a centralized manner by a central controller. However, user data traffic is exchanged between wireless devices without going through the central controller. A central controller may also be connected to a core network, and thus is able to operate in both direct and centralized mode. The smallest configuration in a HIPERLAN Type 2 Direct mode system consists of a single subnet. At each instant, only one HIPERLAN Type 2 wireless device can act as the central controller in a subnet.

For the Direct mode environment, HIPERLAN Type 2 network is operated as an ad hoc network. The HIPERLAN Type 2 Direct mode system shares the same basic features with the HIPERLAN Type 2 Centralized mode system by defining the following equivalence between both systems:

[1] A subnet in the ad hoc network configuration is equivalent to a cell in the cellular access network configuration.

[2] A central controller in the ad hoc network configuration is equivalent to the access point in the cellular access network configuration. However, the central controller is dynamically selected from HIPERLAN Type 2 portable devices and can be handed over to another portable device, if the old one leaves the network.

[3] Multiple subnets in a Direct mode are made possible by having multiple central controllers operating at different frequencies.

The HIPERLAN Type 2 basic protocol stack on the access point/central controller and its functions are the physical layer (PHY), the Data Link Control (DLC) layer, and the convergence layer (CL). The convergence layer offers service to the higher application program layers.

The physical layer delivers a basic data transport function by providing a baseband modem and an RF port. The baseband modem also contains a forward error correction function.

The data link control layer consists of the Error Control (EC) function, the Medium Access Control (MAC) function and the Radio Link Control function. It is divided into the user data transport functions and the control functions.

The medium access control (MAC) is a centrally scheduled Time Division Multiple Access/Time Division Duplex (TDMA/TDD) protocol. Centrally scheduled means that the access point/central controller controls all transmissions over the air, including uplink, downlink and direct mode phase. Each of the wireless devices in a subnet can request the reservation of one or more time slots for communication between itself and another device in the subnet. The basic structure on the air interface generated by the MAC protocol consists of a sequence of MAC frames of equal length, with a 2 ms duration. Each MAC frame consists of several phases. Several wireless devices can consecutively burst their transmissions in their consecutively reserved time slots within a phase. The MAC frame phases include the broadcast phase, the downlink phase, the direct link phase, the uplink phase, and the random access phase. The downlink phase, direct link phase, and uplink phase of the MAC frame contain the assigned TDMA time slots for the transmission bursts of data and control from each device in the subnet that has requested a slot.

[1] Broadcast phase: The Broadcast phase carries the broadcast control channel and the frame control channel, which are broadcast by the central controller. The broadcast control channel contains general announcements and some status bits announcing the appearance of more detailed broadcast information in the downlink phase. The broadcast control channel includes a beacon signal. The Broadcast phase carries the frame control channel, which contains information about the structure of the ongoing frame, containing the exact position of the time slots for all following transmission bursts, their usage and content type. The messages in the frame control channel are resource grants. Resource grants allocate the TDMA time slots for transmissions from each device that has requested a slot in the subnet.

[2] Downlink phase: The downlink phase carries user specific control information and user data, transmitted from access point/central controller to wireless devices. Additionally, the downlink phase may contain further broadcast information, which does not fit in the fixed broadcast control channel field. The control information and user data are transmitted as protocol data units (PDUs).

[3] Direct Link phase: The direct link phase carries user data traffic between wireless devices without direct involvement of the access point/central controller. The user data traffic is transmitted as protocol data units (PDUs). However, for the control of traffic, the access point/central controller is indirectly involved by receiving Resource Requests from wireless devices for these connections and transmitting Resource Grants in the frame control channel.

[4] Uplink phase: The uplink phase carries control and user data from the wireless devices to the access point/central controller. The wireless devices have to request capacity for one of the following MAC frames in order to get resources granted by the access point/central controller. The control and user data are transmitted as protocol data units (PDUs).

[5] Random access phase: The Random access phase carries a number of random access channels. Wireless devices to which no capacity has been allocated in the uplink phase use this phase for the transmission of control information. Non-associated wireless devices use random channels for the first contact with an access point/central controller. This phase is also used by wireless devices performing handover to have their connections switched over to a new access point/central controller.

The duration of the broadcast channel is fixed. The duration of the frame channel, downlink phase, direct link phase, uplink phase, and the number of random channels are dynamically adapted by the central controller depending on the current traffic situation. A central controller may have several downlink, direct link, and uplink phases and mix the phases, as long as the order is maintained for each individual wireless device. The downlink, direct link, and uplink phases consist of two types of protocol data units (PDUs): long PDUs and short PDUs. The long PDUs have a size of 54 bytes and contain control or user data. The short PDUs with a size of 9 bytes contain only control data and are always generated by the data link control. They may contain resource requests in the uplink, automatic repeat request messages like acknowledgments and discard messages or radio link control information.

The same size of 9 bytes is also used in the random channel. The random channel can only carry radio link control messages and resource requests. The access method to the random channel is a slotted Aloha protocol. The collision resolution is based on a binary backoff procedure, which is controlled by the wireless devices. The access point/central controller can decide dynamically how many random channel slots it provides in the random access phase per MAC frame.

A wireless device intending to communicate with an access point/central controller must be associated to this access point/central controller. The reasons are:

[1] The access point/central controller always has to create some resources for each wireless device associated, e.g. the radio link control connection and a MAC ID.

[2] The MAC protocol is centrally controlled by the access point/central controller, regardless of whether it operates in centralized or in direct mode.

The steps of the association control are:

[1] Association: The first step is the allocation of a MAC ID to a wireless device, followed by the negotiation of the link capabilities. These comprise the selected convergence layers and other features. The access point/central controller and wireless device decide in this step whether encryption and/or authentication are performed and which encryption and authentication mechanisms are used.

[2] Encryption key exchange: This step is performed after the link capability negotiation and is optional. It is based on the Diffie-Hellmann key exchange protocol. The Diffie-Hellmann private and public values are used by both access point/central controller and wireless device to generate and refresh the session key.

[3] Authentication: This step is performed after the encryption key exchange and is optional. The authentication affects both wireless device and access point/central controller, i.e. they perform a mutual authentication.

[4] Beacon Signaling in the access point/central controller: The beacon signaling provides basic information about essential features and properties of the access point/central controller, which are broadcast in each MAC frame. The association control function provides some of the values that are broadcast.

[5] Encryption key refresh: This feature is optional. It can be performed periodically and is requested by the access point/central controller.

[6] Disassociation: This feature is performed by the wireless device, if possible. This may not be possible if the wireless device suddenly drops power.

Each HIPERLAN Type 2 device consists of the physical layer, the data link control, and one or multiple convergence layers. The application layer in a HIPERLAN Type 2 Direct mode device makes use of the data link control services through an application specific convergence layer.

A subnet is created when the central controller starts to generate valid broadcast control channels in the broadcast phase and allows other devices to associate with its subnet. All devices of a subnet are synchronized to the frequency chosen by the central controller, and access the channel using the MAC frame structure given in broadcast control channel and frame control channels by the central controller. The selection of the central controller is dynamic, and seamless handover of the Central Controller responsibility from one central controller-capable wireless device to another is possible.

To obtain a unified control framework for both infrastructure and ad hoc modes of operation, the control plane is kept centralized for all general features in ad hoc mode. That means that only the central controller can instruct a wireless device to do something. However, distributed control is also made possible for some Direct mode extension features by introducing logical control channels, which can be used for direct exchange of control messages between wireless devices.

In the user plane, HIPERLAN Type 2 ad hoc mode makes extensive use of direct link user connections. This significantly improves the resource efficiency, since in a typical home environment most user traffic is of intra-cell nature. As in the infrastructure mode, the 8-bit MAC-ID is used to differentiate devices in a subnet, and the 6-bit-ID plus the source and destination MAC-IDs are used to differentiate connections between a pair of devices, or broadcast/multicast connections originating from any wireless device in ad hoc mode.

Resource Requests for direct link, long transport channels and short transport channels are transmitted in the random channel or in a dedicated control channel in the uplink phase. No resource request for direct link is sent in the link control channel of the direct link phase. A resource request for a direct link is always related to a simplex connection whose direction is determined by the source and destination MAC-IDs in resource requests.

Resource Grants for direct link, long transport channels and short transport channels are sent in frame control channel. A resource grant for a direct link is always related to a simplex connection whose direction is determined by the source and destination MAC-IDs in resource grant.

A dedicated control channel in the Direct link phase is used for radio link control message exchange between any two HIPERLAN Type 2-devices in direct mode, or from a direct mode sender to a group of direct mode receivers. It is mapped to either a direct link, long transport channel or a direct link, short transport channel. This logical channel can be used, for example, for direct link power control and link quality calibration.

In the Direct Mode, the direction of logical channels is distributed. Resource grants are transmitted by the central controller in the frame control channel. Resources granted for direct link connections are related to direct link phase user data channel for user data and related to direct link phase control channel for automatic repeat request control messages. PDUs in the direct link phase user data channel and discard PDUs in the direct link phase control channel are directly transmitted from wireless device to wireless device. Automatic repeat request feedback PDUs are directly transmitted from wireless device to wireless device. The central controller does not listen to the direct link phase user data channel and direct link phase control channel if it is not a peer entity of the direct link connection. The central controller itself can act as a wireless device and thus it can be the source and/or destination of direct link connections.

The name distribution messages 244 to 250 of FIG. 1E are transmitted as protocol data units (PDUs) in the Direct Link phase of the HIPERLAN Type 2 MAC frames exchanged between wireless devices 124, 126, 116, 114, 108 in the ad hoc network 132(H2) of FIG. 1J. Wireless Device 100 is the central controller for the ad hoc network 132(H2), and name distribution messages are transmitted to it in the Up Link phase and from it in the Down Link phase of the MAC frames in exchanges with the other devices 124, 126, 116, 114, 108. The 8-bit MAC-ID is used to differentiate devices in the ad hoc network 132(H2), and the 6-bit-ID plus the source and destination MAC-IDs are used to differentiate connections between pairs of devices. The medium access is managed in the central controller 100, however the name distribution messages and other user data traffic are exchanged between the wireless devices without necessarily going through the central controller 100. The central controller 100 may also be connected to a core network and can operate in both direct and centralized mode.

FIG. 1J, shows the propagation of the ADD-DEVICE message 244(M) to add Mark's wireless device 128 to the HIPERLAN Type 2 ad hoc network 132(H2). The FIG. 1J shows the incrementing of the current hop count value attributed to Mark's added device 128 as the ADD-DEVICE message transits each existing device in the HIPERLAN Type 2 ad hoc network. As the user, Mark's ADD DEVICE message 244(M) propagates through consecutive ones of the wireless devices 124, 126, 116, 114, 108, and 100 in FIG. 1J, the current hop count value CURRENT HOP CNT in the message is incremented by "1" and is compared with the value of MAX HOP CNT. This process is shown in FIG. 3, which is a network flow diagram of the process flow in the HIPERLAN Type 2 ad hoc network 132(H2), illustrating the propagation of the ADD-DEVICE message for adding the device 128 to the network. The effect of processing the ADD-DEVICE message in each consecutive wireless device 124, 126, 116, 114, 108, and 100 is shown in FIG. 1B. FIG. 1B shows the incrementing of the current hop count value attributed to Mark's added device 128, as it appears in the name manager table 232 stored in each consecutive device receiving Mark's ADD-DEVICE message 244(M) in the HIPERLAN Type 2 ad hoc network.

A portion of the process to add a new device is shown in FIG. 3 for the first three devices in the HIPERLAN Type 2 ad hoc network 132(H2), Paul's device 124, Ian's device 126, and Dan Jones' device 116. The process continues through the remaining devices 114, 108, and 100. Before joining the HIPERLAN Type 2 ad hoc network 132(H2), the user Mark enters his primary name "MARK", an alternate name "MARK'S PC", and the maximum hop count value of "4" that he desires, into his naming menu 80. These values are stored as operands in the ADD DEVICE message 244(M) of FIG. 1B. Mark's device 128 then joins the HIPERLAN Type 2 ad hoc network 132(H2) in step 252, by forming a communications link with Paul's wireless device 124 in step 254, using the HIPERLAN Type 2 protocol described above to establish a wireless connection.

Paul's wireless device 124 receives the ADD DEVICE message 244(M) in step 255 of FIG. 3. The op code parser 242 of FIG. 2C interprets the op code field of name distribution messages to be processed by the device and in response to the ADD DEVICE message 244(M), and invokes subroutines in the application program 238 to process the ADD DEVICE message 244(M).

Step 255 of FIG. 3 increments the current hop count value of "0" by "1", and writes the new value of "1" into the CURRENT HOP CNT field of the ADD DEVICE message 244(M). FIG. 1B shows the name manager table 232(P) in Paul's device 124, in which a name record is created for Mark's device 128, to store information copied from Mark's ADD DEVICE message 244(M). The values copied from Mark's ADD DEVICE message 244(M) are DEVICE ADDRESS="ADDRESS(M)", NAME="MARK", ALTERNATE NAME="MARK'S PC", MAX HOP CNT="4", and CURRENT HOP CNT="1".

Step 255 then flows to step 256 where the ADD DEVICE message 244(M) with its newly incremented hop count value of "1" is forwarded to the next device, which is Ian's wireless device 126. Step 256 in Paul's device 124, flows to step 257 where a determination is made as to whether Paul is authorized to display with his device 124, the name or alternate name provided in the received ADD DEVICE message 244(M). Reference to the ADD DEVICE message 244(M) in FIG. 1B shows that the operand portion of the message includes a field "OK TO DISPLAY", in which the user Mark has stored a "YES" value. This field gives a blanket authorization to all receiving devices, if its value is "YES".

Step 257 of FIG. 3 flows to step 258, where Paul's device 124 determines if the current hop count value of "1" for Mark's device, in the name manager table 232(P), is greater than the value "4" in the MAX HOP CNT field. If it is, then a hop count flag is set in the HOP CNT FLAG field 233 of the name manager table 232(P), which will prevent the Mark's name or alternate name from being displayed. In this stage of the example, the hop count flag is not set and thus Mark's name is not prevented from display with Paul's device 124.

Step 258 of FIG. 3 flows to step 259, where Paul's device 124 determines if the primary name "MARK" in Mark's ADD DEVICE message 244(M) conflicts with another device name currently in the name manager table 232(P) in Paul's device 124. If there is a conflict, then one of those two conflicting devices must have its alternate name substituted for its primary name. This determination is performed by the resolution process 325 shown in the flow diagram of FIG. 3E. In FIG. 2B, the name manager table 232 stores the primary names and the alternate names of all of the devices 124, 126, 116, 114, 108, and 100 in the HIPERLAN Type 2 ad hoc network of FIG. 1J. Step 259 compares the primary name "MARK" in Mark's ADD DEVICE message 244(M) with each of the respective names "PAUL", "DAN", "DAN JONES", "EVE", "DAN", and "ALICE". Where an existing name already has a conflict flag "X", for example where the alternate name "DAN JONES" has been substituted for the primary name "DAN", then step 259 compares the primary name "MARK" of the added device 128 with the existing alternate name "DAN JONES" of the device 116.

The resolution process 325 shown in the flow diagram of FIG. 3E makes use of the TIME STAMP field in the name manager table 232. The TIME STAMP field in Mark's ADD DEVICE message 244(M) contains the value "15:30", which is the time at which Mark's device completed its connection to the HIPERLAN Type 2 ad hoc network 132(H2). The value in the TIME STAMP field in Mark's ADD DEVICE message 244(M) is copied into each name manager table 232, as shown in FIG. 2B. In step 346 of name conflict resolution process 325 of FIG. 3E, if the primary name "MARK" in Mark's ADD DEVICE message 244(M) conflicts with another device name currently in the name manager table 232(P) in Paul's device 124, then the program flows to either step 348 or step 350.

In step 348, if the existing device in the HIPERLAN Type 2 ad hoc network has the older time stamp, then Mark's device's alternate name "MARK'S PC" must be substituted for its primary name "MARK". In step 350, if Mark's added device 128 has the older time stamp, then the existing device in the HIPERLAN Type 2 ad hoc network must have its alternate name substituted for its primary name. Then steps 348 and 350 flow to the return step 352. In an alternate embodiment, younger time stamps can be preferred over older time stamps.

Step 259 in FIG. 3 than flows to step 260, where it is determined in Paul's device whether Mark's device 128 to be added is authorized to join the HIPERLAN Type 2 ad hoc network 132(H2). This determination can be based on a prior blanket prohibition against the addition of certain types of devices or particular user names, which can be provided in a stop list entered by the user Paul. If Mark's device 128 is authorized to join the HIPERLAN Type 2 ad hoc network 132(H2), then step 260 sends a copy of the updated name manager table 232 to Mark's device 128. This is accomplished by forming an ADD DEVICE message 244 for each name record in the name manager table 232(P) of Paul's device 124 and forwarding it to Mark's device 128.

Step 260 then flows to step 262 in Mark's device 128, where each name record in the updated name manager table 232 is received and stored as Mark's name manager table. Mark's device 128 can then display the names of the devices in the HIPERLAN Type 2 ad hoc network 132(H2) shown in FIG. 1J.

If any of the devices in the HIPERLAN Type 2 ad hoc network 132(H2) is not aware of the process to add a new device in FIG. 3, then when that unaware device receives the ADD DEVICE message 244, it will respond with an error message. In response to this error message, the forwarding device will use any alternate wireless connections that it currently has or which it can establish to any other devices in the network, to continue the propagation of the ADD DEVICE message 244. FIG. 1J shows the HIPERLAN Type 2 ad hoc network 132(H2) devices communicating directly with one another whereby they can establish alternate paths to circumvent unaware devices.

FIG. 3F is a network flow diagram of an alternate embodiment of the process flow in the ad hoc network 132(H2), illustrating the propagation of the composite name manager table 232" for adding the device 128 to the HIPERLAN Type 2 network.

V. Other Wireless Standards

Four example ad hoc network standards have been described to embody the invention, the Bluetooth standard, the IEEE 802.11 Wireless LAN standard, the HIPERLAN Type 1 standard, and the HIPERLAN Type 2 standard. However, in addition to these four standards, the invention also applies to other wireless standards. The invention's principle of automatically resolving naming conflicts throughout an ad hoc network, is equally useful in many other wireless standards. The invention applies, for example, to the Infrared Data Association (IrDA) standard, the Digital Enhanced Cordless Telecommunications (DECT) standard, the Shared Wireless Access Protocol (SWAP) standard, the IEEE 802.15 Wireless Personal Area Network (WPAN) standard, the Japanese 3rd Generation (3G) wireless standard, and the Multimedia Mobile Access Communication (MMAC) Systems standard of the Japanese Association of Radio Industries and Businesses. The invention enables each of these wireless standards to automatically resolve naming conflicts throughout an ad hoc network.

The resulting invention unambiguously associates a name entered by the user with the device address of the user's wireless device, and distributes that name throughout the ad hoc network. The resulting invention enables a member of an ad hoc network to select the user's displayed name on the member's wireless device, and have the user's address automatically appended to a message to be sent by the member to the user's device. The resulting invention reliably resolves naming conflicts between members with the same selected device name, which they have distributed throughout an ad hoc network. The resulting invention solves the problem of resolving device name conflicts when adding devices to existing ad hoc networks or when joining two ad hoc networks together.

Although a specific embodiment of the invention has been disclosed, it will be understood by those having skill in the art that changes can be made to the specific embodiment without departing from the spirit and the scope of the invention.

What is claimed is:

1. A method to distribute a user-defined name of a user's wireless device in an ad hoc network, comprising:
   associating a first member device address with a first member-defined name, in a member name record stored in a first member device in an ad hoc network;
   associating a second member device address with a second member-defined name, in a member name record stored in a second member device in the ad hoc network:
   distributing a name distribution message in the ad hoc network, said name distribution message associating a user device address with a user-defined name and including an operation code;
   receiving the name distribution message at the first member device;
   selecting an operation in response to said operation code, to perform a corresponding one of a plurality of name distribution functions relating to the user-defined name and the ad hoc network;
   comparing the user-defined name with the first member-defined name to automatically resolve a name conflict;
   storing the user device address in association with the user-defined name in a user name record in the first member device, if there is no name conflict;
   performing the corresponding one of a plurality of name distribution functions relating to the user-defined name and the ad hoc network in response to the selecting step;
   forwarding the name distribution message from the first to the second member device; and
   repeating the steps of receiving, selecting, comparing, storing, performing and forwarding in the second member device.

2. The method of claim 1, which further comprises:
   associating the user device address with a user-defined alternate name, in the name distribution message; and
   substituting the user-defined alternate name for the user-defined name in the user name record, if there is a name conflict.

3. The method of claim 1, which further comprises:
   associating the member device address with a member-defined alternate name, in the member name record stored in the first member device; and
   substituting the member-defined alternate name for the member-defined name in the member name record, if there is a name conflict.

4. The method of claim 1, which further comprises:
   distributing the name distribution message to the first member device;
   comparing the user-defined name with the first member-defined name in the first member device;
   storing the user device address in association with the user-defined name in a user name record in the first member device, if there is no name conflict; and
   using the user-defined name at the first member device, to access the user's wireless device in the ad hoc network.

5. The method of claim 4, which further comprises:
   associating the user device address with a user-defined alternate name, in the name distribution message; and
   substituting the user-defined alternate name for the user-defined name in the user name record, if there is a name conflict.

6. The method of claim 4, which further comprises:
   associating the first member device address with a member-defined alternate name, in the member name record stored in the first member device; and
   substituting the member-defined alternate name for the first member-defined name in the member name record, if there is a name conflict.

7. The method of claim 1, which further comprises:
   receiving the name distribution message from the user's device when connecting the user's wireless device to the ad hoc network.

8. The method of claim 1, which further comprises:
   receiving the name distribution message from the user's device, which is located in a second ad hoc network, when connecting the second ad hoc network with the first said ad hoc network.

9. The method of claim 1, which further comprises:
   associating the user device address with a user-defined alternate name and a user device time stamp, in the name distribution message; and
   substituting the user-defined alternate name for the user-defined name in the user name record, if there is a name conflict and the user device time stamp is younger than a member device time stamp.

10. The method of claim 1, which further comprises:
    associating the user device address with a user-defined alternate name and a user device time stamp, in the name distribution message; and
    substituting the user-defined alternate name for the user-defined name in the user name record, if there is a name conflict and the user device time stamp is older than a member device time stamp.

11. The method of claim 1, which further comprises:
    associating the first member device address with a member-defined alternate name and a member device time stamp, in the member name record stored in the first member device; and
    substituting the member-defined alternate name for the first member-defined name in the member name record, if there is a name conflict and the member device time stamp is younger than a user device time stamp.

12. The method of claim 1, which further comprises:
    associating the first member device address with a member-defined alternate name and a member device time stamp, in the member name record stored in the first member device; and
    substituting the member-defined alternate name for the first member-defined name in the member name record, if there is a name conflict and the member device time stamp is older than a user device time stamp.

13. The method of claim 1, which further comprises:
including a current hop count value and a maximum hop count value in the name distribution message;
incrementing the current hop count value in the first member device; and
displaying the user-defined name in the first member device if the current hop count value is not greater than the maximum hop count value.

14. The method of claim 1, which further comprises:
associating the user device address with a user-defined permission to display, in the name distribution message; and
granting to the first member device, permission to display the user-defined name.

15. The method of claim 1, which further comprises:
storing a member device address in a member name record stored in a plurality of member devices in the ad hoc network;
receiving a name distribution message associating the member device address with a delete device operation code;
distributing the name distribution message to the plurality of member devices;
selecting a delete device operation to perform in response to said delete device operation code in said plurality of member devices; and
deleting the member record from the plurality of member devices in response to said selecting step.

16. The method of claim 1, which further comprises:
receiving a name distribution message associating the first member device address with a change name operation code;
distributing the name distribution message to the first member device;
selecting a change name operation to perform in response to said change name operation code in said first member device; and
changing the member-defined name in the member record of the first member device-in response to said selecting step.

17. The method of claim 1, which further comprises:
associating a member device address with a member-defined name and a name display attribute, in a member name record stored in a plurality of member devices in the ad hoc network;
receiving a name distribution message associating the member device address with a change display attribute operation code;
distributing the name distribution message; to the plurality of member devices;
selecting a change display attribute operation to perform in response to said change display attribute operation code in said plurality of member devices; and
changing the name display attribute of the member-defined name in the member record of the plurality of member devices in response to said selecting step.

18. The method of claim 1, which further comprises:
associating a member device address with a member-defined name and a name display attribute, in a member name record stored in a plurality of member devices in the ad hoc network;
receiving a name distribution message associating the member device address with a name flash display attribute operation code;
distributing the name distribution message to the plurality of member devices;
selecting a name flash display attribute operation to perform in response to said name flash display attribute operation code; and
flashing the display of the member-defined name in the plurality of member devices in response to said selecting step.

19. The method of claim 1, which further comprises:
associating a member device address with a security attribute, in a member name record stored in a plurality of member devices in the ad hoc network;
receiving a name distribution message associating the member device address with a change security attribute operation code;
distributing the name distribution message to the plurality of member devices;
selecting a change security attribute operation to perform in response to said change security attribute operation code; and
changing the security attribute in the member record in the plurality of member devices in response to said selecting step.

20. The method of claim 1, which further comprises:
associating a member device address with a member-defined name and a security attribute, in a member name record stored in a plurality of member devices in the ad hoc network;
receiving a name distribution message associating the member device address with an authorization list of member devices and a change security attribute operation code;
distributing the name distribution message to the plurality of member devices;
selecting a change security attribute operation to perform in response to said change security attribute operation code;
changing the security attribute of a member device, if it is listed on the authorization list in response to said selecting step.

21. The method of claim 1, which further comprises:
using the user-defined name at the first member device to access the user wireless device in the ad hoc network.

22. The method of claim 21, which further comprises:
said one of a plurality of name information distribution functions being adding a new device to the ad hoc network.

23. The method of claim 21, which further comprises:
said one of a plurality of name information distribution functions being deleting a device from the ad hoc network.

24. The method of claim 21, which further comprises:
said one of a plurality of name information distribution functions being changing a name of a device in the ad hoc network.

25. The method of claim 21, which further comprises:
said one of a plurality of name information distribution functions being substituting a new member name record in the first member device.

26. The method of claim 21, which further comprises:
said one of a plurality of name information distribution functions being specifying security attributes for distributing a name in the ad hoc network.

27. The method of claim 21, which further comprises:
said one of a plurality of name information distribution functions being specifying display attributes for displaying a name in the ad hoc network.

28. The method of claim 21, which further comprises:
said one of a plurality of name information distribution functions being specifying name flash display attributes for remotely flashing a displayed name in the ad hoc network.

29. The method of claim 21, which further comprises:
using the user-defined name at the first member device to access the user's wireless device in the ad hoc network.

30. A method to distribute a user-defined name of a user's wireless device in an ad hoc network, comprising:
associating a first member device address with a first member-defined name, in a member name record stored in a first member device in the ad hoc network;
associating a second member device address with a second member-defined name, in a member name record stored in a second member device in the ad hoc network;
distributing a name distribution message associating a user device address with a user-defined name and a user-defined alternate name, to the at least one member device, said name distribution message including an operation code;
receiving the name distribution message at the first member device;
selecting an operation in response to said operation code to perform a corresponding one of a plurality of name distribution functions relating to the ad hoc network;
comparing the user-defined name with the first member-defined name in the first member device to automatically resolve a name conflict;
storing the user device address in association with the user-defined name as an effective user name in a user name record in the first member device, if there is no name conflict;
storing the user device address in association with the user-defined alternate name as the effective user name in the user name record in the first member device, if there is a name conflict;
performing the corresponding one of the plurality of name distribution functions relating to the effective user name and the ad hoc network in response to said selecting step;
forwarding the name distribution message from the first to the second member device; and
repeating the steps of receiving, selecting, comparing, storing, performing and forwarding in the second member device.

31. The method of claim 30, which further comprises:
associating the first member device address with the first member-defined name and a member-defined alternate name, in the member name record;
distributing a second name distribution message associating the user device address with the user-defined name, to the at least one member device;
substituting the member-defined alternate name for the first member-defined name in the member name record in the first member device, if there is a name conflict;
storing the user device address in association with the user-defined name in a second user name record in the first member device; and
using the user-defined name from the second user name record to access the user's wireless device in the ad hoc network.

32. The method of claim 30, which further comprises:
associating the first member device address with the member-defined name and an annunciator attribute, in the member name record;
receiving a name distribution message associating the first member device address with a change display attribute indication;
distributing the name distribution message associating the first member device address with a change display attribute indication, to the first member device; and
changing the annunciator attribute of the member-defined name in the member record.

33. The method of claim 32, wherein said annunciator attribute controls the font of the first member-defined name as it is displayed.

34. The method of claim 32, wherein said annunciator attribute controls the color of the first member-defined name as it is displayed.

35. The method of claim 32, wherein said annunciator attribute controls the animation of the first member-defined name as it is displayed.

36. The method of claim 32, wherein said annunciator attribute controls a sound played in conjunction with the display of the first member-defined name.

37. The method of claim 30, which further comprises:
associating the first member device address with the first member-defined name, in the member name record stored in the first member device in a first ad hoc network;
receiving a name distribution message associating a second user device address with a second user-defined name from a user's device which is located in a second ad hoc network, when connecting the second ad hoc network with the first ad hoc network;
comparing the second user-defined name with the first member-defined name;
storing the second user device address in association with the second user-defined name in a user name record in the first member device in the first ad hoc network, if there is no name conflict; and
using the second user-defined name at the first member device to access the user's wireless device in the first ad hoc network.

38. The method of claim 30, for connecting two ad hoc networks, comprising:
associating a first member device address with a first member-defined name, in a first member name record stored in a first member device in a first ad hoc network;
associating a second member device address with a second member-defined name, in a second member name record stored in a second member device in a second ad hoc network;
receiving a first name distribution message in the second ad hoc network, associating a first user device address with a first user-defined name from a first user's device which is located in the first ad hoc network, when connecting the second ad hoc network with the first ad hoc network;
receiving a second name distribution message in the first ad hoc network, associating a second user device address with a second user-defined name from a second user's device which is located in the second ad hoc network, when connecting the second ad hoc network with the first ad hoc network;
comparing the first user-defined name with the second member-defined name;
storing the first user device address in association with the first user-defined name in a first user name record in the second member device in the second ad hoc network, if there is no name conflict;

storing the second user device address in association with the second user-defined name in a second user name record in the first member device in the first ad hoc network, if there is no name conflict;

using the first user-defined name at the second member device to access the first user's wireless device in the first ad hoc network; and using the second user-defined name at the first member device to access the second user's wireless device in the second ad hoc network.

39. A method to distribute user-defined names of wireless devices when connecting two ad hoc networks, comprising:

associating a first member device address with a first member-defined name, in a member name record stored in a first member device in a first ad hoc network;

associating a second member device address with a second member-defined name, in a member name record stored in a second member device in the first ad hoc network;

connecting a second ad hoc network containing a user device, to the first ad hoc network;

distributing a name distribution message in the ad hoc network, said name distribution message associating a user device address with a user-defined name and including an operation code;

receiving the name distribution message at the first member device in the first ad hoc network from the user device;

selecting an operation in response to said operation code to perform a corresponding one of a plurality of name distribution functions relating to at least one of the ad hoc networks;

comparing the user-defined name with the first member-defined name;

storing the user device address in association with the user-defined name in a user name record in the first member device in the first ad hoc network, if there is no name conflict;

performing the corresponding one of the plurality of name distribution functions relating to the user-defined name and the at least one ad hoc network in response to said selecting step:

forwarding the name distribution message from the first to the second member device; and repeating the steps of receiving, selecting, comparing, storing, performing and forwarding in the second member device.

40. The method of claim 39, which further comprises:
associating the user device address with a user-defined alternate name and a user device time stamp, in the name distribution message; and substituting the user-defined alternate name for the user-defined name in the user name record, if there is a name conflict and the user device time stamp is younger than a member device time stamp.

41. The method of claim 39, which further comprises:
associating the user device address with a user-defined alternate name and a user device time stamp, in the name distribution message; and substituting the user-defined alternate name for the user-defined name in the user name record, if there is a name conflict and the user device time stamp is older than a member device time stamp.

42. The method of claim 39, which further comprises:
associating the first member device address with a member-defined alternate name and a member device time stamp, in the member name record stored in the plurality of member devices; and substituting the member-defined alternate name for the first member-defined name in the member name record, if there is a name conflict and the member device time stamp is younger than a user device time stamp.

43. The method of claim 39, which further comprises:
associating the first member device address with a member-defined alternate name and a member device time stamp, in the member name record; and substituting the member-defined alternate name for the first member-defined name in the member name record, if there is a name conflict and the member device time stamp is older than a user device time stamp.

44. The method of claim 39, which further comprises:
including a current hop count value and a maximum hop count value in the name distribution message;

incrementing the current hop count value in the first member device; and displaying the user-defined name in the plurality of member devices if the current hop count value is not greater than the maximum hop count value.

45. The method of claim 39, which further comprises:
associating the user device address with a user-defined permission to display, in the name distribution message; and granting to the first member device, permission to display the user-defined name.

46. The method of claim 39, wherein the wireless devices use a IEEE 802.11 Wireless LAN standard.

47. The method of claim 39, wherein the wireless devices use the High Performance Radio Local Area Network (HIPERLAN) standard.

48. The method of claim 39, wherein the wireless devices use the Bluetooth standard.

49. The method of claim 39, wherein the wireless devices use the Digital Enhanced Cordless Telecommunications (DECT) standard.

50. The method of claim 39, wherein the wireless devices use the Shared Wireless Access Protocol (SWAP) standard.

51. The method of claim 39, wherein the wireless devices use the IEEE 802.15 Wireless Personal Area Network (WPAN) standard.

52. The method of claim 39, wherein the wireless devices use the Infrared Data Association (IrDA) standard.

53. The method of claim 39, wherein the wireless devices use the Multimedia Mobile Access Communication (MMAC) Systems standard.

54. A system to distribute a user-defined name of a user's wireless device in an ad hoc network, comprising:

a first memory in a first member device, for storing a first member device address in association with a first member-defined name, in a member name record stored in the first member device in an ad hoc network;

a second memory in a second member device, for storing a second member device address in association with a second member-defined name, in a member name record stored in the second member device in an ad hoc network;

an input of the first member device, for receiving a name distribution message distributed in the ad hoc network, said name distribution message associating a user device address with a user-defined name, said name distribution message including an operation code;

a selector coupled to the input, for selecting an operation in response to said operation code to perform a corresponding one of a plurality of name distribution functions relating to the ad hoc network;
a comparator coupled to the first memory and the input, for comparing the user-defined name with the first member-defined name to automatically resolve a name conflict;
said first memory storing the user device address in association with the user-defined name in a user name record, if there is no name conflict;
a processor coupled to the first memory, for performing the corresponding one of the plurality of name distribution functions relating to the user-defined name and the ad hoc network in response to said selecting;
said processor forwarding the name distribution message from the first to the second member device; and
said second member device repeating said functions of receiving, selecting, comparing, storing, performing and forwarding.

55. The system as claimed in claim 54, comprising:
an interface coupled to the first memory, for using the user-defined name to access the user's wireless device in the ad hoc network.

56. The system as claimed in claim 55, comprising:
said input receiving a second name distribution message from a second user device in a second ad hoc network, the second message associating a second user device address with a second user-defined name;
said comparator comparing the second user-defined name with the first member-defined name;
said first memory storing the second user device address in association with the second user-defined name in a second user name record, if there is no name conflict; and
said processor using the second user-defined name at the first member device to access the second user wireless device in the second ad hoc network.

57. A computer program product to distribute a user-defined name of a user's wireless device in an ad hoc network, comprising:
a computer readable medium;
program code in said computer readable medium for storing a first member device address in association with a first member-defined name, in a member name record in a first member device in the ad hoc network;
program code in said computer readable medium for storing a second member device address in association with a second member-defined name, in a member name record in a second member device in the ad hoc network;
program code in said computer readable medium for distributing a name distribution message in the ad hoc network, said name distribution message associating a user device address with a user-defined name and including an operation code;
program code in said computer readable medium for receiving the name distribution message at the first member device;
program code in said computer readable medium for selecting an operation in response to said operation code to perform a corresponding one of a plurality of name distribution functions relating to the ad hoc network;
program code in said computer readable medium for comparing the user-defined name with the first member-defined name to automatically resolve a name conflict;
program code in said computer readable medium for storing the user device address in association with the user-defined name in a user name record at the first member device, if there is no name conflict;
program code in said computer readable medium for performing the corresponding one of the plurality of name distribution functions relating to the user-defined name and the ad hoc network in response to said selecting;
program code in said computer readable medium for forwarding the name distribution message from the first to the second member device; and
program code in said computer readable medium for repeating the steps of receiving, selecting, comparing, storing, performing and forwarding in the second member device.

58. The computer program product of claim 57, comprising:
program code in said computer readable medium for using the user-defined name to access the user's wireless device in the ad hoc network.

59. A computer program product of claim 58, which further comprises: comprising:
program code in said computer readable medium for receiving a second name distribution message from a second user device in a second ad hoc network, the second message associating a second user device address with a second user-defined name;
program code in said computer readable medium for comparing the second user-defined name with the first member-defined name;
program code in said computer readable medium for storing the second user device address in association with the second user-defined name in a second user name record, if there is no name conflict; and
program code in said computer readable medium for using the second user-defined name at the first member device to access the second user wireless device in the second ad hoc network.

60. A method to distribute a user-defined name of a user's wireless device in an ad hoc network, comprising:
associating a first member device address with a first member-defined name, in an existing first name table stored in a first member device in the ad hoc network;
associating a second member device address with a second member-defined name, in an existing second name table stored in a second member device in the ad hoc network;
distributing a name distribution message in the ad hoc network, said name distribution message associating a user device address with a user-defined name in a new name table and including an operation code;
receiving the name distribution message at the first member device;
selecting an operation in response to said operation code to perform a corresponding one of a plurality of name distribution functions relating to the ad hoc network;
appending the new name table to the existing first name table to form a composite name table;
comparing the user-defined name with the first member-defined name to automatically resolve a name conflict;
storing the user device address in association with the user-defined name in the composite name table in the first member device, if there is no name conflict;
performing the corresponding one of the plurality of name distribution functions relating to the user-defined name and the ad hoc network in response to said selecting;

forwarding the name distribution message from the first to the second member device; and repeating the steps of receiving, selecting, appending, comparing, storing, performing and forwarding in the second member device.

61. The method of claim 60, which further comprises:

using the user-defined name at the plurality of member devices to access the user's wireless device in the ad hoc network.

62. The method of claim 61, which further comprises:

receiving at the first member device a second name distribution message associating a second user device address with a second user-defined name in a second new name table, from a user's device which is located in a second ad hoc network, when connecting the second ad hoc network with the first said ad hoc network;

appending the second new name table to the existing composite name table to form a new composite name table;

comparing the second user-defined name with the first member-defined name;

storing the second user device address in association with the second user-defined name in the new composite name table in the first member device in the first said ad hoc network, if there is no name conflict; and using the second user-defined name at the first member device to access the second user wireless device in the first said ad hoc network.

63. A method to distribute user-defined names of users' wireless devices when connecting two ad hoc networks, comprising:

associating a first member device address with a first member-defined name, in a first existing name table stored in a first member device in a first ad hoc network;

associating a second member device address with a second member-defined name, in a second existing name table stored in a second member device in a second ad hoc network;

distributing a name distribution message in the ad hoc network, said name distribution message associating a user device address with a user-defined name and including an operation code;

receiving a first name distribution message including the first existing name table at the second member device in the second ad hoc network, associating a first user device address with a first user-defined name from a first user's device which is located in the first ad hoc network, when connecting the second ad hoc network with the first ad hoc network, said first name distribution message including an operation code;

selecting an operation in response to said operation code to perform a corresponding one of a plurality of name distribution functions relating to the ad hoc network;

appending the first existing name table to the second existing name table to form a composite name table;

comparing the first user-defined name with the second member-defined name to automatically resolve a name conflict;

storing the first user device address in association with the first user-defined name in the composite name table in the second member device in the second ad hoc network, if there is no name conflict;

performing the corresponding one of the plurality of name distribution functions relating to the ad hoc network in response to said selecting step;

forwarding the name distribution message from the second member device to another member device in the second ad hoc network; and repeating the steps of receiving, selecting, appending, comparing, storing, performing and forwarding in the another member device.

64. The method of claim 63, which further comprises:

using the first user-defined name at the second plurality of member devices to access the first user's wireless device in the first ad hoc network.

65. The method of claim 64, which further comprises:

receiving a second name distribution message in the first ad hoc network from a second user device in the second network, the second message including the second existing name table associating a second user device address with a second user-defined name;

appending the first existing name table to the second existing name table to form a second composite name table;

comparing the second user-defined name with the first member-defined name;

storing the second user device address in association with the second user-defined name in the second composite name table in the at least one member device in the first ad hoc network, if there is no name conflict; and using the second user-defined name at the at least one member device in the first ad hoc network to access the second user wireless device in the second ad hoc network.

66. A method to distribute a user-defined name of a user's wireless device in an ad hoc network, comprising:

associating a first member device address with a first member-defined name and a second member device address with a second member-defined name, in member name records respectively stored in at least a first and a second member devices in an ad hoc network;

distributing a name distribution message in the ad hoc network, said name distribution message associating a user device address with a user-defined name and including an operation code;

receiving the name distribution message at the first member device;

invoking an add device operation in the first device in response to said operation code, to perform an add device name distribution function relating to the user-defined name and the ad hoc network;

forwarding the name distribution message from the first to the second device;

storing the user device address in association with the user-defined name in a user name record in the first member device in response to the invoking step;

comparing in the first device the user-defined name with the first and second member-defined names to automatically resolve a name conflict, if one exists, by substituting an alternate name; and repeating in the second device the steps of invoking, storing, and comparing in response to receiving the forwarded name distribution message.

67. A method to distribute a user-defined name of a user's wireless device in an ad hoc network, comprising:

associating a first member device address with a first member-defined name, in a member name record stored in a first member device in an ad hoc network;

associating a second member device address with a second member-defined name, in a member name record stored in a second member device in the ad hoc network;

distributing a first name distribution message in the ad hoc network, said first name distribution message associating a user device address of a user device with a user-defined name and including an add device operation code;

receiving the first name distribution message at the first member device;

selecting an add device operation in the at the first member device in response to said add device operation code, to add the user device to the ad hoc network;

comparing the user-defined name with the first member-defined name to automatically resolve a name conflict;

storing the user device address in association with the user-defined name in a user name record in the first member device in response to the selecting step, if there is no name conflict;

forwarding the name distribution message from the first to the second member device;

repeating the steps of receiving, selecting, comparing, storing, performing and forwarding in the second member device;

distributing a second name distribution message in the ad hoc network, said second name distribution message associating the user device address of the user device with the user-defined name and including a second operation code;

selecting a second operation in response to said second operation code, to perform a corresponding one of a plurality of name distribution functions relating to the user-defined name and the user device to the ad hoc network; and performing the corresponding one of the plurality of name distribution functions relating to the user-defined name and the ad hoc network in response to the second said selecting step.

68. A method to distribute a user-defined name of a user's wireless device in an ad hoc network, comprising:

associating a first member device address with a first member-defined name and a second member device address with a second member-defined name, in respective member name records stored in at least a first and a second member devices in an ad hoc network;

distributing a name distribution message in the ad hoc network, said name distribution message associating a user device address with a user-defined name and including an operation code;

receiving the name distribution message at the first member device;

transferring at least a portion of the message from the first to the second device;

selecting an operation in the first device in response to said operation code, to perform a corresponding one of a plurality of name distribution functions relating to the user-defined name and the ad hoc network;

comparing in the first device the user-defined name with the first and second member-defined names to automatically resolve a name conflict;

storing the user device address in association with the user-defined name in a user name record in the first member device, if there is no name conflict;

performing in the first device the corresponding one of a plurality of name distribution functions relating to the user-defined name and the ad hoc network in response to the selecting step; and repeating in the second device the steps of selecting, comparing, storing, and performing.

* * * * *